United States Patent [19]
Dairoku et al.

[11] Patent Number: 6,071,976
[45] Date of Patent: Jun. 6, 2000

[54] WATER ABSORBING AGENT, MANUFACTURING METHOD THEREOF, AND MANUFACTURING MACHINE THEREOF

[75] Inventors: Yorimichi Dairoku; Toshimasa Kitayama; Kinya Nagasuna, all of Himeji; Takanori Murakami, Ibo-gun; Akito Yano, Himeji; Kunihiko Ishizaki, Suita, all of Japan

[73] Assignee: Nippon Shokubai Co., Ltd., Osaka, Japan

[21] Appl. No.: 08/894,677

[22] PCT Filed: Dec. 25, 1996

[86] PCT No.: PCT/JP96/03782

§ 371 Date: Aug. 27, 1997

§ 102(e) Date: Aug. 27, 1997

[87] PCT Pub. No.: WO97/24394

PCT Pub. Date: Jul. 10, 1997

[30] Foreign Application Priority Data

Dec. 27, 1995 [JP] Japan .................................. 7-341200

[51] Int. Cl.[7] .................................................. C08J 9/00
[52] U.S. Cl. .................. 521/50; 521/56; 521/64; 604/358; 604/369
[58] Field of Search ........................ 521/56, 64; 604/358, 604/369

[56] References Cited

U.S. PATENT DOCUMENTS

| | | | |
|---|---|---|---|
| 3,255,127 | 6/1966 | Von Bonin et al. | 521/64 |
| 3,441,530 | 4/1969 | Bauer et al. | 521/64 |
| 3,751,015 | 8/1973 | Hensen et al. | 259/191 |
| 4,826,880 | 5/1989 | Lesniak et al. | 521/53 |
| 4,950,692 | 8/1990 | Lewis et al. | 521/45 |
| 5,002,986 | 3/1991 | Fujiura et al. | 524/47 |
| 5,064,582 | 11/1991 | Sutton et al. | 264/37 |
| 5,122,544 | 6/1992 | Bailey et al. | 521/40.5 |
| 5,140,076 | 8/1992 | Hatsuda et al. | 525/375 |
| 5,369,148 | 11/1994 | Takahashi et al. | 523/315 |
| 5,597,873 | 1/1997 | Chambers et al. | 525/330.1 |
| 5,610,220 | 3/1997 | Klimmek et al. | 524/417 |
| 5,760,080 | 6/1998 | Wada et al. | 524/559 |

FOREIGN PATENT DOCUMENTS

| | | |
|---|---|---|
| 2154425 A1 | 1/1996 | Canada . |
| 0 401 044 A2 | 12/1990 | European Pat. Off. . |
| 0 318 989 B1 | 3/1995 | European Pat. Off. . |
| 0 644 224 A1 | 3/1995 | European Pat. Off. . |
| 0 463 388 B1 | 3/1996 | European Pat. Off. . |
| 4-214734 | 8/1992 | Japan . |
| 6-313042 | 11/1994 | Japan . |
| 6-313043 | 11/1994 | Japan . |
| 6-313044 | 11/1994 | Japan . |

Primary Examiner—Morton Foelak
Attorney, Agent, or Firm—Kubovcik & Kubovcik

[57] ABSTRACT

A high-speed agitation type mixer of a continuous extruding method including a plurality of agitating members provided around a rotational shaft inside a fixed casing is used to mix and react a water absorbing resin containing a carboxyl group with an aqueous liquid containing, for example, a crosslinking agent that can react with the carboxyl group. The agitating members of the mixer of a continuous extruding method are provided so as to form in the ejection side a second area whose thrusting force is weaker than the thrusting force in a first area in which the water absorbing resin supplied into the casing is dispersed. A device for manufacturing a water absorbing agent is thus offered which boasts good absorbency under pressure and always maintain its excellent performance with end products.

50 Claims, 21 Drawing Sheets

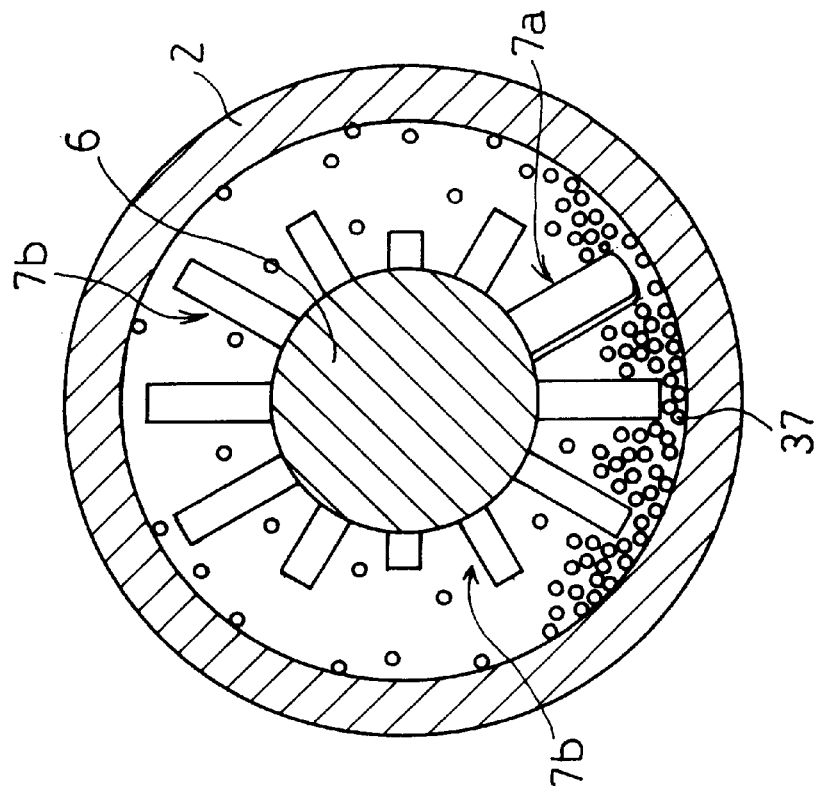
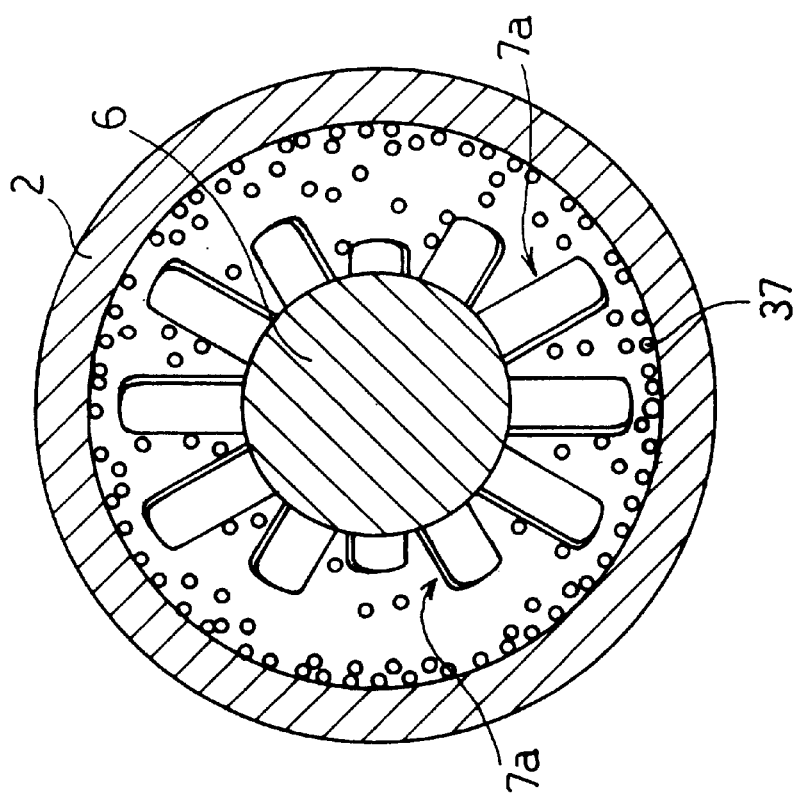

WATER ABSORBING AGENT, MANUFACTURING METHOD THEREOF, AND MANUFACTURING MACHINE THEREOF

FIELD OF THE INVENTION

The present invention relates to water absorbing agents, manufacturing methods thereof, and manufacturing machines thereof, the water absorbing agents being prepared by mixing a water absorbing resin containing a carboxyl group with a water solution of, for example, a crosslinking agent that can react with the carboxyl group, and being suitably used for sanitary goods such as, paper diapers (disposable diapers), sanitary napkins, and so-called incontinence pads.

BACKGROUND OF THE INVENTION

In recent years, water absorbing agents containing water absorbing resins have been used as components of sanitary goods such as, paper diapers (disposable diapers), sanitary napkins, and so-called incontinence pads for a purpose of absorbing body fluids.

Examples of well-known water absorbing resins include a partially neutralized and crosslinked polyacrylic acid, a hydrolyzed starch-acrylic acid graft polymer, a saponified vinyl acetate-acrylate copolymer, a hydrolyzed acrylonitrile copolymer or acrylamide copolymer, a crosslinked acrylonitrile copolymer or acrylamide copolymer, and a crosslinked cationic monomer.

A desirable water absorbing resin, when brought into contact with an aqueous liquid such as a body fluid, should exhibit excellent absorbency, absorbing rate, liquid permeability, gel strength of gel swollen with liquid, and suction force to suck the liquid from a base material containing the liquid. However, these characteristics are not necessarily correlated positively to one another. For example, a material boasting good absorbency is inferior in properties such as the liquid permeability, gel strength and absorbing rate.

It is known that those water absorbing characteristics of the water absorbing resin can be improved in a well-balanced manner by crosslinking the water absorbing resin in a neighborhood of the surface thereof, and various methods have been disclosed so far.

Examples are: a method of using a polyhydric alcohol as a crosslinking agent, disclosed in Japanese Laid-Open Patent Applications No. 58-180233/1983 (Tokukaisho 58-180233) and No. 61-16903/1986 (Tokukaisho 61-16903); a method of using a polyglycidyl compound, a polyfunctional aziridine, a polyfunctional amine compound, and a polyfunctional isocyanate compound as a crosslinking agent, disclosed in Japanese Laid-Open Patent Application No. 59-189103/1984 (Tokukaisho 59-189103); a method of using a glyoxal as a crosslinking agent, disclosed in Japanese Laid-Open Patent Application No. 52-117393/1977 (Tokukaisho 52-117393); a method of using a polyvalent metal as a crosslinking agent, disclosed in Japanese Laid-Open Patent Applications No. 51-136588/1976 (Tokukaisho 51-136588), No. 61-257235/1986 (Tokukaisho 61-257235) and No. 62-7745/1987 (Tokukaisho 62-7745); a method of using a silane coupling agent as a crosslinking agent, disclosed in Japanese Laid-Open Patent Applications No. 61-211305/1986 (Tokukaisho 61-211305), No. 61-252212/1985 (Tokukaisho 61-252212) and No. 61-264006/1985 (Tokukaisho 61-264006); and a method of using an alkylene carbonate as a crosslinking agent, disclosed in German Patent No. DE 40 20 780CI. Other examples are: a method of carrying out crosslinking reaction in the presence of inert inorganic particles, disclosed in Japanese Laid-Open Patent Applications No. 60-163956/1985 (Tokukaisho 60-163956) and No. 60-255814/1985 (Tokukaisho 60-255814); a method of carrying out crosslinking reaction in the presence of a dihydric alcohol, disclosed in Japanese Laid-Open Patent Application No. 1-292004/1989 (Tokukaihei 1-292004); a method of carrying out crosslinking reaction in the presence of water and an ether compound, disclosed in Japanese Laid-Open Patent Application No. 2-153903/1990 (Tokukaihei 2-153903); and a method of carrying out crosslinking reaction in the presence of an addition product of alkylene oxide to a monohydric alcohol, an organic acid salt, lactam, or the like, disclosed in European Patent No. EP 0 555 692 AI.

Generally, the water absorbing resin preferably contains as few particles having a diameter of not more than 150 $\mu$m (fine particles) as possible. An absorbent product such as a diaper can be clogged up by those fine particles, resulting in a lower liquid permeability. The fine particles can be wasted as particle dust and can be a cause for pneumoconiosis when handled. Besides, even when the surface is crosslinked, properties, including the absorbency under pressure, are hard to improve by fine particles. For these reasons, there is a strong demand for water absorbing resins with few fine particles.

Conventionally, water absorbing resins with few fine particles have been prepared with ① a method of adjusting particle sizes by adjusting polymerization, grinding, etc. and ② a method of removing the produced fine particles with, for example, a sieve and/or air flow as disclosed in U.S. Pat. No. 4,973,632.

However, the adoption of Method ① still produces quite a large amount of fine particles as much as a dozen percent to several dozen percent in the manufacturing process. Therefore, further removing the produced fine particles with Method ② brings down the yield and can be a cause for losing a competitive edge in cost.

Suggestions are made to solve the problems by granulating or reproducing the fine particles inevitably produced in the manufacturing process of the water absorbing resin, and to accomplish a high absorbing rate by increasing the surface areas of the primary particles with granulation.

There are a number of patents disclosing methods other than granulation: for instance, European Patent No. 0,463,388B, U.S. Pat. No. 4,950,692 and U.S. Pat. No. 4,970,267, and European Patents No. 0,417,761A and 0,496,594A disclose methods of reproducing larger particles from fine particles by mixing the fine particles with water or with a water-containing gel so that the fine particles gel, and then by grinding and drying the gelled product. European Patent No. 0,644,224 discloses a method of granulating the fine particles by adding a water solution containing a water-soluble or water-dispersing macromolecular compound to a water absorbing resin in the presence of insoluble inorganic fine particles so that the granulated substance contains 30 to 70 weight percent of water. U.S. Pat. No. 5,002,986, European Patent No. 0,318,989B, U.S. Pat. No. 5,248,709, U.S. Pat. No. 4,123,397 and U.S. Pat. No. 4,734,478, European Patent No. 0,629,411, and U.S. Pat. No. 5,369,148 disclose methods of increasing the average particle diameter of fine particles to several hundreds of $\mu$m with granulation by using fine particles of about 150 $\mu$m to several tens of $\mu$m either alone or as a mixture with larger particles and by using a water solution and the like as a binder in a ratio of several percent to slightly more than 20% of the particles.

Generally, water and an aqueous liquid are the most preferable binder for a water absorbing resin, in terms of efficiency, safety, manufacturing cost, etc. For this reason, an aqueous liquid which behaves like a binder is added to the fine particles in most of the various methods listed above.

However, a water absorbing resin, especially a water absorbing resin in a fine particle form, has a large surface area, and therefore has a high absorbing rate and makes it difficult to add the aqueous liquid uniformly. The use of insoluble inorganic fine particles or the like as a mixture assistant for the aqueous liquid poses not only a problem of high costs, but also problems of producing particle dust and of degrading the granulation strength and various properties of the substance.

Hence, there are various patents disclosing mixers which are capable of uniformly adding water when granulating the fine particles: a low-speed paddle type mixer (European Patent No. 0,644,224), a high-speed agitation type mixer (U.S. Pat. No. 5,002,986 and U.S. Pat. No. 4,734,478), a particular spray continuous granulating apparatus (U.S. Pat. No. 5,360,148), and a fluidized bed (European Patent No. 05,342,899). Suggested methods other than the granulation method include mixers for recycling the fine particles such as a nauta mixer (U.S. Pat. No. 4,950,692) and a particular shearing mixer (European Patent No. 0,417,761). Among these mixers, the high-speed agitation type mixer is not only used for the granulation methods, but also widely used for other purposes in a manufacturing process of the water absorbing resin, e.g., for the above-mentioned crosslinking of the neighborhood of the surface (U.S. Pat. No. 5,140, 076), because of its high productivity.

For instance, the inventors of the present invention have disclosed in U.S. Pat. No. 5,140,076 (Japanese Laid-Open Patent Application No. 4-214734/1992 (Tokukaihei 4-214734)) a method of manufacturing a water absorbing agent by efficiently mixing a water solution of a crosslinking agent, a processing liquid containing a crosslinking agent, or the like to a surface of a water absorbing resin. More specifically, the surface crosslinking agent is reacted by mixing a crosslinking agent with a water absorbing resin, using a high-speed agitation type mixer having an inner surface composed of a particular base material and then by heating the mixed substance. In addition, the inventors of the present invention have obtained a water absorbing resin with an improved balance among the water absorbing characteristics, especially, with better absorbency under pressure.

FIG. 21 shows a conventional mixer disclosed in U.S. Pat. No. 5,140,076. The mixer 100 is of a continuous extruding type and is provided with a plurality of agitating blades 103 around a rotational shaft 102 which is disposed in a fixed cylinder 101 having an inner surface composed of a particular base material. In the continuous extending mixer 100, particles of a water absorbing resin are supplied through a resin supply port 104, and a crosslinking agent is supplied through a liquid injection port 105. Then, the mixture is taken out of an ejection port 106 as it is extruded forward by the rotation of the agitating blades 103.

However, it has been found that even when water absorbing resin particles are crosslinked in a neighborhood of the surface thereof with the conventional continuous extruding type mixer, problems still arise with end products, such as diapers, that they lose the expected excellent water absorbing characteristics, possibly because the crosslinked or granulated parts fall off or are disintegrated when the water absorbing resin is transported or when the water absorbing resin is processed by a user into end products. It has been also found that the problem becomes more evident with a water absorbing resin boasting a high water absorbency under high pressure.

It has been also found that the granulation or reproduction of the fine particles in some cases degrades properties: for example, the absorbing rate decreases, the water-soluble components that are impurities increase, and the absorbency under high pressure decreases. It has been also found that the granulation degrades the properties more when a aqueous liquid as a binder is added in a larger amount to enhance the granulation strength and thus prevent the above mentioned disintegration of granulation.

A cause of the above problems is that the water absorbing resin is not satisfactorily mixed with the crosslinking agent, the aqueous liquid, etc., using the conventional mixer.

For example, the aqueous liquid is added in a ratio as low as several percent to 30% at most when the fluidized bed (European Patent No. 05,342,899) or the high-speed agitation type mixer (U.S. Pat. No. 5,140,076) is used for granulating the fine particles. If the aqueous liquid is added in a ratio exceeding 60%, it is extremely difficult to mix stably and continuously.

Moreover, the inventors of the present invention have found that if the aqueous liquid is added in a ratio exceeding 10%, the conventional mixer can only mix the water absorbing resin and the aqueous liquid in an extremely non-uniform manner. As a result, the aqueous liquid for enhancing the granulation strength can be added only in a limited amount, and the non-uniform addition of the aqueous liquid even degrades the properties and causes granulation to be disintegrated. Especially, with the high-speed agitation type mixer conventionally used for manufacture of a water absorbing resin, a small amount of aqueous liquid results in a high productivity, but it is almost impossible to add a aqueous liquid in a large amount.

Moreover, the inventors of the present invention have found that although the aqueous liquid can be added relatively easily with mixers having a high kneading capability such as the shearing mixer (European Patent No. 0,417,761) and the nauta mixer having been used for other purposes than granulation, the mixture obtained after the addition of a aqueous liquid, not being granulated in a particle form, is a huge mass of gel. Besides, the shearing force degrades the water absorbing resin. Furthermore, if the water-containing gel of the water absorbing resin is kneaded or ground with too large a force, the water-containing gel, not becoming an agglomerate, but becomes gel of a small surface area that seems to have been kneaded and crushed. Therefore, in some cases, even if fine particles of large surface areas are used as raw material, the absorbing rate decreases on the contrary. The inventors of the present invention have also found that a process to grind the huge mass of gel produced with a method other than granulation is likely to degrade the water absorbing resin.

In view of the problems, objects of the present invention is to offer a water absorbing agent, a manufacturing method thereof, and a manufacturing machine thereof, the water absorbing agent being capable of exhibiting high absorbency under pressure, of maintaining its high water absorbing performance even after, for example, being transported in a manufacturing plant or being processed into end products by a user, of being used in any manner in end products, and of always exhibiting excellent characteristics.

DISCLOSURE OF THE INVENTION

The inventors of the present invention have been working on a water absorbing agent, a manufacturing method thereof, and a manufacturing machine thereof in order to accomplish the objects. As a result, the inventors of the present invention have found that a water absorbing agent which always exhibits excellent characteristics can be offered by preparing the water absorbing agent so that the water absorbing agent obtained by mixing and reacting a water absorbing resin containing a carboxyl group with a crosslinking agent that reacts with the carboxyl group meet the following configuration, which has led to the completion of the invention.

In order to solve the problems, the water absorbing agent in accordance with the present invention is obtained by mixing and reacting a water absorbing resin containing a carboxyl group with a crosslinking agent that reacts with the carboxyl group, and is characterized in that $P \geqq 20$ (g/g), and $Q/P \geqq 0.85$ where P and Q respectively represent absorbency of the water absorbing agent under pressure of 50 g/cm$^2$ before and after applying an impact force (A) to the water absorbing agent by putting a predetermined load on the water absorbing agent.

Besides, in order to solve the problems, the water absorbing agent in accordance with the present invention is obtained by mixing and reacting a water absorbing resin containing a carboxyl group with a crosslir-king agent that reacts with the carboxyl group, and is characterized in that $X \geqq 20$ (g/g), and $Y/X \geqq 0.90$ where X and Y respectively represent absorbency of the water absorbing agent under pressure of 50 g/cm$^2$ before and after applying an impact force (B) to the water absorbing agent by giving predetermined vibration to the water absorbing agent.

The water absorbing agent in accordance with the present invention shows excellent absorbing performance and is resistant to mechanical stress. It is therefore possible to offer a water absorbing agent that little deteriorates in terms of water absorbing characteristics and that maintains its excellent absorbing performance with an end product, even if having received mechanical stress during, for example, transport in a manufacturing plant and processing into end products by a user.

In order to solve the problems, a method of manufacturing a water absorbing agent in accordance with the present invention is characterized in that it comprises the sequential steps of:

(1) supplying a water absorbing resin containing a carboxyl group to a first area of an agitation type mixer of a continuous extruding method including at least one kind of agitating member (e.g., agitating blade), disposed around a rotational shaft inside a fixed cylinder, for applying a thrusting force to the water absorbing resin;

(2) dispersing the water absorbing resin in the first area;

(3) extruding the water absorbing resin to a second area in which the thrusting force is weaker than in the first area; and (4) mixing the water absorbing resin and an aqueous liquid in the second area.

In order to solve the problems, a machine for manufacturing a water absorbing agent in accordance with the present invention includes an agitation type mixer of a continuous extruding method for mixing an aqueous liquid with a water absorbing resin containing a carboxyl group, and is characterized in that the mixer of a continuous extruding method includes a fixed cylinder having a rotational shaft therein, wherein at least one kind of agitating member (e.g., agitating blade) is provided around the rotational shaft so as to form in the ejection side a second area in which the thrusting force is weaker than that in a first area in which the water absorbing resin supplied into the fixed cylinder is dispersed.

Therefore, according to the method of manufacturing a water absorbing agent and the machine for manufacturing a water absorbing agent in accordance with the present invention, with the configurations of the plurality of agitating members of the mixer of a continuous extruding method, it is possible to efficiently mix and react the water absorbing resin containing a carboxyl group with the aqueous liquid containing, for example, a crosslinking agent that can react with the carboxyl group, and to surely carry out uniform mixing.

The following description will explain the present invention in detail.

The inventors of the present invention have found, from measuring the property values Q/P and Y/X of a variety of water absorbing agents having a crosslinked surface, that the property values Q/P and Y/X vary among many kinds of water absorbing agent which possesses absorbency exceeding a specific value under pressure.

The inventors of the present invention, taking those results into consideration, have further found that the property values Q/P and Y/X of water absorbing agents having a crosslinked surface vary depending on the depth, density and uniformity of the surface crosslink, and fragility of the surface, but not depending on the value of the absorbency under pressure. The inventors of the present invention have further found that a water absorbing agent with excellent absorbing performance and high resistance to mechanical stress can be obtained by manufacturing so that the property value Q/P or Y/X exceeds the below-detailed specific value in a process to crosslink a neighborhood of the surface of the water absorbing resin.

Specifically, the water absorbing agent in accordance with the present invention is obtained by mixing and reacting a water absorbing resin containing a carboxyl group with a crosslinking agent that reacts with the carboxyl group, being characterized in that $P \geqq 20$ (g/g), and $Q/P \geqq 0.85$ where P and Q respectively represent absorbency of the water absorbing agent under pressure of 50 g/cm$^2$ before and after applying an impact force (A) to the water absorbing agent by putting a predetermined load on the water absorbing agent.

Besides, the water absorbing agent in accordance with the present invention is obtained by mixing and reacting a water absorbing resin containing a carboxyl group with a crosslinking agent that reacts with the carboxyl group, being characterized in that $X \geqq 20$ (g/g), and $Y/X \geqq 0.90$ where X and Y respectively represent absorbency of the water absorbing agent under pressure of 50 g/cm$^2$ before and after applying an impact force (B) to the water absorbing agent by giving predetermined vibration to the water absorbing agent.

Here, the quotient, Q/P, of absorbency under pressure before and after the application of an impact force (A) in the present invention is a property value representing resistance of a crosslinked surface of a water absorbing agent, i.e. a water absorbing resin having a crosslinked surface, to mechanical stress. The quotient, X/Y, of absorbency under pressure before and after the application of an impact force (B) in the present invention is also a property value representing resistance of a crosslinked surface of a water absorbing resin having already had its surface crosslinked, i.e. a water absorbing agent, to mechanical stress.

Nevertheless, there is a difference in stress level between the mechanical stress applied to the surface crosslink of the water absorbing agent upon the application of the impact force (A) and the mechanical stress applied to the surface crosslink of the water absorbing agent upon the application of the impact force (B). In other words, the mechanical stress applied to the surface crosslink of the water absorbing agent upon the application of the impact force (A) is larger than the mechanical stress applied to the surface crosslink of the water absorbing agent upon the application of the impact force (B).

In the present invention, the impact force (A) applied to a water absorbing agent is preferably an impact force applied to 5 g of the water absorbing agent, that is a reaction product, sealed in a bag of 70 mm×100 mm by reciprocally moving a roller of 4 kg in weight placed on that bag ten times.

The following description will specifically explain the application of the impact force (A).

First, as shown in FIG. 11, 5.0 g of a water absorbing agent (not shown) is put in a plastic bag, 35, which is equipped with a zip fastener and which measures 70 mm×100 mm and 0.04 mm in thickness. The plastic bag 35 is then evacuated and the zip fastener is closed. The water absorbing agent is spread uniformly in the plastic bag 35. Thereafter a roller, 36, measuring 85 mm in diameter, 200 mm in length and 4 kg in weight is rolled 20 times (10 times reciprocally) on the plastic bag 35 to apply an impact force to the water absorbing agent in the plastic bag 35. The impact force (A) is defined as the impact force applied to the water absorbing agent by applying a predetermined weight to the water absorbing agent in this manner. A "Uni-pack C-4" (registered trademark) available from Seisan Nihonsha Co., Ltd. is suitably used as the plastic bag 35.

In the present invention, the impact force (B) applied to a water absorbing agent is preferably an impact force applied to 30.0 g of the water absorbing agent, that is a reaction product, by first putting the water absorbing agent in a container, 41, of a content volume of 225 g (see FIGS. 12 and 13) together with 10.0 g of glass beads of 6 mm in diameter and then elliptically vibrating the container 41 for a predetermined period of time in the following manner. The vibration is given to the container 41 for a predetermined period of time by shaking the container 41 so that the longitudinal center line of the container 41 inclines by 12.5° in the right and left directions respectively from the vertical line as shown in FIG. 13(a), so that container 41 is horizontally displaced by 8 mm backward and forward respectively from the stationary position thereof as shown in FIG. 13(b), and so that the rate of rotation combined with vibration is 750 c.p.m.

The following description will specifically explain the application of the impact force (B).

The container 41 used for application of the impact force (B) to the water absorbing agent is, as shown in FIG. 12, composed of a container body 41c, an inner lid 41b and an outer lid 41a. The container body 41c is made of transparent glass and measures approximately 10.8 cm in height, 6.2 cm in diameter, and 225 g in volume content. An example of such a container is a "mayonnaise bottle" (product name: A-29) available from Yamamura Glass Co., Ltd.

Glass beads made of soda lime glass for use in precision distillation filling, made to have a diameter of 5.9 mm to 6.4 mm and measuring approximately 6 mm in diameter, are suitably used as the above glass beads. The glass beads of 10.0 g correspond to about 31 to 33 pieces of such glass beads.

For the application of the impact force (B) to the water absorbing agent, 30.0 g of the water absorbing agent is put in the container body 41c of the container 41 together with 10.0 g of the glass beads, and then the inner lid 41b and the outer lid 41a are closed. The container 41 is then fixed to a dispersing apparatus (dispersing apparatus for experiment use No. 488 available from Toyo Seiki Co., Ltd.) 42 shown in FIG. 14 by being pinched between an upper clamp 43 and a lower clamp 44 provided to the dispersing apparatus 42, and is vibrated for 30 minutes at a vibration velocity of 750 c.p.m at 100 v/60 Hz. The container 41 fixed to the dispersing apparatus 42 thus inclines by 12.5° in the right and left directions respectively (by 25° in total) from a plane, 45, in which the upper and lower clamps 43 and 44 are fixed to the dispersing apparatus 42, and at the same time is shaken by 8 mm backward and forward respectively (by 16 mm in total), so as to apply an impact force to the water absorbing agent in the container 41.

Referring to FIG. 15, the following description will explain the vibration of the container 41. The locus of the vibration of the container 41 can be easily confirmed with a locus of a vertical line at any position of a bar 47 fixed to a clamp 46 (upper clamp 43 or lower clamp 44) perpendicularly to gravity. The vertical line at an arbitral position of the bar 47 fixed to the clamp 46 leaves the elliptic locus as shown in FIG. 15, as the bar 47 inclines by 12.5° in the right and left directions respectively and, at the same time moves by 8 mm backward and forward respectively from the stationary state thereof. In short, the container 41 is elliptically vibrated as shown in FIG. 15. The water absorbing agent in the container 41 is agitated by the glass beads sealed together with the water absorbing agent in the container 41, and at the same time receives an impact force as the water absorbing agent collides with itself, the glass beads, or the inner wall of the container 41 with strength in accordance with the vibration. The impact force (B) is defined as the impact force applied to the water absorbing agent by giving predetermined vibration to the water absorbing agent in this manner.

The impact forces (A) and (B) are determined from experiences as representative impact forces applied to the water absorbing agent in a manufacturing process. A method for measuring the absorbency under pressure will be described later in detail in connection with embodiments.

A water absorbing agent having subjected to surface treatment is typically evaluated with the absorbency under pressure. The absorbency under pressure alone is enough for evaluating the water absorbing characteristics of the water absorbing agent under pressure, but not enough for estimating the depth and uniformity of the surface crosslink, fragility of the surface, etc. Therefore, evaluation only with the absorbency under pressure is not enough for predicting the water absorbing characteristics degraded by mechanical stress produced in processes after the processing of the surface when a water absorbing agent having a crosslinked surface is to be manufactured or when a water absorbing product using the water absorbing agent is to be manufactured. As a result, conventionally, expected characteristics could not be obtained with an end product in some cases.

However, in the present invention, the resistance of a water absorbing agent having a crosslinked surface to mechanical stress can be evaluated and predicted by measuring either of the property values Q/P and Y/X as an impact resistance test of the water absorbing resin. Either of the property values Q/P and Y/X, or both of them may be measured depending on, for example, the amount of sample.

The inventors of the present invention have further found that the water absorbing agent prepared so that the property value Q/P satisfies the following conditions loses little of its excellent water absorbing characteristics, and maintains its excellent water absorbing performance with an end product, even if having received mechanical stress during, for example, transport in a manufacturing plant or processing by a user.

That is, the water absorbing agent of the present invention preferably has a property value Q/P of not less than 0.85, more preferably not less than 0.90, and most preferably not less than 0.95, in order to maintain its excellent water absorbing performance with a water absorbing product.

Besides, the water absorbing agent of the present invention preferably has a property value Y/X of not less than 0.90, more preferably not less than 0.92, and most preferably not less than 0.95, in order to maintain its excellent water absorbing performance with a water absorbing product.

And, the water absorbing agent of the present invention needs to show absorbency P of not less than 20 g/g, preferably not less than 25 g/g, and most preferably not less than 30 g/g, under pressure of 50 g/cm$^2$ before the application of the impact forces (A) or (B).

In addition, the water absorbing agent before crosslinking the neighborhood of the surface preferably shows absorbency to a saline solution of not less than 40 g/g, and more preferably not less than 45 g/g.

The following description will explain a manufacturing method and machine of the water absorbing agent.

Any water absorbing resin can be used for the manufacture of the water absorbing agent of the present invention as long as it contains a carboxyl group. However, the water absorbing resin is typically a conventionally known hydrogel-forming water absorbing resin that is obtained by polymerizing and crosslinking a hydrophilic monomer composed mainly of an acrylic acid and/or a salt thereof (neutralized product), and that absorbs as large an amount of water as 50 to 1000 times in ion exchange water. The water absorbing resin contains non-crosslinked water-soluble components in an amount of not more than 25 weight percent, preferably not more than 15 weight percent, and more preferably not more than 10 weight percent.

Examples of the salt of an acrylic acid include an alkaline metal salt, an ammonium salt, and an amine salt of an acrylic acid. The water absorbing resin is preferably composed of 10 mol percent to 40 mol percent of acrylic acid and 90 mol percent to 60 mol percent of salt of the acrylic acid (the total amount is set to 100 mol percent).

When a water absorbing resin is to be obtained by polymerizing a hydrophilic monomer having acrylic acid and/or salt thereof as major components, the hydrophilic monomer may contain a monomer other than the acrylic acids together with the acrylic acid and/or salt thereof if necessary.

Any monomer other than acrylic acid may be used. Examples include anionic unsaturated monomers such as methacrylic acid, maleic acid, vinyl sulfonic acid, styrene sulfonic acid, 2-(meth) acrylamide-2-methylpropane sulfonic acid, 2-(meth)acryloyl ethane sulfonic acid, and 2-(meth)acryloyl propane sulfonic acid, and salts of those anionic unsaturated monomers; nonionic-hydrophilic-group-containing unsaturated monomers such as acrylamide, methacrylamide, N-ethyl(meth)acrylamide, N-n-propyl(meth)acrylamide, N-isopropyl(meth) acrylamide, N,N-dimethyl(meth)acrylamide, 2-hydroxyethyl(meth)acrylate, 2-hydroxypropyl (meth) acrylate, methoxypolyethylene glycol (meth)acrylate, polyethylene glycol mono (meth) acrylate, vinyl pyridine, N-vinyl pyrrolidine, N-acryloyl piperidine, and N-acryloyl pyrrolidine; cationic unsaturated monomers such as N,N-dimethylaminoethyl(meth)acrylate, N,N-diethylaminoethyl (meth)acrylate, N,N-dimethylaminopropyl(meth)acrylate, and N,N-dimethylaminopropyl(meth)acrylamide, and quaternary salts thereof. Any one of the monomers may be used alone, or alternatively, a plurality of them can be used in combination.

In the present invention, if a monomer other than the acrylic acids is used, the monomer other than the acrylic acids is used in a ratio of not more than 30 mol percent and preferably in a ratio of not more than 10 mol percent to the total amount of acrylic acid and salt thereof used as major components. The use of the monomer other than the acrylic acids in that ratio allows the water absorbing resin obtained to have even better water absorbing characteristics and to be prepared at an even lower cost.

When the hydrophilic monomer having an acrylic acid or salt thereof as major components is polymerized to obtain a water absorbing resin used in the present invention, although it is possible to perform bulk polymerization, precipitation polymerization, or the like, it is preferable to perform reversed-phase suspension polymerization or water solution polymerization by using the hydrophilic monomer as a water solution because of the performance and simplicity in controlling polymerization.

The density of the monomer in the water solution in the case where the hydrophilic monomer is used as a water solution (hereinafter, will be referred to as a monomer water solution), although not restricted in a particular manner, is preferably in a range of 10 weight percent to 70 weight percent, and more preferably in a range of 20 weight percent to 40 weight percent. When reversed-phase suspension polymerization or water solution polymerization is performed, a solvent other than water may be used together as necessary, and the kind of the solvent used together is not restricted in a particular manner.

A radical polymerization initiator such as potassium persulfate, ammonium persulfate, sodium persulfate, t-butylhydroperoxide, hydrogen peroxide, or 2,2'-azobis(2-aminodipropane) dihydrochloride may be used to initiate the polymerization.

A reducing agent for accelerating the decomposition of the polymerization initiator may be used together with the polymerization initiator as a redox initiator. The reducing agent is not restricted in a particular manner. Examples include; a (bi)sulfite (salt), such as sodium sulfite, and sodium hydrogensulfite; L-ascorbic acid (salt); a reducing metal (salt) such as ferrous salt; and an amine.

The polymerization initiator is typically used in amounts ranging from 0.001 mol percent to 2 mol percent, and preferably in amounts ranging from 0.01 mol percent to 0.05 mol percent. If the polymerization initiator is used in an amount of less than 0.001 mol percent, a large amount of monomer is left unreacted, and therefore a larger amount of monomer is undesirably left in the obtained water absorbing resin. On the other hand, if the polymerization initiator is used in an amount of more than 2 mol percent, the amount of a water-soluble component in the obtained water absorbing resin undesirably increases.

The polymerization reaction may be initiated by irradiating the reaction system with an activated energy ray such as a radioactive ray, an electronic ray, or an ultraviolet ray, instead of by using the polymerization initiator. The reaction temperature in the polymerization reaction, although not restricted in a particular manner, is preferably in a range of 20° C. to 90° C. The reaction time, not restricted in a particular manner, is appropriately set according to, for instance, the kind of the hydrophilic monomer and the polymerization initiator, and the reaction temperature.

The water absorbing resin used in the present invention may be of a self-crosslinking type which does not require a crosslinking agent, but is more preferably a water absorbing agent obtained by copolymerizing or reacting an internal crosslinking agent containing a plurality of polymerizable unsaturated groups or a plurality of reactive groups.

Examples of the internal crosslinking agent include N,N-methylenebis(meth)acrylamide, (poly)ethylene glycol (meth)acrylate, (poly)propylene glycol di(meth)acrylate, trimethylolpropanetri(meth)acrylate, glyceroltri(meth) acrylate, glycerolacrylatemethacrylate, ethyleneoxide denatured tromethylolpropanetri(meth)acrylate, pentaerythritolhexa(meth)acrylate, triallylcyanurate, triallylisocyanurate, triallylphosphate, triallylamine, poly (meth)allyloxyalkane, (poly)ethylene glycol diglycidylether, glyceroldiglycidylether, ethylene glycol, polyethylene glycol, propylene glycol, glycerol, pentaerythritol, ethylenediamine, ethylenecarbonate, propylenecarbonate, polyethyleneimine, and glycidyl(meth)acrylate.

Any one of the internal crosslinking agents may be used alone, or alternatively, a plurality of them can be used in combination. The whole amount of the internal crosslinking agent may be added to the reaction system at one time, or divided and added at several times. When a plurality of the internal crosslinking agents are used, a compound containing a plurality of polymerizable unsaturated groups is suitably used always, taking, for example, the water absorbing characteristics of the obtained water absorbing resin into account. The internal crosslinking agent is suitably used in an amount ranging from 0.005 mol percent to 2 mol percent, and more preferably in an amount ranging from 0.01 mol percent to 1 mol percent, to the hydrophilic monomer. If the internal crosslinking agent is used in an amount of less than 0.005 mol percent or in an amount of more than 2 mol percent, the resultant water absorbing resin may possibly not have desired water absorbing characteristics.

If the internal crosslinking agent is used to introduce a crosslinking structure to the inside of the water absorbing resin, the internal crosslinking agent should be added to the reaction system during or after the polymerization of the hydrophilic monomer, or after the polymerization of the hydrophilic monomer and neutralization.

For that polymerization, a foaming agent such as (hydrogen) carbonate, carbon dioxide, an azo compound, or an inert organic solvent; a hydrophilic polymer compound such as starch, cellulose, derivative of starch, derivative of cellulose, polyvinyl alcohol, polyacrylic acid, polyacrylate salt, a crosslinked polyacrylic acid, and crosslinked polyacrylate salt; a surface active agent; a chain transfer agent such as hypophosphorous acid and a hypophosphite may be added to the reaction system.

If the resultant polymer of the polymerization reaction is gel, the gel polymer is adjusted in size by being dried and, if necessary, by being ground, so as to have an average particle diameter of 10 μm to 1000 μm, preferably of 50 μm to 800 μm, if the aqueous liquid contains a crosslinking agent that can react with a carboxyl group, preferably of more than 75 μm to not more than 600 μm, and especially preferably of more than 150 μm to not more than 500 μm. The particles of the water absorbing resin obtained in the manner may have any shape. However, preferably, the particles have an irregular pulverized shape after being subjected to a grinding process, because the present invention could produce its effects more efficiently.

The water absorbing resin obtained with the above method preferably exhibits absorbency to a saline solution as high as not less than 40 g/g, and in particular, not less than 45 g/g, since the present invention could produce its effects more efficiently in mixing an aqueous liquid. However, the absorbency is, of course, adjusted appropriately according to the purpose. The present invention can be suitably applied to a water absorbing resin exhibiting absorbency as high as not less than 45 g/g to which it has been conventionally difficult to uniformly add an aqueous liquid.

In the present invention, the carboxyl-group-containing water absorbing resin obtained in the above polymerization is mixed with an aqueous liquid, using a particular continuous extruding type mixer. The aqueous liquid may be, for example, water; a water solution of a water-soluble compound such as a salt, a surface active agent, a deodorant, an antibacterial agent, or a water-soluble polymer compound; a hydrophilic organic solvent in which that water-soluble compound is dissolved. However, in order to obtain the water absorbing agent in accordance with the present invention, the aqueous liquid needs to be either a crosslinking agent that can react with a carboxyl group or a processing liquid containing such a crosslinking agent. That is, the water absorbing agent of the present invention can be obtained by mixing and reacting a water absorbing resin containing a carboxyl group with a crosslinking agent that can react with the carboxyl group.

The crosslinking agent is preferably a known surface crosslinking agent that can react with a carboxyl group and that is usually used for that purpose. Examples of such a surface crosslinking agent include a polyhydric alcohol compound such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerol, polyglycerol, 2-butane-1,4-diol, 1,4-butanediol, 1,5-pentanediol, 1.6-hexanediol, 1,2-cyclohexanedimethanol, 1,2-cyclohexanol, trimethylolpropane, diethanolamine, triethanolamine, polyoxypropylene, an oxyethyleneoxypropylene block copolymer, pentaerythritol, or sorbitol; an epoxy compound such as ethylene glycol diglycidylether, polyethylenediglycidylether, glycerol polyglycidylether, diglycerol polyglycidylether, polyglycerol polyglycidylether, propylene glycol diglycidylether, polypropylene glycol diglycidylether, or glycidol; a polyfunctional amine compound such as ethylenediamine, diethylenetriamine, triethylenetetramine, tetraethylenepentamine, pentaethylenehexamine, or polyethyleneimine; an inorganic salt of that polyfunctional amine compound; an organic salt of that polyfunctional amine compound (e.g., azetidinium); a polyfunctional isocyanate compound such as 2,4-tolylenediisocyanate, or hexamethylenediisocyanate; a polyfunctional oxazoline compound such as 1,2-ethylenebisoxazoline; an alkylene carbonate compound such as 1,3-dioxolane-2-on, 4-methyl-1,3-dioxolane-2-on, 4,5-dimethyl-1,3-dioxolane-2-on, 4,4-dimethyl-1,3-dioxolane -2-on, 4-ethyl-1,3-dioxolane-2-on, 4-hydroxymethyl-1,3-dioxolane-2-on, 1,3-dioxane-2-on, 4-methyl-1,3-dioxane-2-on, 4,6-dimethyl-1,3-dioxane-2-on, or 1,3-dioxopane-2-on; a haloepoxy compound such as epichlorohydrin, epibromohydrin, or α-methylepichlorohydrin; an addition product of a polyamine to that haloepoxy compound (e.g., Kymene; registered trademark of Hercules Incorporated); or a polyvalent metal compound such as a hydroxide of or a chloride of zinc, calcium, magnesium, aluminum, iron, zirconium, or the like. Any one of the surface crosslinking agents may be used alone, or alternatively, a plurality of them can be used in combination. Among the surface crosslinking agents, at least one kind of compound selected from the group consisting of the polyhydric alcohol compounds, the epoxy compounds, the polyfunctional amine compounds, salts of those compounds, and alkylene carbonate compounds is preferred.

According to a manufacturing method of the above water absorbing agent, as the inventors of the present invention have suggested in Japanese Laid-Open Patent Applications No. 6-184320/1994 (Tokukaihei 6-184320, U.S. Pat. No. 5,422,405), if the crosslinking agent that can react with a carboxyl group is composed of a combination of a first surface crosslinking agent and a second surface crosslinking agent having a different solubility parameter (SP value) from each other, a water absorbing agent having even better absorbency under pressure can be obtained. The solubility parameter is a value widely used as a factor indicating the polarity of a compound. The solubility parameters, $\delta$ (cal/cm$^3$)$^{1/2}$, of solvents described in *Polymeer Handbook*, 3rd edition (Published by Wiley Interscience Publication), page 527–539 are employed as the solubility parameters in the present invention. The solubility parameters of solvents not included in those pages are obtained, and employed as the solubility parameters, by substituting Hoy's aggregation energy constant described in page 525 of Polymer Handbook into Small's equation described in page 524 of the same book.

The first surface crosslinking agent is preferably a compound that can react with a carboxyl group and that has a solubility parameter of not less than 12.5 (cal/cm$^3$)$^{1/2}$, and more preferably of not less than 13.0 (cal/cm$^3$)$^{1/2}$.

The second surface crosslinking agent is preferably a compound that can react with a carboxyl group and that has a solubility parameter of not less than 12.5 (cal/cm$^3$)$^{1/2}$, and more preferably in a range of 9.5 (cal/cm$^3$)$^{1/2}$ to 12.0 (cal/cm$^3$)$^{1/2}$.

The crosslinking agent, although used in various amounts depending on, for example, the compound used and the combination of the compounds used, is preferably used in an amount ranging from 0.001 part by weight to 10 parts by weight, and more preferably in an amount ranging from 0.01 part by weight to 5 parts by weight, per 100 parts by weight of the solid component of the water absorbing resin.

The use of the crosslinking agent can make the density of the crosslink higher near the surface of the water absorbing resin than inside the water absorbing resin. If more than 10 parts by weight of the crosslinking agent is used, not only a substantial amount of it is wasted, but also the crosslinking agent is supplied in excess to form an optimum crosslinking structure for the water absorbing agent, which is not preferred. On the contrary, if less than 0.001 part by weight of the crosslinking agent is used, for example, the absorbency under pressure of the water absorbing agent is not enough improved, which is not preferred.

In the present invention, when the water absorbing resin and the crosslinking agent are mixed, water is preferably used as a solvent. Water, although used in various amounts depending on, for example, the kind, particle diameter, and water content of the water absorbing resin, is preferably used in an amount ranging from more than 0 part by weight to not more than 20 parts by weight, and more preferably in an amount ranging from 0.5 part by weight to 10 parts by weight, per 100 parts by weight of the solid component of the water absorbing resin. If an aqueous liquid is added for a purpose other than the crosslinking of the surface, approximately not more than 400 parts by weight of the water normally realizes satisfactorily uniform mixing.

Conventionally, in order to mix water as much as about 70 to 400 parts by weight, methods other than granulation requires ① a powerful mixer creating shearing force or ② grinding the mass of gel created in monolith in mixing, whereas granulation requires ③ water-insoluble inorganic fine particles, a water-soluble polymer compound, a hydrophilic organic solvent, a surface active agent, etc. as mixing auxiliary agents. These methods degrade, for example, the properties and granulation strength, and are not preferred in terms of costs. By contrast, the present invention, as well as being free from these problems, requires no grinding process of the gel and no addition of the mixing auxiliary agents that degrade the properties, because the water absorbing resin is directly granulated into the water-containing gel-like granulation product by being mixed with the aqueous liquid, which is a major difference from the conventional methods.

When the water absorbing resin and the crosslinking agent are mixed, a hydrophilic organic solvent (aqueous liquid) may be used as a solvent as necessary. Examples of the hydrophilic organic solvent include lower alcohols such as methyl alcohol, ethyl alcohol, n-propyl alcohol, isopropyl alcohol, n-butyl alcohol, isobutyl alcohol, and t-butyl alcohol; ketones such as acetone; an ether such as dioxane, tetrahydrofuran, or methoxy(poly)ethylene glycol; amides such as ε-caprolactam, or N,N-dimethylformamide; or a sulfoxide such as dimethylsulfoxide. The hydrophilic organic solvent, although used in various amounts depending on, for example, the kind, particle diameter, and water content of the water absorbing resin, is used preferably in an amount of not more than 20 parts by weight, and more preferably in an amount ranging from 0.1 part by weight to 10 parts by weight, per 100 parts by weight of the solid component of the water absorbing resin. An inorganic acid, an organic acid and a polyamino acid disclosed in European Patent No. 0,668,080 may be also present.

In the present invention, the mixing of the water absorbing resin and the crosslinking agent is performed with a particular high-speed agitation type mixer of a continuous extruding method that composes a manufacturing machine of the water absorbing agent and that is used for the manufacture of the water absorbing agent. The configuration of the high-speed agitation type mixer of a continuous extruding method, and the mixing of the water absorbing resin and the crosslinking agent with the high-speed agitation type mixer of a continuous extruding method will be described later in detail.

The water absorbing resin mixed with the crosslinking agent, using the high-speed agitation type mixer of a continuous extruding method receives heat treatment as necessary so as to crosslink the neighborhood of the surface of the water absorbing resin. The water absorbing agent is obtained in this manner. In this case, preferably the heat treatment is performed in order to react the crosslinking agent with the water absorbing resin near the surface of the water absorbing resin, the reactivity of the crosslinking agent, the simplicity and productivity of the manufacturing machine taken into account.

The treatment temperature during the heat treatment of the mixture of the water absorbing resin and the crosslinking agent, although being appropriately determined according to the kind of the crosslinking agent and the desired density of the crosslink and not restricted in a particular manner, is preferably not less than 80° C., and more preferably in a range of 100° C. to 250° C., and even more preferably in a rage of 120° C. to 210° C. If the treatment temperature is lower than 80° C., the heat treatment takes a long time, the productivity decreases, uniform surface crosslink is not obtained, the water absorbing characteristics under pressure of the resultant water absorbing agent is likely to deteriorate, and some of the crosslinking agent is likely to be left unreacted.

The heat treatment can be performed with an ordinal drying device or a heating furnace. The drying device is not restricted in a particular manner. Examples of the drying device include a channel type mixing and drying device, a rotary drying device, a desk drying device, a fluidized bed drying device, an air current type drying device, and a infrared ray drying device.

The following description will explain structures of the high-speed agitation type mixer of a continuous extruding method used in the present invention, as well as a mixing method of the water absorbing resin and the crosslinking agent, using the mixer of a continuous extruding method.

A mixer of a continuous extruding method in accordance with the present invention, for mixing a water absorbing resin containing a carboxyl group with an aqueous liquid containing, for example, a crosslinking agent that can react with the carboxyl group, is so configured as to include at least one kind of agitating member, disposed around a rotational shaft inside a fixed cylinder, for applying a thrusting force to the water absorbing resin. In the mixer of a continuous extruding method, the agitating member is provided so as to form a first area as a dispersion area in which the water absorbing resin supplied into the fixed cylinder is dispersed and so as to form, in the ejection side of the first area, a second area as a mixing area in which the aqueous liquid is mixed with the water absorbing resin having been dispersed in the dispersion area.

Besides, in the present invention, the agitating member, for forming the dispersion area and the mixing area, is so provided as to form in the ejection side a second area in which a thrusting force is weaker than that in the first area in which the water absorbing resin supplied into the fixed cylinder is dispersed.

In other words, the agitating member is designed to form areas inside the fixed cylinder, in which the water absorbing resin receives different thrusting forces, by adjusting, for example, its shape, arrangement density, position, and an angle formed by its water-absorbing-resin-extruding face and a plane perpendicular to the rotational shaft (or an angle formed by its water-absorbing-resin-extruding face and a plane parallel to a direction of the rotational shaft that is the water-absorbing-resin-thrusting direction). The water-absorbing-resin-extruding faces of the agitating blade is a face which applies to the water absorbing resin a thrusting force parallel to the rotational shaft.

The mixer of a continuous extruding method is designed in the first area thereof to disperse the water absorbing resin supplied into the fixed cylinder by applying an enough thrusting force to the water absorbing resin towards the inside of the mixer of a continuous extruding method. The mixer of a continuous extruding method is designed in the second area thereof to lower the average speed of the water absorbing resin that moves as being thrust and thus set aside an enough time for mixing and agitating the water absorbing agent and the aqueous liquid by applying a weaker thrusting force than that in the first area, and at the same time to quickly and uniformly mix the water absorbing resin and the aqueous liquid dispersed in the first area.

By contrast, a conventional high-speed agitation type mixer of a continuous extruding method used for mixing a water absorbing resin with an aqueous liquid that contains, for example, a crosslinking agent or a processing liquid containing a crosslinking agent has such a configuration that a plurality of agitating blades of the same shape are provided around the rotational shaft with the same intervals between them and the blade faces face the same direction. That is, the conventional mixer of a continuous extruding method (U.S. Pat. No. 5,140,076), creating a thrusting force of only one strength therein, can neither uniformly let an aqueous liquid adhere to a water absorbing resin nor uniformly mix an aqueous liquid with a water absorbing resin. For these reasons, a water absorbing agent obtained by mixing with the conventional mixer of a continuous extruding method cannot be uniformly crosslinked at the surface thereof with a processing liquid, failing to maintain water absorbing characteristics with an end product.

On the other hand, the mixer of a continuous extruding method in accordance with the present invention, in which the agitating member (e.g., agitating blade) is provided so as to have a mixing area in the ejection side of the dispersion area, mixes a water absorbing resin with an aqueous liquid by way of a plurality of agitation states. As a result, the water absorbing resin containing a carboxyl group is efficiently and uniformly mixed with the aqueous liquid containing, for example, a crosslinking agent that can react with the carboxyl group. Note that the mixer of a continuous extruding method mentioned in the following description represents the mixer of a continuous extruding method in accordance with the present invention, unless otherwise stated.

In the present invention, measurement of the thrusting force, not restricted in a particular manner, can be carried out with various methods: for example, ① a method of measuring the air velocity, current or the like created in the above areas by the agitating member, ② a method of measuring pressure applied to a cross section of the fixed cylinder, and ③ a method of measuring through calculation from, for example, an angle formed by the water-absorbing-resin-extruding face of the agitating member and the plane perpendicular to the rotational shaft in the above areas.

The agitating member is not restricted in a particular manner in, for example, its shape and arrangement, as long as it can provide such areas that the thrusting force is weaker in the ejection side of the water absorbing resin than in the supply side of the water absorbing resin.

The agitating member may be a single continuous agitating member of a screw-blade-like shape (agitating blade) which is used in, for example, a screw conveyor, and may be composed of a plurality of independently provided agitating members (agitating blades) of, for example, a blade-like shape.

The plurality of agitating members may be of the same shape or a plurality of different shapes.

Such a mixer of a continuous extruding method has, for example, such a configuration that a plurality of first agitating members are provided to apply a thrusting force to the water absorbing resin, and a plurality of second agitating members are provided in the ejection side of the plurality of first agitating members so as to form an area in which the thrusting force is weaker than that in an area in which the plurality of first agitating members are provided.

In this case, the plurality of first agitating members are preferably formed in a plate-like shape as a shape to apply a thrusting force to the water absorbing resin. In addition, the plurality of second agitating members are preferably formed, for example, in a column-like shape as a shape to make the thrusting force in an area in which the plurality of second agitating members are provided weaker than the thrusting force in the area in which the plurality of first agitating members are provided, and to surely carry out enough mixing and agitation.

In this manner, if the second agitating members are formed in a column-like shape, a thrusting force is generally not created. Therefore, the thrusting force applied to the water absorbing resin in an area in which the second agitating members are provided is the thrusting force generated by the first agitating members (however, in this case, the thrusting force gradually decreases). As a result, the thrusting force is smaller in the area in which the second agitating members are provided than in the area in which the first agitating members are provided, and so is the average speed of the water absorbing resin that moves as being thrust. Consequently, the water absorbing resin is efficiently mixed with the aqueous liquid by the second agitating members.

However, in a case that the second agitating members are formed in a column-like shape, although the second agitating members do not generate a thrusting force alone, if the second agitating members are provided in plurality and if the intervals in arranging the second agitating members are narrow enough, the thrusting force of a water-absorbing-resin-ejection direction is in some cases larger than that in the opposite direction, depending upon the arrangement thereof. In these cases, a thrusting force of a water-absorbing-resin-ejection direction is generated.

That is, the plurality of second agitating members only need to be formed so as to generate a weaker thrusting force in the area in which the plurality of second agitating members are provided than in the area in which the plurality of first agitating member are provided. Such a mixer of a continuous extruding method has, for example, such a configuration around the rotational shaft that the plurality of first agitating members are provided in the side to which the water absorbing resin is supplied and are formed in such a shape to generate a thrusting force, and the plurality of second agitating members are provided in the ejection side of the plurality of first agitating members and are formed in such a shape to generate a weaker thrusting force than do the plurality of first agitating members.

In this case, the plurality of first and second agitating members are preferably formed in a plate-like shape as a shape to generate a thrusting force. However, the plurality of second agitating members are preferably formed in a shape that has a smaller area than that of the plurality of first agitating members so as to generate a weaker thrusting force than do the plurality of first agitating members.

The agitating members disposed in the respective areas are not necessarily of one kind. For instance, by providing the first agitating members and the second agitating members in a mixed manner in the second area, the thrusting force thereof may be adjusted. More specifically, By providing agitating members having a column-like shape and agitating members having a plate-like shape in a mixed manner in the second area, a thrusting force is obtained in accordance with the number of the agitating members of a plate-like shape arranged in the second area and the way they are disposed in the second area.

Moreover, the plurality of agitating members of the mixer of a continuous extruding method are preferably spirally arranged in a row. This ensures an enough thrusting force and smoothly extrudes a water absorbing resin and the like.

Meanwhile, if a single agitating member of a screw-blade-like shape (agitating blade) is used as the agitating member, the agitating member can form areas having different thrusting forces in the fixed cylinder by being so configured that a notch or aperture is made in the portion thereof which is to serve as a second area, or that the blade gradually narrows in the portion thereof which is to serve as a second area.

Moreover, the mixer of a continuous extruding method may be configured, for example, so that in order to form areas applying different thrusting forces to a water absorbing resin, at least one kind of agitating member is disposed so as to have a water-absorbing-resin-extruding face which forms different angles with a plane perpendicular to the rotational shaft in the first area and in the second area. Hereinafter the angles will be in some cases simply referred to as angles or angles of the water-absorbing-resin-extruding faces.

More specifically, angles formed by a water-absorbing-resin-extruding face of the agitating member and a plane perpendicular to the rotational shaft can be varied in the first area and in the second area by, for example, ① in a case that an agitating blade is used as the agitating member, changing the direction of the blade face of the agitating blade in the first area and in the second area ② when the agitating blade is spirally arranged, changing the inclination of the spiral in the first area and in the second area, or ③ changing the mounting angle of the agitating member to the rotational shaft in the first area and in the second area.

In this case, in order to generate a thrusting force with the agitating member, the agitating member only needs to be disposed so that the water-absorbing-resin-extruding face inclines with respect to the plane perpendicular to the rotational shaft (in other words, so that the water-absorbing-resin-extruding face inclines with respect to the plane parallel to a direction of the rotational shaft that is a water-absorbing-resin-ejecting direction).

However, in the present invention, the agitating member only needs to have an agitating function by being provided in singularity or in plurality. The agitating member does not necessarily have the shape nor angle with which all the agitating member provided in the fixed cylinder can generate a thrusting force, as long as the agitating member has a shape and an angle with which the agitating member can generate a thrusting force in the first area.

In the second area, the thrusting force of a water-absorbing-resin-ejection direction only needs to be smaller in the second area as a whole than in the first area. Although depending upon the strength of the thrusting force in the first area, for example, the angle of the agitating member in the second area may be set to an angle with which a thrusting force is not generated or to an angle with which a thrusting force of a direction opposite to the water-absorbing-resin-ejection direction is generated as long as the water absorbing resin can be extruded toward the ejection side.

The mixer of a continuous extruding method may be configured, for example, so that in order to form areas applying different thrusting forces to a water absorbing resin, at least one kind of agitating member is provided so as to have different arrangement densities in the first area and in the second area.

In this case, the thrusting force in the second area can be made smaller than that in the first area by, for example, making the intervals in arranging the agitating member in the second area broader than those in the first area, or providing a smaller number of agitating members to the second area than to the first area.

The methods of varying the thrusting force by changing the arrangement density or by changing the angle formed by the water-absorbing-resin-extruding face of the agitating member and the plane perpendicular to the rotational shaft in the first area and in the second area is especially useful, for example, when the agitating members of the same shape are used both in the first area and in the second area.

When a single agitating blade of a screw-blade-like shape is used as the agitating member, if the pitch is determined, the arrangement density and the fixing angle (the angle formed by the water-absorbing-resin-extruding face and the plane perpendicular to the rotational shaft) are automatically determined.

In the present invention, the thrusting force in the first and second areas can be adjusted in various manners by combining the configurations explained so far.

In the present invention, the fixed cylinder of the mixer of a continuous extruding method preferably has an inner surface that practically has a contact angle of not less than about 60° to water and is composed of a base material exhibiting a heat deformation temperature of not less than about 70° C.

If the contact angle of the base material to water is less than 60°, a water-containing water absorbing resin adheres to the inner surface of the fixed cylinder in a larger amount, and as a result the water absorbing resin and an aqueous liquid is not uniformly mixed. Meanwhile, if the heat deformation temperature of the base material is less than 70° C., the base material cannot endure the heat generated during mixing, and in some cases stable mixing therefore cannot be continued, which needs caution.

In the present invention, the mixer of a continuous extruding method preferably has a ratio of a diameter of the rotational shaft to an inside diameter of the fixed cylinder in a range of 0.4 to 0.6.

If the ratio is less than 0.4, in the second area, the water absorbing resin and the aqueous liquid may possibly not be mixed well by the agitating blades when mixed. By contrast, if the ratio is more than 0.6, it is difficult to smoothly extrude the water absorbing resin out of the fixed cylinder, and in some cases stable mixing therefore cannot be continued, which needs caution.

In the present invention, the mixer of a continuous extruding method is preferably configured so that the water absorbing resin particles containing a carboxyl group are supplied to the first area, and the aqueous liquid is supplied to the second area and preferably to a boundary area between the first and second areas.

That is, when the water absorbing resin and the aqueous liquid are mixed, they need to be wholly brought into contact with each other in as short a time as possible. Therefore, if the contact is not enough, aggregation mass or so-called concretion is produced, reducing uniformity of the mixture. On the other hand, the mixer of a continuous extruding method in accordance with the present invention carries out high-speed agitation and mixing of the water absorbing resin and the aqueous liquid in an instant, by moving the water absorbing resin into the mixer of a continuous extruding method with the agitating member disposed in the first area, and then supplying and introducing the aqueous liquid to the second area, or preferably to the boundary area between the first and second areas. Therefore, the mixer of a continuous extruding method can mix the water absorbing resin and the aqueous liquid uniformly enough without creating concretion.

In the present invention, when the water absorbing resin moves from the first area to the second area, the thrusting force applied to the water absorbing resin preferably changes as greatly as possible, instead of gradually according to distance from the supply port for the water absorbing resin.

That is, as the aqueous liquid is supplied and introduced into the fixed cylinder, the aqueous liquid adheres to the surface of the water absorbing resin dispersed in the first area. However, if the thrusting force is still high even after the aqueous liquid adheres, the water absorbing resin may be extruded before being mixed well by the agitating member.

Therefore, to perform uniform mixing, it is preferred ① to carry out mixing as quickly as possible before the aqueous liquid having adhered to the surface of the water absorbing resin is absorbed by the water absorbing resin, and ② to efficiently carry out the mechanical mixing by the agitating member and the inner surface of the fixed cylinder and to set aside enough time for mixing and agitation the water absorbing resin and the aqueous liquid by reducing the average speed of the water absorbing resin that moves as being thrust and, preferably, letting the water absorbing resin stay on the bottom wall in the fixed cylinder.

Therefore, in the present invention, the agitating member is preferably provided so that the thrusting force changes as greatly as possible between the first and second areas, by combining the above configurations in accordance with the kind, quantity, etc. of the water absorbing resin to be used.

Moreover, in the present invention, in some cases, the thrusting force for ejection is enough ensured and the ejection is suitably carried out, by providing more first agitating members in the ejection side of the second agitating members.

That is, a third area may be provided in the ejection side of the first area as a dispersion area and the second area as a mixing area. The third area serves as a mixture extrusion area for applying, to a mixture of a water absorbing resin and an aqueous liquid obtained by mixing and agitating the water absorbing resin and the aqueous liquid in the second area, a thrusting force for extruding the mixture out of the mixer of a continuous extruding method.

An agitating member is provided in the third area to generate a thrusting force of a water-absorbing-resin-ejection direction in accordance with the position of the ejection port, in order to efficiently extrude the mixture out of the mixer of a continuous extruding method.

Moreover, the mixer of a continuous extruding method may be configured so that the first and second areas are interchangeably provided under certain conditions including the kind of a water absorbing resin to be used.

In the present invention, the rotation rate of the rotational shaft, i.e., the rotation rate of the agitating member, although variable depending on, for example, the kind and amount of the water absorbing resin and of the aqueous liquid to be used and viscosity of the mixture obtained, is preferably set to be in a range of 10 rpm to 5000 rpm, more preferably in a range of 200 rpm to 4000 rpm, and even more preferably in a range of 500 rpm to 3000 rpm.

If the rotation rate is too small, the water absorbing resin is moved too slowly and too much of the water absorbing resin stays in the fixed cylinder, which may cause the water absorbing resin and the aqueous liquid to be non-uniformly mixed. By contrast, if the rotation rate is too large, it becomes difficult to set aside an enough time for mixing and agitating the water absorbing agent and the aqueous liquid, which may cause the water absorbing agent and the aqueous liquid to be ejected before being well mixed.

The present invention, capable of uniformly mixing a water absorbing resin containing a carboxyl group with an aqueous liquid containing, for example, a crosslinking agent that can react with the carboxyl group in this manner, can uniformly crosslink the neighborhood of the surface of the water absorbing resin to an appropriate depth.

Consequently, the water absorbing agent obtained with the above-described manufacturing method has excellent water absorbing characteristics, especially, excellent absorbency under pressure, in comparison with a water absorbing agent obtained with a conventional mixer.

As described above, the water absorbing agent in accordance with the present invention has $P \geq 20(g/g)$, and $Q/P \geq 0.85$ where P and Q respectively represent absorbency of the water absorbing agent under pressure of 50 g/cm² before and after applying an impact force (A) to the water absorbing agent by putting a predetermined load on the water absorbing agent.

Besides, the water absorbing agent in accordance with the present invention has $X \geq 20(g/g)$, and $Y/X \geq 0.90$ where X and Y respectively represent absorbency of the water absorbing agent under pressure of 50 g/cm² before and after applying an impact force (B) to the water absorbing agent by giving predetermined vibration to the water absorbing agent.

Therefore, the present invention can offer a water absorbing agent capable of always maintaining its high water absorbing performance even after, for example, being transported in a manufacturing plant or being processed into an end product by a user, and of always exhibiting excellent characteristics regardless of how it is used in the end product.

In the present invention, the manufacture of the water absorbing agent is performed with a particular mixer of a continuous extruding method having an excellent mixing capability.

A manufacturing method of a water absorbing agent with a conventional mixer needs to, for example, narrow the distribution of the particle diameters of the water absorbing resin, and to control the amount of particles having a diameter of not more than 150 μm, i.e. water absorbing resin fine particles (hereinafter, will be referred simply to as fine particles in some cases), to be in a specific range, in order to more uniformly mix a water absorbing resin and an aqueous liquid. On the other hand, the present invention, without performing such control of the particle diameters strictly, can always exhibit an excellent mixing capability. Therefore, even if the fine particles having a particle diameter of not more than 150 μm are contained in a large amount, the present invention can still improve various characteristics including the absorbency under pressure.

As described above, the present invention does not necessarily need to control the particle diameters strictly. However, for the purpose of, for example, improving simplicity in handling and even further improving various properties, the water absorbing resin containing fewer fine particles and hence having a narrow distribution of the particle diameters may be used as a raw material for a water absorbing resin, by classifying and removing the fine particles produced in a manufacturing process of the water absorbing resin, more specifically, the fine particles having a particle diameter of not more than 150 μm, especially of not more than 75 μm.

The fine particles removed in the present invention can be collected and recycled as a raw material for the water absorbing agent instead of being dumped, by being granulated with the mixer of a continuous extruding method. That is, the mixer of a continuous extruding method can be used for granulation as well as surface crosslinking of the water absorbing resin in the manufacture of the water absorbing agent.

By using a water absorbing resin obtained with granulation and having a large surface area (water absorbing resin granulation product) as a raw material for a water absorbing agent, a water absorbing agent containing a granulation product having a large surface area (crosslinked granulation product) obtained by crosslinking the water absorbing resin granulation product can be obtained. In the present invention, although the fine particles removed in a manufacturing process of the water absorbing resin may be used for the granulation, fine particles may be purposefully produced by adjusting conditions for the grinding or the polymerization for the purpose of improving the absorbing rate. Besides, in the present invention, the water absorbing resin containing the fine particles may be directly crosslinked without having the fine particles removed, and then a water absorbing agent containing the fine particles thus produced may be further granulated.

That is, a water absorbing agent of even a better absorbing rate can be obtained by letting the water absorbing resin used in the present invention include a crosslinked granulation product having a large surface area.

The following description will explain a method for granulating a water absorbing resin and a method for manufacturing a water absorbing agent using that granulating method. In the present invention, either only fine particles (e.g., having particle diameters of not more than 150 μm) or a water absorbing resin containing such fine particles may be used as the water absorbing resin used in granulation as a raw material for a water absorbing agent. As described above, the fine particles may be either classified in a manufacturing process of the water absorbing agent from a mixture (i.e., the water absorbing resin obtained after the polymerization process) of the fine particles and a water absorbing resin having larger particle diameters than the fine particles or intentionally produced by adjusting conditions for the grinding or the polymerization for the purpose of improving the absorbing rate. The surface of the water absorbing resin used in granulation may be either crosslinked or not.

When the water absorbing resin or the water absorbing resin fine particles are granulated, an aqueous liquid, especially water, is preferably used as a binder. When the water absorbing resin is granulated, the aqueous liquid as a binder, although used in various amounts depending on, for example, the kind, particle diameter, and water content of the water absorbing resin, is preferably used in an amount ranging from more than 0 part by weight to not more than 400 parts by weight, per 100 parts by weight of the water absorbing resin. A water absorbing agent of a high absorbing rate can be obtained by using a water absorbing resin granulation product or a water absorbing resin containing a water absorbing resin granulation product as a raw material for a water absorbing agent.

In addition, the inventors of the present invention have found that in order to obtain a water absorbing agent of excellent granulation strength so that an end product can always exhibit excellent properties, be used in any manner, and always exhibit excellent characteristics, the aqueous liquid as a binder is preferably used in an amount of not less than 70 parts by weight, to be more specific, in an amount ranging from 70 parts by weight to 400 parts by weight, more preferably in an amount ranging from 80 parts by weight to 200 parts by weight, and most preferably in an amount ranging from 100 parts by weight to 180 parts by weight, per 100 parts by weight of the water absorbing resin, in terms of properties, granulation strength and mixing.

If the aqueous liquid is used in an amount of more than 400 parts by weight, the granulation strength does not improve in return for an increased amount of the aqueous liquid added, which is disadvantageous in terms of drying cost. Also if the aqueous liquid is used in an amount of more than 400 parts by weight, there is a possibility that the mixer of a continuous extruding method in accordance with the present invention may not be able to prevent decline in properties and to uniformly mix the water absorbing resin and the aqueous liquid (binder). The aqueous liquid contains not less than 90 weight percent of water, preferably not less than 99 weight percent, more preferably 99 weight percent to 100 weight percent, and especially preferably contains nothing but water in terms of properties, granulation strength, and the like.

By contrast, if the aqueous liquid is used in an amount of less than 70 parts by weight, an enough granulation strength is not obtained, which possibly causes the water absorbing agent not to be capable of always exhibiting excellent characteristics regardless of how it is used in the end product. Especially, if the aqueous liquid is used in too small an amount, not only is the granulation strength likely to be not satisfactory, but also the viscosity of the obtained water-containing gel-like granulation product becomes strong. For example, if water is added in a range from 30 parts by weight to 65 parts by weight, the water-containing gel-like granulation product adheres to the inner surface of the fixed cylinder of the mixer, and becomes likely to aggregate with itself. Therefore, despite the reduction in amount of water used, the drying becomes troublesome, which needs caution.

That is, in order to improve the granulation strength, the aqueous liquid needs to be added in an amount not less than a predetermined amount to the water absorbing resin.

However, conventionally, even if the above-described high-speed agitation type mixer (U.S. Pat. No. 5,002,986 and U.S. Pat. No. 4,734,478), the particular spray continuous granulating apparatus (U.S. Pat. No. 5,360,148), or the fluidized bed (European Patent No. 05,342,899) is used as an apparatus for mixing an aqueous liquid for granulation, the aqueous liquid can uniformly and stably added only in an amount of no more than about 30 parts by weight to 100 parts by weight of the water absorbing resin due to the problems of the mixers.

As for methods other than the granulation method, the shearing mixer (European Patent No. 0,417,761), the nauta mixer (U.S. Pat. No. 4,950,692), or the like is used for mixing the fine particles and the aqueous liquid. They are capable of adding and mixing an aqueous liquid of as much as 100 parts by weight or even more with the strong shearing force; however, the mixture obtained, becoming a monolith, is not granulated. Also, if too large a force is used in mixing, the shearing force will degrade the water absorbing resin.

Generally, if an aqueous liquid is added to the water absorbing resin in an amount exceeding 60 parts by weight, the water absorbing resin becomes a water-containing gel. In this case, since the shearing mixer mixes the water absorbing resin and the aqueous liquid with its shearing force, the obtained water-containing gel is a continuous and huge monolithic gel-like product, not a particle-like granulation product (aggregation product). Therefore, the water-containing gel has a smaller surface area, and could not be dried without further processing. Generally, the gel needs to be ground with shearing (U.S. Pat. No. 4,950,692). Therefore, there is a problem of decrease in absorbing rate. Also, the grinding process degrades the water absorbing resin granulation product.

According to a method, disclosed in European Patent No. 0,644,224, of using a mixing auxiliary agent such as insoluble inorganic fine particles or a water-soluble polymer in order to improve the mixing characteristics of water, the water absorbing resin and the aqueous liquid are not uniformly mixed, and various properties including the granulation strength undesirably decline.

Therefore, in order to improve various properties including the granulation strength, it is important to directly obtain the granulation product (aggregation product) by uniformly mixing the water absorbing resin and the aqueous liquid without kneading (shearing), as well as to add the aqueous liquid to the water absorbing resin in an amount in a predetermined range. The present invention, by using the particular mixer of a continuous extruding method, have practically made it possible for the first time to obtain a water-containing gel-like granulation product from water and the fine particles without using a mixing auxiliary agent conventionally used for granulation and the grinding process of gel conventionally used for a process other than granulation.

The present invention have cleared the conditions by using the above-mentioned mixer of a continuous extruding method. To be more specific, according to the present invention, even when the aqueous liquid is in abundance, the water absorbing resin and the aqueous are uniformly mixed by using the mixer of a continuous extruding method, without kneading the water absorbing resin and the aqueous liquid, and besides, without using a mixing auxiliary agent that causes decline in properties. In addition, the water-containing gel obtained with the mixer of a continuous extruding method is like particles, and can be normally dried without further processing as a non-continuous particle-like granulation product composed of aggregated masses of water-containing gel. It is confirmed that the masses of water-containing gel form a non-continuous particle-like granulation product (aggregation product) by observation with an optical microphotograph that the particles aggregate without changing their shapes and swell as non-continuous particles when absorbing water. Therefore, the present invention, according to which the water-containing gel-like granulation product is directly obtained from the water absorbing resin and the aqueous liquid, requires no mixing auxiliary agent nor process of grinding the gel by shearing, and therefore can prevent the deterioration of the water absorbing resin granulation product.

Examples of the aqueous liquid used for granulation in the present invention include water and the aforementioned hydrophilic organic solvent. Preferred as the aqueous liquid among them are pure water or water containing a small amount of crosslinking agent. In this case, the surface cross linking agents of the aforementioned kinds can be used in the aforementioned amounts as the crosslinking agent. In this manner, using a crosslinking agent along with the aqueous liquid makes it possible to attempt reduction in the water-soluble components and further improvement in the granulation strength.

The mixer of a continuous extruding method has excellent mixing characteristics as described above. This enables a large amount of aqueous liquid to be stably mixed, and improves continuous granulation capability, productivity, etc. The water absorbing resin and the aqueous liquid are mixed, using the mixer of a continuous extruding method, in the manner already explained in the description about the method of manufacturing the water absorbing agent.

In the present invention, in a case of granulating only fine particles as the water absorbing resin, the fine particles preferably have an average particle diameter ranging from 150 $\mu$m to 10 $\mu$m, and practically include not less than 70 weight percent and more preferably not less than 90 weight percent of particles having a particle diameter of not more than 150 μm. The fine particles preferably have an irregular shape obtained by water solution polymerization to a global shape obtained by reversed-phase suspension polymerization. Moreover, the fine particles are preferably not crosslinked at the surface.

In the present invention, the water-containing gel-like granulation product preferably has an average particle diameter in a range of 0.3 mm to 10 mm, more preferably in a range of 0.5 mm to 8 mm, and especially preferably in a range of 1 mm to 5 mm. If the water-containing gel-like granulation product has a particle diameter of less than 0.3 mm, the proportion granulated is low, and there is a possibility that a dried granulation product obtained by drying the water-containing gel-like granulation product does not have an enough granulation strength. If the water-containing gel-like granulation product has a particle diameter of more than 10 mm, in some cases the properties deteriorate and/or the fine particles increase in amount.

In short, in order to obtain a water absorbing agent having an even more improved granulation strength and at the same time having excellent characteristics such as absorbency under pressure and absorbing rate, a particle-like water-containing gel-like granulation product having an appropriate particle diameter is prepared first and then dried to shrink.

As described above, with the granulation method of the present invention, the granulation strength can be further improved by preferably drying the particle-like water-containing gel-like granulation product after adding the aqueous liquid, especially water.

If the aqueous liquid is added in an amount less than 10 parts by weight, the water-containing gel-like granulation product is not necessarily dried. By contrast if the aqueous liquid is added in an amount less than 70 parts by weight, the water-containing gel-like granulation product needs to be dried to shrink.

The water absorbing resin becomes a solid monolith by the addition of a large amount of aqueous liquid and the subsequent drying, thereby forming a granulation product of almost simulant primary particles (aggregation product of fine particles) as shown in the electronic microphotograph of FIG. 19. It can be easily judged, from a comparison of the particles before and after the granulation with an electronic microphotograph enlarged 20 to 100 folds or preferably 30 to 50 folds, that the water absorbing resin fine particles form a granulation product of almost simulant primary particles (aggregation product of fine particles) in this manner by granulation. That the particles are a granulation product (aggregation product of fine particles) can be understood from, for example, the fact that aggregation of each particle can be confirmed with an optical microphotograph of the water-containing gel-like granulation product or with an electronic microphotograph of the water-containing gel-like granulation product that have been dried, but not ground, and the fact that the particles split into a plurality of particles as those before granulation and swell non-continuously in water of a large excess.

In the present invention, the water-containing gel-like granulation product is preferably dried practically without being grinding nor kneading. The water-containing gel-like granulation product is dried on a condition that the water-containing gel-like granulation product directly obtained from particles (fine particles) of the water absorbing resin is neither ground nor kneaded.

In the present invention, the drying method, not restricted in a particular manner, preferably uses the aforementioned drying device or heating furnace. The drying temperature, although not restricted in a particular manner, is preferably relatively high in terms of the granulation strength. The drying temperature, to be specific, is in a range of 110° C. to 300° C., preferably in a range of 120° C. to 200° C., and more preferably in a range of 150° C. to 180° C. The water-containing gel-like granulation product is preferably dried at such a temperature, since the particle-like water-containing gel-like granulation product would shrink more when being dried, and as a result would form a solid water absorbing resin granulation product. The water-containing gel-like granulation product can be dried alone or alternatively can be mixed, and dried together, with the gel-like polymer that has been obtained by the aforementioned water solution polymerization or reversed-phase suspension polymerization and that has not yet been dried. In this case, the aforementioned ordinary drying device, heating furnace, or the like is used for drying.

Although the particle-like dried granulation product obtained in this manner has shrunk and become a solid dried product, if necessary, the dried granulation product may be further ground to adjust the particle size. The method of grinding the dried granulation product, not restricted in a particular manner, preferably uses, for example, a vibration mill or a roll granulator type grinding device.

As described above, the water absorbing resin granulation product of the present invention can be easily obtained, on a condition that the water-containing gel-like granulation product is not ground, by mixing the aqueous liquid of 70 parts by weight to 400 parts by weight per 100 parts by weight of the water absorbing resin with the particular mixer of a continuous extruding method, and then drying the obtained particle-like water-containing gel-like granulation product.

In the present invention, the water absorbing resin granulation product obtained with the above method has an average particle diameter in a range of, preferably, 200 μm to 800 μm and, more preferably, of 200 μm to 500 μm. That is, in the present invention, particles having particle diameters of not more than 150 μm (e.g., not more than 100 μm on average) are preferably granulated to have an average particle diameter of 200 μm to 800 μm.

The water absorbing resin granulation product differs from conventional water absorbing resin granulation products in that it has a far more excellent granulation strength and shows no decline in its properties. Besides, as shown in the electronic microphotograph of FIG. 19, the water absorbing resin granulation product is, surprisingly, granulated into porous simulant primary particles, thereby boasting a high absorbing rate.

Therefore, a water absorbing agent being capable of exhibiting, for example, excellent absorbency under high pressure, granulation strength and a high absorbing rate can be obtained by further crosslinking the surface of the water absorbing resin granulation product obtained in the granulation method as described above. The absorbency of the water absorbing agent without pressure is not less than 20 g/g, preferably not less than 25 g/g, and most preferably not less than 30 g/g.

That is, the method of manufacturing a water absorbing agent of the present invention is, most preferably, a method of, first, obtaining the particle-like water-containing gel-like granulation product having an average particle diameter in a range of 0.3 mm to 10 mm by mixing the aqueous liquid of 70 parts by weight to 400 parts by weight with 100 parts by weight of the water absorbing resin having an average particle diameter in a range of 10 μm to 150 μm, not grinding, then drying and shrinking the granulation product at a temperature ranging from 110° C. to 300° C., and crosslinking the surface of the obtained water absorbing resin granulation product having an average particle diameter in a range of 200 μm to 800 μm.

The water absorbing agent produced with the manufacturing method boasts excellent performance such as absorbency under high pressure of not less than 20 g/g and preferably not less than 25 g/g, an absorbing rate of not longer than 25 second and preferably not longer than 20 seconds, and a granulation destruction ratio of not more than 10 weight percent, preferably not more than 5 weight percent, more preferably not more than 2 weight percent, and even more preferably not more than 1 weight percent.

As described so far, the present invention can offer for the first time a water absorbing agent that at the same time satisfies requirements on the absorbency under high pressure, the granulation strength, and the absorbing rate, which, conventionally, contradict one another and cannot be satisfied at the same time.

That is, according to a conventional granulation method, regardless whether the surface is crosslinked before, during, or after granulation, as described earlier, granulation is likely to destroy the surface and degrade the properties, and therefore it is impossible to obtain a water absorbing agent that can at the same time satisfy requirements on the absorbency under high pressure, the granulation strength and the absorbing rate. Especially, the use of the mixing auxiliary agent has a problem of being likely to cause decline in the properties and granulation strength of the water absorbing resin granulation product obtained. On the other hand, according to the present invention, it is possible to obtain a water absorbing agent that can at the same time satisfy those requirements on the three properties, by first preparing the particle-like water-containing gel-like granulation product and then crosslinking the surface of the porous granulation particles (aggregation product) that have been granulated into simulant primary particles. In the present invention, no mixing auxiliary agent is used for granulation, and, practically, pure water or water containing a small amount of crosslinking agent is preferably used.

In the present invention, the granulation method can be applied to granulation of a relatively small amount of fine particles contained in a water absorbing agent with a crosslinked surface and to combination with another water-soluble compound. However, in this case, the aqueous liquid is used as the aforementioned binder, solution, etc. preferably in an amount raging from 0.1 part by weight to 30 parts by weight, more preferably in an amount raging from 0.5 part by weight to 10 parts by weight, and even more preferably in an amount raging from 1 part by weight to 5 parts by weight, per 100 parts by weight of the water absorbing agent.

If the aqueous liquid is used in too large an amount, even if the mixer of a continuous extruding method in accordance with the present invention is used, the surface crosslink may possibly be destroyed. If the aqueous liquid is used in too small an amount, an enough granulation strength cannot be obtained, which is not preferred.

In the present invention, even in a case of granulating fine particles, whose surface is already crosslinked, contained in a water absorbing agent as described above, the granulation product obtained does not deteriorate in the granulation process, and a water absorbing agent having an excellent granulation strength can be obtained in the same manner as in a case of manufacturing the water absorbing resin granulation product. The water absorbing agent (crosslinked granulation product), since having a larger surface area than primary particles due to granulation, excel especially in, for example, absorbency under pressure and absorbing rate.

Besides, according to the present invention, the resistance of a crosslinked granulation product to mechanical stress can be evaluated and predicted as the granulation strength of the crosslinked granulation product by applying the impact force (B) to the crosslinked granulation product by application of a predetermined vibration, and then measuring the destruction ratio of the crosslinked granulation product. Therefore, according to the present invention, by measuring the destruction ratio of the crosslinked granulation product, it is possible to obtain a water absorbing agent that maintain the excellent water absorbing performance even after, for example, being transported in a manufacturing plant or being processed into an end product by a user, and that always maintain excellent characteristics regardless of how it is used in the end product.

In the present invention, the impact force (B) applied to the water absorbing agent is as mentioned above. The destruction ratio of the crosslinked granulation product (hereinafter, will be referred to as granulation destruction ratio) is a value obtained by first applying the aforementioned impact force (B) to the crosslinked granulation product for 30 minutes, then measuring the weight of the crosslinked granulation particles in the container 41 destructed by being vibrated together with the glass beads, and dividing the weight of the crosslinked granulation particles after the application of vibration by the weight of the granulation particles before the application of vibration.

When the granulation destruction ratio of the crosslinked granulation product is measured, a crosslinked granulation product of 30.00 g is used as the granulation product. That is, the granulation destruction ratio can be measured, in a case of having granulating grains having a constant particle size, by applying the impact force (B) to, and thus destroying, 30.00 g of the crosslinked granulation product whose particle size is larger than before granulation, and then measuring the weight of the produced grains having a constant particle size with a ro-tap classification using a JIS standard sieve.

By using, for example, a water absorbing resin granulation product or a water absorbing resin instead of the crosslinked granulation product in the above measurement, the granulation destruction ratio of the granulation product before surface crosslinking can be measured, and so can the destruction ratio of a water absorbing resin that has not crosslinked or granulated as a method for impact force resistance test of a water absorbing resin.

As described above, according to present invention, when a water absorbing agent includes a granulation product (crosslinked granulation product), the resistance of the water absorbing agent to mechanical stress can be evaluated and predicted, by measuring the granulation destruction ratio and the property values Q/P and Y/X. That is, conventionally, when a water absorbing agent includes a granulation product (crosslinked granulation product), the decline in properties, the granulation destruction ratio, etc. can be measured only if, for example, processing into an end product by a user and transport in a manufacturing plant where the granulation destruction is to be evaluated with the end product are actually carried out, using a large amount of water absorbing agent. However, according to the above method, it is possible to offer a simple method for impact force resistance test of the water absorbing agent of a laboratory level in accordance with, for example, transport in a manufacturing plant and processing into an end product by a user.

Therefore, according to the present invention, since the resistance of the water absorbing agent to mechanical stress can be evaluated in advance with a simple method, it is possible to obtain a water absorbing agent capable of maintaining its high water absorbing performance even after, for example, being transported in a manufacturing plant or being processed into an end product by a user, and always exhibiting excellent characteristics with the end product regardless of how the water absorbing agent is used.

Besides, the present invention can provide various functions to the water absorbing agents by adding, to the water absorbing agents, for example, a disinfectant, a deodorant, an antibacterial agent, a perfume, various kinds of inorganic powders, a foaming agent, a pigment, a dying agent, a hydrophilic staple, a fertilizer, an oxidant, a reducer, water, and a salt. The mixer of the present invention, needless to say, can be suitably used for adding those compounds.

Moreover, as described above, the water absorbing agents, since being capable of maintaining their high water absorbing performance even after being processed by a user into an end product, i.e., a liquid absorbing product, are suitably used for various kinds of liquid absorbing products, and especially, liquid absorbing products such as sanitary goods including paper diapers, sanitary napkins, and incontinence pads that require excellent absorbing characteristics under pressure.

Note that Japanese Laid-Open Patent Application No. 8-84927/1996 (Tokukaihei 8-84927) and Canadian Laid-Open Patent Application No. 2,154,425 disclose reduction in the amount of fine particles abraded by a mechanical load by coating a water absorbing polymer with a polymer for forming a non-reactive water-soluble film. However, the present invention, unlike those patent applications, does not require, for example, a process of coating the surface part of the resin particles with, for example, a polymer for forming a non-reactive water-soluble film, can prevent decline of properties due to such film coating, and can offer a water absorbing agent that is resistant to mechanical stress and that boasts excellent absorbing performance by normal processing.

Additional objects, advantages and novel features of the invention will be set forth in part in the description which follows, and in part will become apparent to those skilled in the art upon examination of the following or may be learned by practice of the invention. For a fuller understanding of the nature of the invention, reference should be made to the ensuing detailed description taken in conjunction with the accompanying drawing.

BRIEF DESCRIPTION OF THE DRAWINGS

FIG. 2(a) is an explanatory view showing an agitation state in a first area of the mixer of a continuous extruding method shown in FIG. 1.

FIG. 2(b) is an explanatory view showing an agitation state in a second area of the mixer of a continuous extruding method shown in FIG. 1.

BEST MODES OF CARRYING OUT THE INVENTION

[FIRST EMBODIMENT]

Referring to FIGS. 1 through 5, the following description will discuss an embodiment in accordance with the present invention.

Figure 1:
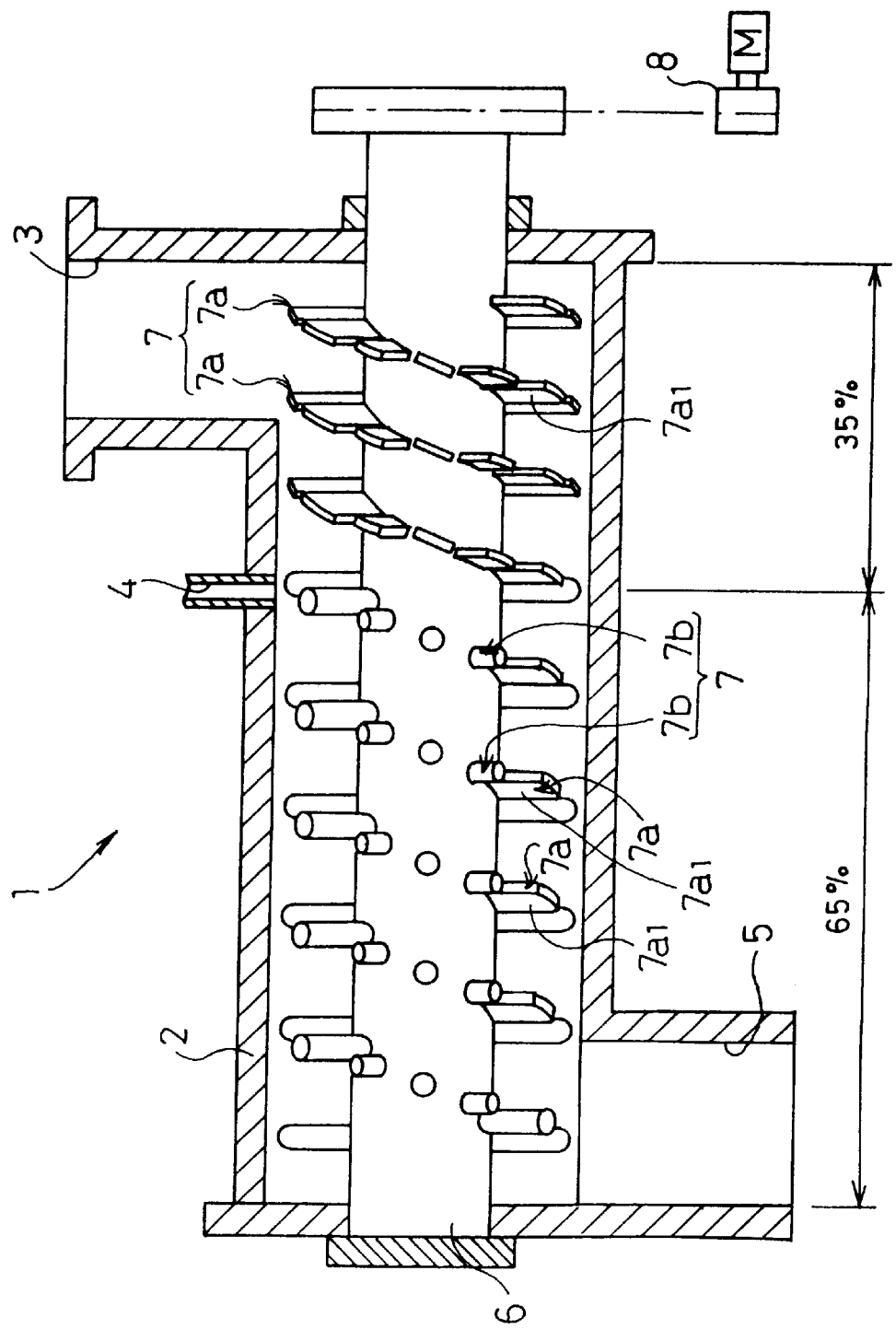
FIG. 1 is a schematic cross-sectional view showing a mixer of a continuous extruding method incorporated in a machine for manufacturing a water absorbing agent of an embodiment in accordance with the present invention.
Figure 3:
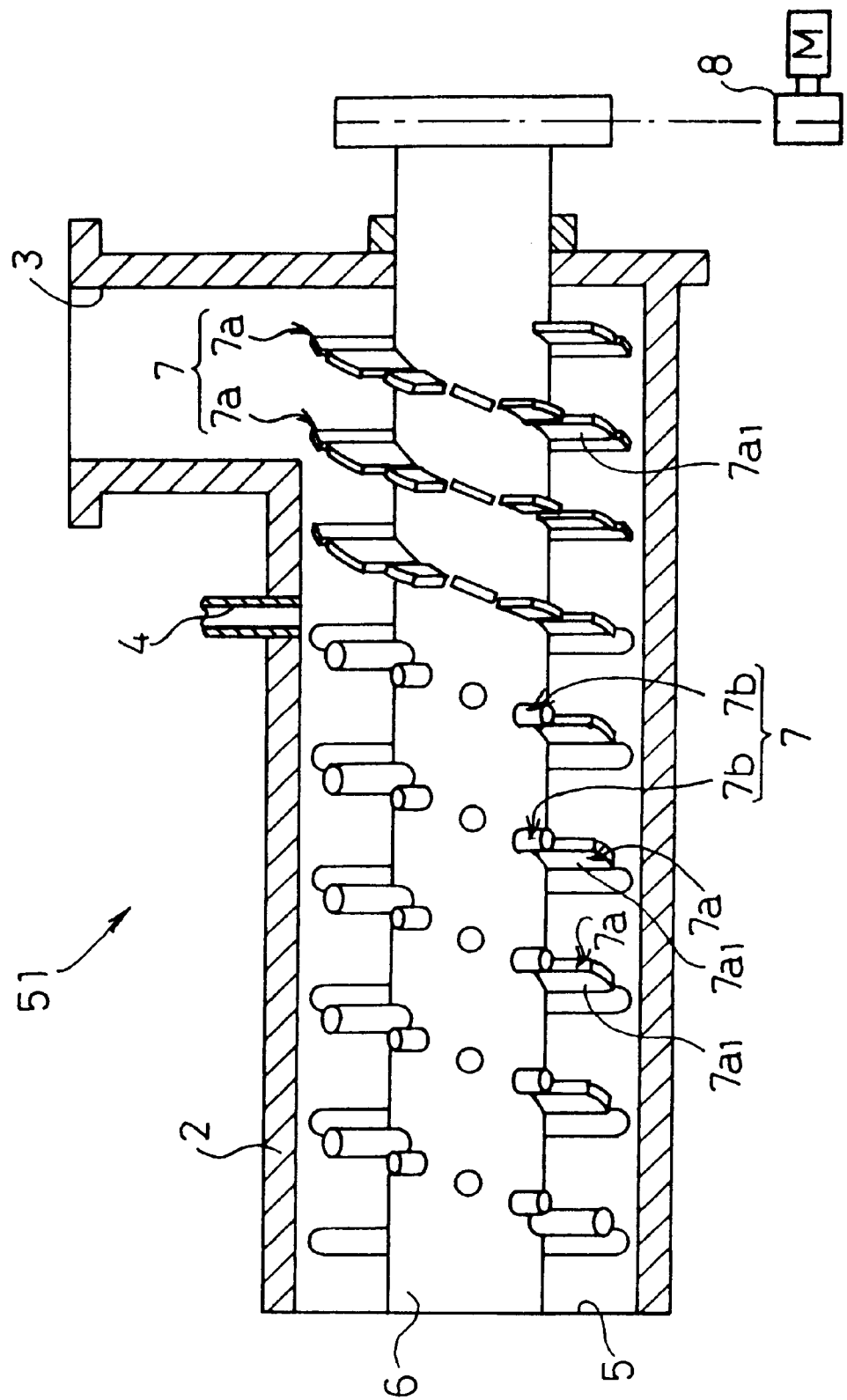
FIG. 3 is a schematic cross-sectional view showing a mixer of a continuous extruding method incorporated in a machine for manufacturing a water absorbing agent of another embodiment in accordance with the present invention.

As shown in FIG. 1, a high-speed agitation type mixer, 1, of a continuous extruding method composing a part of a machine for manufacturing a water absorbing agent of the present embodiment has a casing 2 as a fixed cylinder fixed, for example, horizontally.

As shown on the right side of FIG. 1, the casing 2 is provided with a material supply port (first supply port) 3 for supplying and introducing fine particles of a water absorbing resin, and with a liquid supply port (second supply port) 4 for introducing an aqueous liquid such as a crosslinking agent in the ejection side of the material supply port 3. As shown on the far left of FIG. 1, the casing 2 is provided with an ejection port 5.

The inner surface of the casing 2 is preferably provided with a base material, as an inner cylinder, that has a contact angle of not less than 60° to water and that exhibits a heat deformation temperature of not less than 70° C., as disclosed in Japanese Laid-Open Patent Application No. 4-214734/1992 mentioned above.

If the contact angle of the base material to water is less than about 60°, the water absorbing resin and aqueous liquid are not uniformly mixed in some cases. If the heat deformation temperature is less than about 70° C., the base material cannot enough endure the heat generated during mixing. Therefore, if the base material does not satisfy the above conditions, stable mixing cannot be continued in some cases, which needs caution.

Examples of the base material for the inner surface of the casing 2 include a synthetic resin such as a polyethylene, a polypropylene, a polyester, a polyamide, a fluororesin, a polyvinyl chloride, an epoxy resin, or a silicon resin; and a complex of such a synthetic resin obtained by reinforcing that synthetic resin with an inorganic filling agent such as glass, graphite, bronze or molybdenum disulfide; or with an organic filling agent such as polyimide.

Especially desirable among the above substances are fluorine resins such as polyethylenetetrafluoride, polyethylenetrifluoride, polyethylenetrifluorochloride, ethylenetetrafluoride-ethylene copolymer, ethylenetrifluorocholoride-ethylene copolymer, propylenepentafluoride-ethylenetetrafluoride copolymer, perfluoro alkylene vinylether-ethylenetetrafluoride copolymer, and polyvinyl fluoride.

Inside the casing 2 is provided a rotational shaft 6 that is driven to rotate by a drive motor 8. Around the rotational shaft 6 are provided a plurality of agitating blades 7 as agitating members.

In order to form a first area as a dispersion area in which the water absorbing resin supplied into the casing 2 is dispersed, and to form, in the side of the first area where the ejection port 5 is disposed, a second area as a mixing area in which the aqueous liquid is mixed with the water absorbing resin having been dispersed in the dispersion area, the agitating blades 7 are disposed so as to have, in the side of the first area where the ejection port 5 is disposed, the second area in which a thrusting force is weaker than that in the first area.

In the present embodiment, the agitating blades 7 are spirally arranged in a row around the rotational shaft 6, and include agitating blades of two different shapes: first agitating blades 7a and second agitating blades 7b. In the present embodiment, the first area is provided with the first agitating blades 7a, while the second area is provided with second agitating blades 7b and partly with first agitating blades 7a as well.

The first agitating blades 7a are, for example, of a rectangular plate-like shape, which generates a thrusting force. However, the first agitating blades 7a are not necessarily of a rectangular plate-like shape. Alternatively, the first agitating blades 7a can be, for example, of a paddle-like (e.g. swim fin or butterfly) shape, and may be of a plate-like shape having a curved surface instead of a flat surface. Besides, as shown in FIG. 1, the first agitating blades 7a do not necessarily have a straight top edge, and may have a top edge of, for example, an arc-like shape or an blade-like shape (e.g., chisel).

The first agitating blades 7a may also take any other shapes including a circular plate-like shape, an elliptic plate-like shape, a triangular plate-like shape, a circular column-like shape, an elliptic column-like shape, and a triangular column-like shape, as long as it can generate a thrusting force.

In other words, for example, the shape, size, arrangement density, arrangement method of the first agitating blades 7a and the angles formed by water-absorbing-resin-extruding faces $7a_1$ and the plane perpendicular to the rotational shaft 6 are not restricted in a particular manner as long as the first agitating blades 7a are set so as to apply an enough thrusting force to, and thus disperse, the water absorbing resin supplied to the first area of the casing 2 towards the inside of the mixer, 1, of a continuous extruding method.

In the present invention, the mixer, 1, of a continuous extruding method adjusts the thrusting force by changing, for example, the size of some of the first agitating blades 7a, although other conditions should also be taken into consideration. The first agitating blades 7a are disposed around the rotational shaft 6 so that the first agitating blades 7a are perpendicular to the rotational shaft 6 and so that the water-absorbing-resin-extruding faces $7a_1$ slant with respect to the plane perpendicular to the rotational shaft 6.

Meanwhile, the second agitating blades 7b are, -or example, of a column-like shape. The second agitating blades 7b are fixed so as to be perpendicular to the rotational shaft 6. In this case, no thrusting force is generated by the second agitating blades 7b in the second area, and the thrusting force is solely generated by the first agitating blades 7a. The thrusting force is reduced, although by a small amount, by the resistance of the second agitating blades 7b.

Therefore, in the second area, the thrusting force for the water absorbing resin is weaker than in the first area, and the average speed of the water absorbing resin that moves as being thruster decreases. As a result, in the mixer, 1, of a continuous extruding method, as shown in FIGS. 2(a) and 2(b), agitation is carried out through two agitation states. As shown in FIG. 2(a), in the first area, the water absorbing resin 37 receives a thrusting force from the first agitating blades 7a towards the ejection port 5 and a centrifugal force by the rotation of the first agitating blades 7a. Therefore, the water absorbing resin 37 is not mixed by the first agitating blades 7a in the first area, and extruded to the second area in a dispersed state while rotating along the outer wall of the casing 2.

Meanwhile, as shown in FIG. 2(b), in the second area, the thrusting force is weaker than in the first area, and the average speed of the water absorbing resin, 37, that moves as being thrust decreases. As a result, the water absorbing resin 37 is extruded towards the ejection port 5 by the thrusting force transmitted from the first area and the thrusting force generated by the first agitating blades 7a disposed in the second area while staying on the bottom wall of the casing 2 and being mixed with an aqueous liquid (not shown) supplied through the liquid supply port 4 and adhering to the surface of the water absorbing resin 37 by the first agitating blades 7a and the second agitating blades 7b.

Although the second agitating blades 7b of the mixer, 1, of a continuous extruding method is of a column-like shape in the present embodiment, the shape of the second agitating blades 7b is not restricted to this. The second agitating blades 7b may take any shape as long as the thrusting force is weaker in the area in which the second agitating blades 7b are provided than in the area in which the first agitating blades 7a are provided.

Therefore, the 7b may take, for example, a shape that does not generate a thrusting force or a shape that generates a weaker thrusting force than do the first agitating blades 7a.

The shape that does not generate a thrusting force is, for example, a column-like shape, a bar-like shape that is thinner than the column-like shape, and a pin-like shape. The shape that generates a weaker thrusting force than do the first agitating blades 7a, although variable depending on the shape of the first agitating blades 7a, is any shape that can generate a thrusting force and that has a smaller area than the area of the first agitating blade 7a (area of the water-absorbing-resin-extruding face $7a_1$). Therefore, the second agitating blades 7b may be of a plate-like shape that is narrower in width or smaller in size than the first agitating blades 7a or even of the same shape as the first agitating blades 7a, however, with a slit or aperture opened.

The top edges of the second agitating blades 7b are not necessarily of a flat shape as shown in FIG. 1, and may be of a spherical shape such as a hemispherical shape.

The first agitating blades 7a and the second agitating blades 7b may have a mounting nut at lower parts thereof. The surfaces of the agitating blades 7 and of the rotational shaft 6 are preferably covered with a film composed of a polytetrafluoroethylene (Teflon resin), etc. plated, or coated with a polytetrafluoroethylene (Teflon resin) tube, etc., in order to prevent the mixture from adhering to the agitating blades 7 and rotational shaft 6.

In the mixer, 1, of a continuous extruding method, the area (second area) in which the second agitating blades, 7b, of a column-like shape are provided is partly provided with the first agitating blades 7a along with the second agitating blades 7b. This allows the mixer, 1, of a continuous extruding method to be capable of attempting to adjust the thrusting force in the area in which the second agitating blades 7b are provided.

In other words, the thrusting force can be adjusted by adjusting, for example, the shape of the agitating blades 7, the arrangement densities of the agitating blades 7 in the two areas, the arrangement method of the agitating blades 7, and the angles formed by water-absorbing-resin-extruding faces $7a_1$ and the plane perpendicular to the rotational shaft 6.

It is preferable to set the distance between the outer circumference of the rotational shaft 6 and the inner wall of the casing 2 with agitation efficiency taken into account.

As shown in FIG. 1, the first agitating blades 7a, of, a plate-like shape are provided around the rotational shaft 6 in a portion from the edge of the material supply port 3 up to about 35%, and the second agitating blades, 7b, of a column-like shape are provided around the rotational shaft 6 in a portion from the edge on the side where the ejection port 5 is disposed up to about 65%, with the length of the segment of the rotational shaft 6 inside the casing 2 designated as 100%.

The first agitating blades 7a hence applies enough thrusting force to the water absorbing resin containing a carboxyl group and the aqueous liquid containing, for example, a crosslinking agent that can react with the carboxyl group towards the inside of the mixer, 1, of a continuous extruding method. Then, by making the thrusting force weaker with the second agitating blades 7b than the thrusting force in the area in which the first agitating blades 7a are provided, it is possible to set aside enough time for mixing and agitation and to well mix the water absorbing resin and the aqueous liquid.

The mounting pitch of the agitating blades 7 is preferably set according to a desired uniform mixed state.

In the mixer, 1, of a continuous extruding method, the material supply port 3 for introducing the water absorbing resin particles is formed in the area in which the first agitating blades 7a are provided, that is the first area, and the liquid supply port 4 for introducing the aqueous liquid containing a crosslinking agent is formed in a boundary area of the area in which the second agitating blades 7b are provided, that is the first area, with the first area.

That is, when the water absorbing resin and the aqueous liquid are mixed, they need to be wholly brought into contact with each other in as short a time as possible. If this is not properly done, so-called concretion is produced, reducing uniformity of the mixture. On the other hand, the mixer, 1, of a continuous extruding method moves the water absorbing resin into the mixer, 1, of a continuous extruding method with the first agitating blades 7a towards the inside of the mixer, 1, of a continuous extruding method, and carries out high-speed agitation and mixing of the water absorbing resin and the aqueous liquid in an instant with the second agitating blades 7b, thereby mixing the water absorbing resin and the aqueous liquid uniformly enough.

When the mixer, 1, of a continuous extruding method configured as above is used to mix the water absorbing resin containing a carboxyl group and the aqueous liquid containing, for example, a crosslinking agent that can react with the carboxyl group, the rotational shaft 6 is rotated by the drive motor 8 at a high rate of, for example, 500 rpm to 3000 rpm.

Then, in this state, the water absorbing resin containing a carboxyl group is supplied through the material supply port 3. The water absorbing resin is then moved into the mixer, 1, of a continuous extruding method by the thrusting force of the first agitating blades, 7a, of a plate-like shape that are spirally formed.

Next, by injecting the aqueous liquid containing a crosslinking agent through the liquid supply port 4, the water absorbing resin and the aqueous liquid containing, for example, a crosslinking agent are mixed well in the area in which the second agitating blades 7b are provided and in which the thrusting force is smaller. As a result, the water absorbing resin and the aqueous liquid containing, for example, a crosslinking agent are uniformly mixed, and then the mixture is automatically ejected out of the ejection port 5.

Next, the surface of the mixture is further crosslinked by, for example, a heating device (not shown) in a machine for manufacturing a water absorbing agent to be a water absorbing agent boasting excellent strength characteristics.

In this manner, in order to uniformly mix the water absorbing resin containing a carboxyl group with the aqueous liquid containing, for example, a crosslinking agent that can react with the carboxyl group, the mixer, 1, of a continuous extruding method of the present embodiment has such a structure that the agitating blades 7 are provided around the rotational shaft 6 inside the fixed casing 2, and the agitating blades 7 are of a plurality of types of different shapes.

A conventional mixer of a continuous extruding method has a plurality of agitating blades of the same shape disposed in plurality around a rotational shaft so that the agitating blades are disposed at equal intervals and so that the blade faces face the same direction, thereby failing to carry out uniform agitation or enough mixing.

By contrast, in the present embodiment, the agitating blades 7 are of a plurality of types of different shapes, and therefore can carry out mixing through a plurality of agitation states. As a result, the agitating blades 7 can efficiently mix a water absorbing resin containing a carboxyl group with an aqueous liquid containing, for example, a crosslinking agent that can react with the carboxyl group, thereby producing no concretion and carrying out mixing uniformly. Therefore, it is possible to offer a water absorbing agent that can be used in any manner and always exhibit excellent characteristics with an end product, and a machine for manufacturing such a water absorbing agent.

The agitating blades 7, since being spirally arranged in a row, can ensure an enough thrusting force, and smoothly extrude, for example, the water absorbing resin.

Moreover, around the rotational shaft 6 of the mixer, 1, of a continuous extruding method of the present embodiment are provided the first agitating blades 7*a* for applying a thrusting force to the water absorbing resin and the second agitating blades 7*b*, disposed in the ejection side of the first agitating blades 7*a*, for forming an area in which a thrusting force is weaker than the thrusting force in an area in which the first agitating blades 7*a* are provided.

Therefore, the mixer, 1, of a continuous extruding method applies an enough thrusting force to the water absorbing resin containing a carboxyl group and the aqueous liquid containing, for example, a crosslinking agent that can react with the carboxyl group towards the inside of the mixer, 1, of a continuous extruding method with the first agitating blades 7*a*, and then sets aside an enough time for mixing and agitation and well mixes the water absorbing resin and the aqueous liquid by making the thrusting force weaker with the second agitating blades 7*b* than the thrusting force in the area in which the first agitating blades 7*a* are provided. Therefore, the water absorbing resin and the aqueous liquid are reacted in an enough uniformly mixed state.

The first agitating blades 7*a* are of a plate-like shape, which is desirable to generate a thrusting force. The second agitating blades 7*b* are of a column-like shape, which is desirable to make the thrusting force in the second area, that is the area in which the second agitating blades 7*b* are provided, weaker than the thrusting force in the first area, that is the area in which the first agitating blades 7*a* are provided, and to surely carry out enough mixing and agitation.

The inner surface of the casing 2 is of the mixer, 1, of a continuous extruding method is practically composed of a base material that has a contact angle of not less than about 60° to water and that exhibits a heat deformation temperature of not less than about 70° C.

If the contact angle of the base material to water is less than about 60°, the water absorbing resin and aqueous liquid are not uniformly mixed in some cases. If the heat deformation temperature is less than about 70° C., the base material cannot enough endure the heat generated during mixing. Therefore, if the base material does not meet the above conditions, stable mixing cannot be continued in some cases. However this can be avoided in the present embodiment.

The mixer, 1, of a continuous extruding method is formed so that fine particles of the water absorbing resin containing a carboxyl group are supplied and introduced in the area in which the first agitating blades 7*a* are provided and so that the aqueous liquid containing a crosslinking agent that can react with the carboxyl group is supplied and introduced in the area in which the second agitating blades 7*b* are provided.

Therefore, the mixer, 1, of a continuous extruding method moves the water absorbing resin towards the inside of the mixer, 1, of a continuous extruding method with the first agitating blades 7*a*, and then instantly agitate and mix, using the second agitating blades 7*b*, the water absorbing resin with the aqueous liquid at high speed by supplying and introducing the aqueous liquid into the area in which the second agitating blades 7*b* are provided. The mixer, 1, of a continuous extruding method thereby can enough uniformly mix the water absorbing resin and the aqueous liquid.

The agitating blades 7 of the present embodiment are made up of the first agitating blades 7*a* and the second agitating blades 7*b* of two different shapes. However, there is an alternative. For example, more agitating blades 7 of a different shape may also be provided, which would further improve the agitation efficiency.

Although the mixer, 1, of a continuous extruding method is configured so that the aqueous liquid containing a crosslinking agent that can react with the carboxyl group is supplied and introduced in the area in which the second agitating blades 7*b* are provided, the aqueous liquid is preferably supplied and introduced in a boundary area of the first and second areas. A mixer, 51, of a continuous extruding method shown in FIG. 3 includes such a configuration where the liquid supply port 4 is provided in a boundary area of the area in which the first agitating blades 7*a* are provided and the area in which the second agitating blades 7*b* are provided.

By providing the liquid supply port 4 in the boundary area of the area in which the first agitating blades 7*a* are provided and the area in which the second agitating blades 7*b* are provided, it is possible to let the aqueous liquid uniformly adhere to the water absorbing resin having been dispersed by the first agitating blades 7*a*, and to quickly and uniformly mix the water absorbing resin with the aqueous liquid before the aqueous liquid that has adhered to the water absorbing resin is absorbed by the water absorbing resin. Therefore, it is possible to more efficiently mix the water absorbing resin containing a carboxyl group and the aqueous liquid containing, for example, a crosslinking agent that can react with the carboxyl group and therefore to carry out uniform mixing without producing concretion. Therefore, by providing the liquid supply port 4 in the boundary area of the area in which the first agitating blades 7*a* are provided and the area in which the second agitating blades 7*b* are provided, it is possible to more stably manufacture a water absorbing agent that can be used in any manner and that can always boasts excellent characteristics with an end product.

Although the mixer, 1, of a continuous extruding method is configured so that the ejection port 5 is formed on the bottom wall of the casing 2, the position of the ejection port 5 is not necessarily limited to the bottom wall of the casing 2. Alternatively, for example, the ejection port 5 may be disposed on the side wall of the casing 2 on the side where the water absorbing resin is ejected, as shown in the mixer, 51, of a continuous extruding method in FIG. 3.

Figure 4:
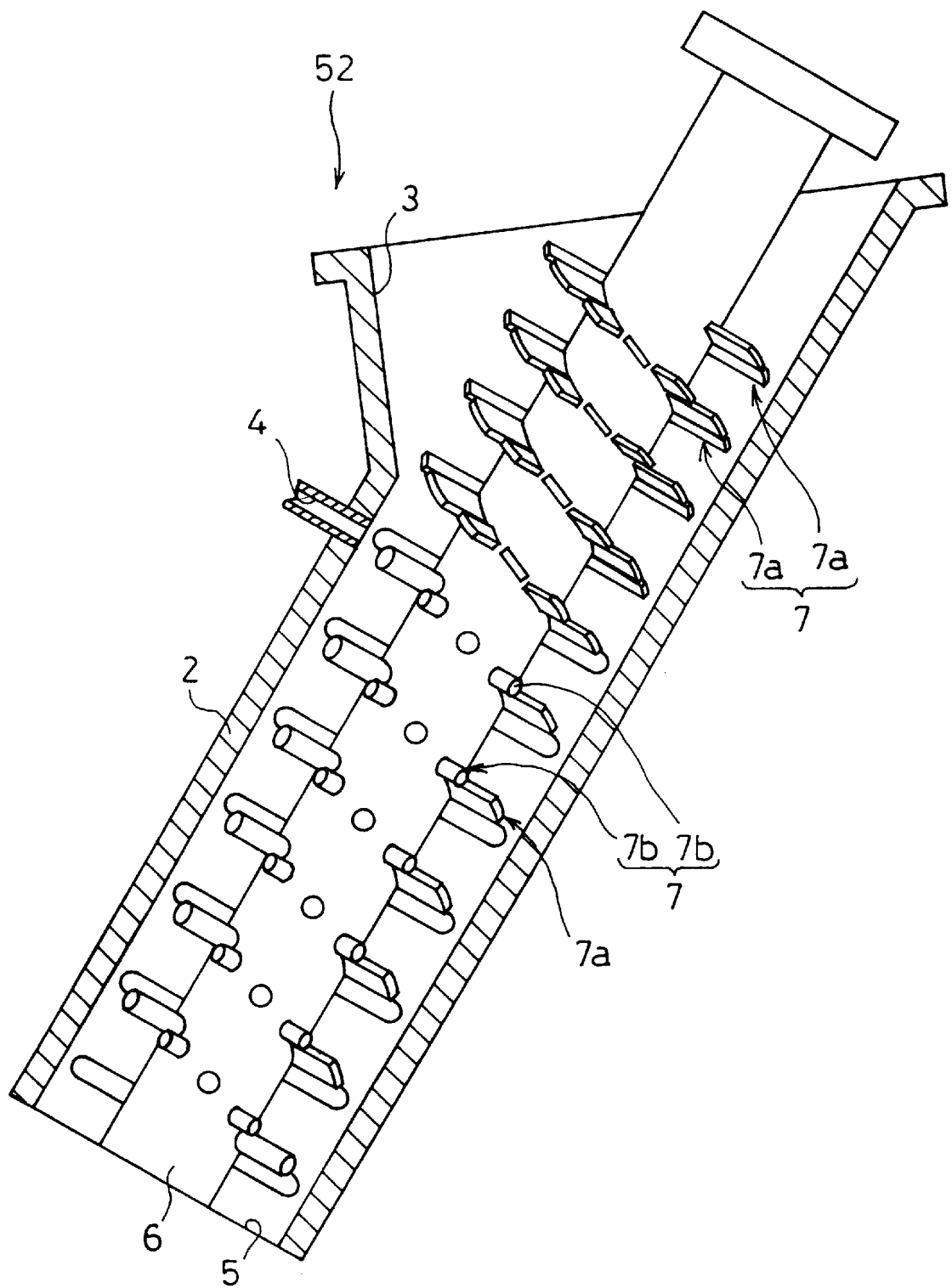
FIG. 4 is a schematic cross-sectional view showing a mixer of a continuous extruding method incorporated in a machine for manufacturing a water absorbing agent of even another embodiment in accordance with the present invention.
Figure 5:
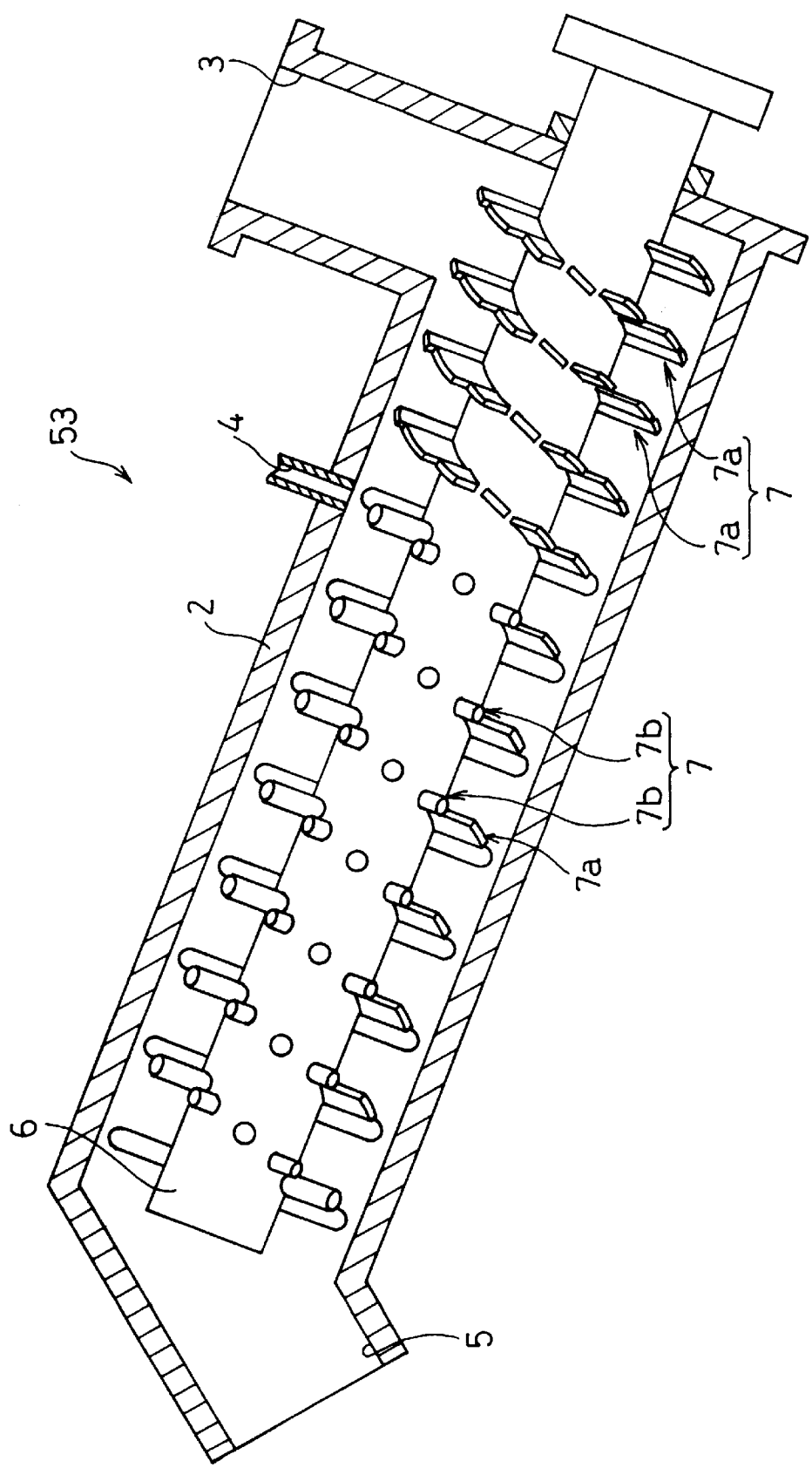
FIG. 5 is a schematic cross-sectional view showing a mixer of a continuous extruding method incorporated in a machine for manufacturing a water absorbing agent of still another embodiment in accordance with the present invention.

The shape of the casing 2, i.e. the shape of the mixer of a continuous extruding method is not restricted in a particular manner, and may vary as shown in FIGS. 4 and 5. For example, FIG. 4 shows a mixer, 52, of a continuous extruding method having a material supply port 3 on the upper wall of an diagonally provided casing 2, and an ejection port 5 on the bottom wall of the casing 2. Therefore, the mixer, 52, of a continuous extruding method is configured so that gravity adds to the thrusting force. By contrast, FIG. 5 shows a mixer, 53, of a continuous extruding method configured to extrude the water absorbing resin supplied through the material supply port 3 shown on the right side of FIG. 5 while extruding that water absorbing resin upwards against gravity. Since the casing 2 is provided diagonally, the mixers, 52 and 53, of a continuous extruding method can set aside an enough length for the agitation path (enough length for the casing 2) even in smaller space, or offer a longer agitation path in the same space. As described here, the mixer of a continuous extruding method is not restricted in shape in a particular manner in the present invention. The shape of the mixer of a continuous extruding method may be determined optimally according to, for example, the kind, amount, and purpose of the water absorbing resin to be used.

As described so far, it is possible with the present invention to uniformly mix a water absorbing resin containing a carboxyl group with an aqueous liquid containing, for example, a crosslinking agent that can react with the carboxyl group. Therefore, it is possible with the present invention to uniformly crosslink the neighborhood of the surface of the water absorbing resin to an appropriate depth, and to offer a water absorbing agent that boasts excellent absorbing performance and that is resistant to mechanical stress.

Moreover, the present invention produces effects of offering a water absorbing agent that little deteriorates in terms of water absorbing characteristics and that maintains its excellent absorbing performance with an end product, even if having received mechanical stress during, for example, transport in a manufacturing plant and processing by a user.

The method and the machine for manufacturing a water absorbing resin in accordance with the present invention produce, with the various configurations of the plurality of agitating blades of the mixer of a continuous extruding method, effects of efficiently mixing and reacting a water absorbing resin containing a carboxyl group with an aqueous liquid containing, for example, a crosslinking agent that can react with the carboxyl group, and of surely carrying out uniform mixing.

[SECOND EMBODIMENT]

Figure 6:
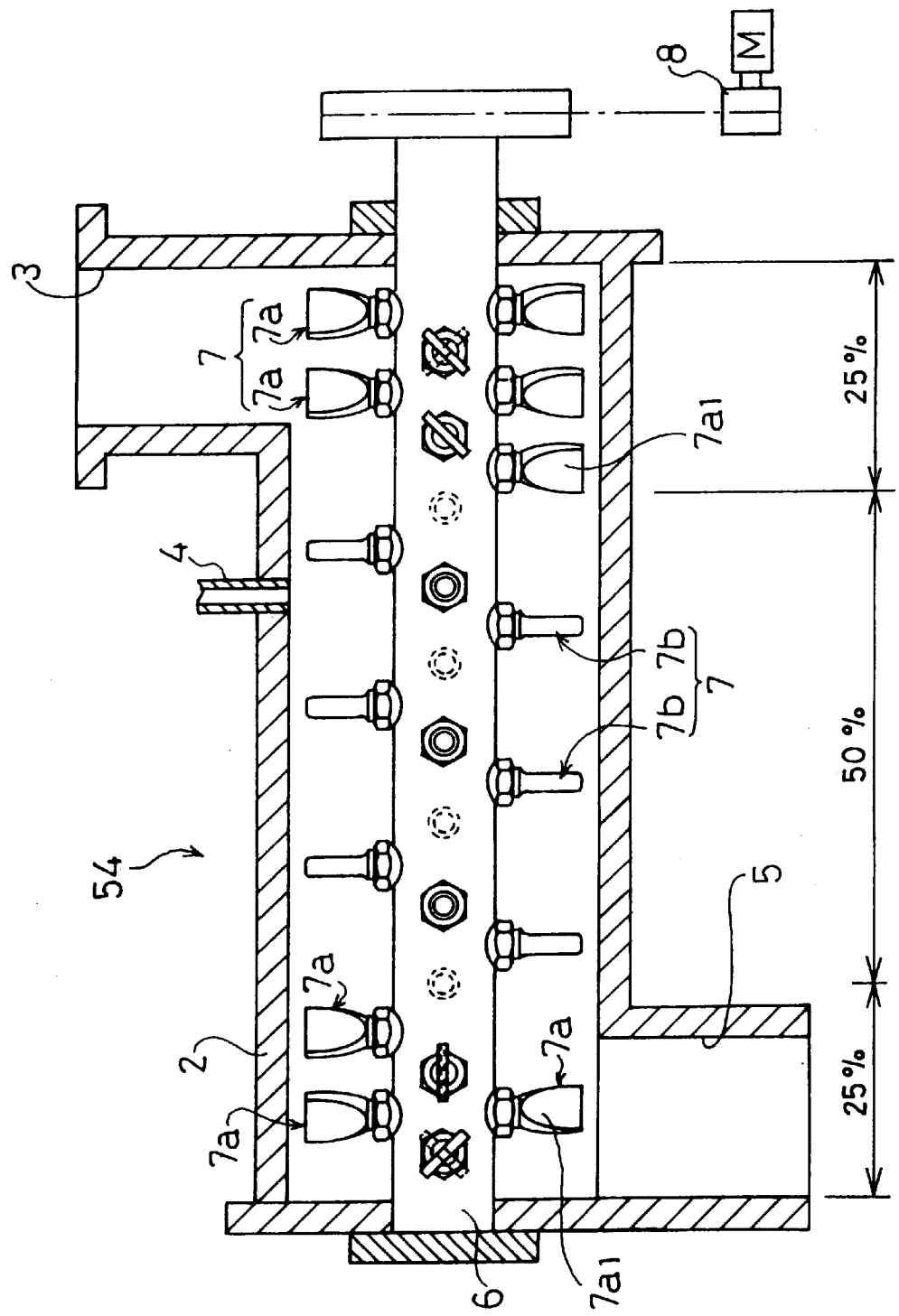
FIG. 6 is a schematic cross-sectional view showing a mixer of a continuous extruding method incorporated in a machine for manufacturing a water absorbing agent of a further embodiment in accordance with the present invention.

Referring to FIG. 6, the following description will discuss an embodiment in accordance with the present invention, with an emphasis on differences from the first embodiment. For convenience, members of the present embodiment that have the same arrangement and function as members of the first embodiment, and that are mentioned in the first embodiment are indicated by the same reference numerals and description thereof is omitted.

As shown in FIG. 6, a high-speed agitation type mixer, 54, of a continuous extruding method composing a part of a machine for manufacturing a water absorbing agent of the present embodiment has a casing 2 as a fixed cylinder fixed, for example, horizontally.

As shown on the right side of FIG. 6, the casing 2 is provided with a material supply port 3 for supplying and introducing fine particles of a water absorbing resin, and with a liquid supply port 4 for introducing an aqueous liquid such as a crosslinking agent in the ejection side of the material supply port 3. As shown on the far left of FIG. 6, the casing 2 is provided with an ejection port 5.

In order to uniformly mix the water absorbing resin containing a carboxyl group with the aqueous liquid containing, for example, a crosslinking agent that can react with the carboxyl group, the mixer, 54, of a continuous extruding method of the present embodiment has such a structure that a plurality of agitating blades 7 are provided as agitating members around the rotational shaft 6 inside the casing 2, and the agitating blades 7 are of a plurality of types of different shapes.

In the present embodiment, the mixer, 54, of a continuous extruding method has first agitating blades, 7a, of a paddle-like shape provided around the rotational shaft 6 in a portion from the edge of the material supply port 3 up to about 25%, and also in a portion from the edge on the side where the ejection port 5 is disposed up to about 25%, with the length of the segment of the rotational shaft 6 inside the casing 2 designated as 100%, and has second agitating blades, 7b, of a column-like shape with hemispherical top edges provided around the rotational shaft 6 in the central portion sandwiched between those two portions.

As thus provided with the first agitating blades 7a, the second agitating blades 7b, and the first agitating blades 7a disposed spirally around the rotational shaft in this order from the side where the material supply port 3 is disposed, the mixer, 54, of a continuous extruding method forms a first area, a second area, and a third area, that is a mixture ejection area, in this order from the side where the material supply port 3 is disposed.

In the mixer, 54, of a continuous extruding method, the ejection port 5 is disposed on the bottom wall of the casing 2, opposite to the side where the material supply port 3 is disposed.

In the mixer, 54, of a continuous extruding method, the first agitating blades 7a and the second agitating blades 7b have a mounting nut at lower parts thereof, and are fixed to the rotational shaft 6 by the mounting nuts.

The first agitating blades 7a are fixed around the rotational shaft 6 so that the first agitating blades 7a are perpendicular to the rotational shaft 6 and so that the water-absorbing-resin-extruding faces 7a, slant with respect to the plane perpendicular to the rotational shaft 6, thereby applying a thrusting force to the water absorbing resin.

Although other conditions should also be taken into consideration, the mixer, 51, of a continuous extruding method adjusts the thrusting force, for example, by changing some of angles formed by the water-absorbing-resin-extruding faces $7a_1$ of the first agitating blades 7a and the plane perpendicular to the rotational shaft 6 and by partly changing the arrangement density of the first agitating blades 7a.

In the mixer, 54, of a continuous extruding method, the second agitating blades 7b are formed in a column-like shape and fixed perpendicular to the rotational shaft 6. Therefore, no thrusting force is generated by the second agitating blades 7b in the second area, and the water absorbing resin is extruded only by the thrusting force of the first agitating blades 7a provided in the first area. Although by a small amount, the thrusting force is reduced by the resistance of the second agitating blades 7b. This makes the thrusting force weaker as closer to the ejection port 5 in the second area.

As described above, the second agitating blades 7b form, in the ejection side of the first agitating blades 7a, the second area in which the thrusting force is weaker than the thrusting force in the first area, that is the area in which the first agitating blades 7a are provided.

Therefore, also in the mixer, 51, of a continuous extruding method, in the area in which the second agitating blades 7b are provided (in the second area), the thrusting force is weaker than that in the area in which the first agitating blades 7b are provided (in the first area), and the average speed of the water absorbing resin decreases. As a result, in the area in which the second agitating blades 7b are provided, the water absorbing resin stays and is uniformly mixed with the aqueous liquid by the second agitating blades 7b.

Besides, also in the mixer, 54, of a continuous extruding method, the material supply port 3 for introducing the water absorbing resin particles is formed in the area in which the first agitating blades 7a are provided, that is the first area, and the liquid supply port 4 for introducing the aqueous liquid containing a crosslinking agent is formed in the area in which the second agitating blades 7b are provided, that is the second area. This allows the water absorbing resin and the aqueous liquid to be instantly and wholly brought into contact with each other in the mixer, 54, of a continuous extruding method also and produces a mixture free from concretion.

The mixer, 54, of a continuous extruding method has more first agitating blades 7a provided in the ejection side of the second agitating blades 7b as the mixture ejection area (third area). The mixer, 54, of a continuous extruding method thereby can efficiently extrude the water absorbing resin uniformly mixed with the aqueous liquid (mixture) out of the mixer, 54, of a continuous extruding method.

In the mixer, 54, of a continuous extruding method, the first agitating blades 7a in the first and third areas, although having the same shape, are disposed so that the blade faces face different directions in the first and third areas. In other words, the first agitating blades 7a disposed in the two areas adjust the direction of the thrusting force depending upon the position of the ejection port 5.

The mixer, 54, of a continuous extruding method is configured so that the directions of the blade faces of the first agitating blades 7a differ in the first area and in the third area, because the ejection port 5 is provided on the bottom wall of the casing 2. However, for example, if the ejection port 5 is provided on the edge of the casing 2 where the water absorbing resin is ejected, such an arrangement that the thrusting force has the same direction in the first area and in the third area suffices.

As described above, in the mixer, 54, of a continuous extruding method, the thrusting force near the ejection port 5 is strengthened, and the mixture is suitably ejected, by disposing the first agitating blades, 7a, of a paddle-like shape in the ejection side of the second agitating blades 7b.

[THIRD EMBODIMENT]

Figure 7:
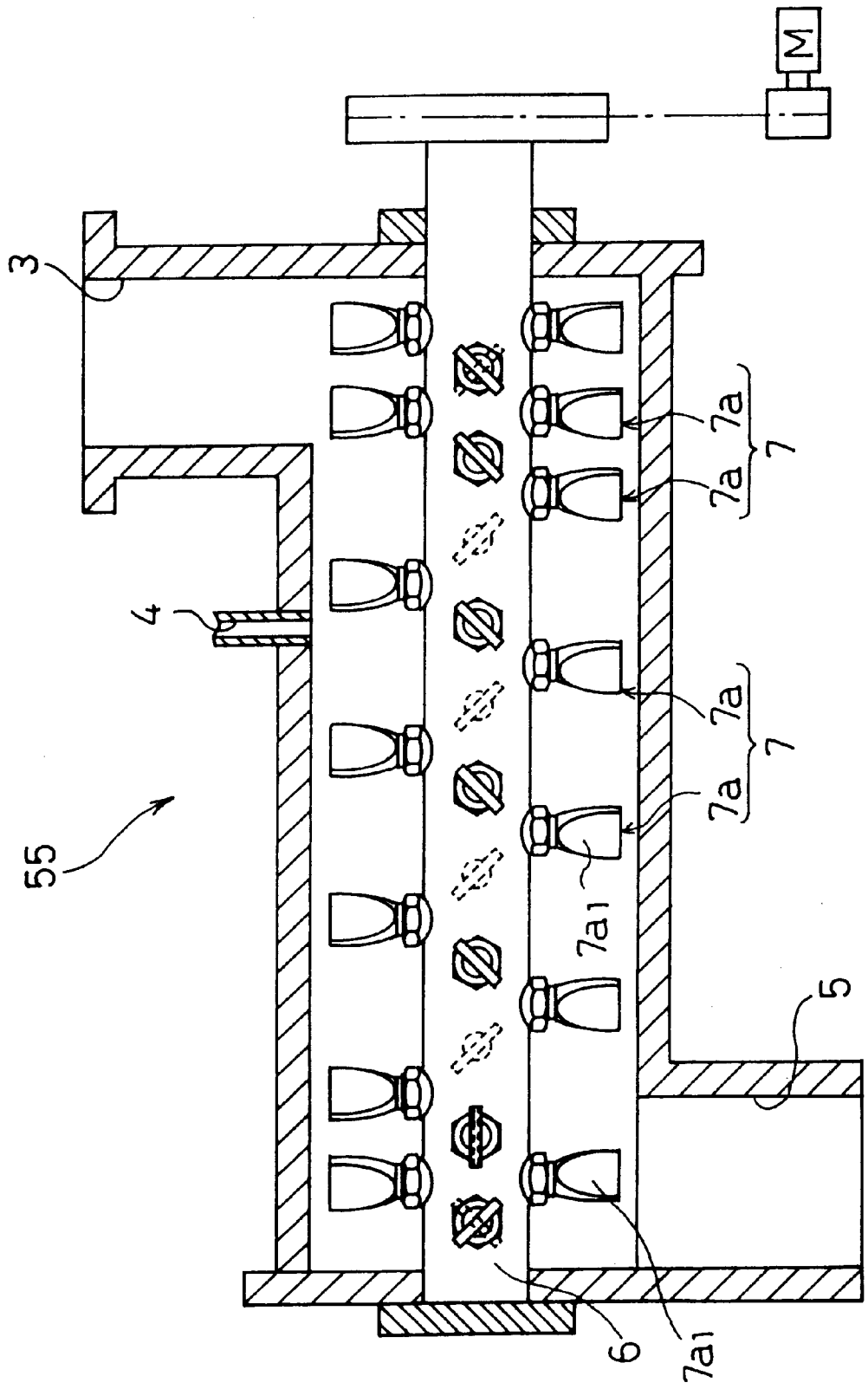
FIG. 7 is a schematic cross-sectional view showing a mixer of a continuous extruding method incorporated in a machine for manufacturing a water absorbing agent of still another embodiment in accordance with the present invention.
Figure 8:
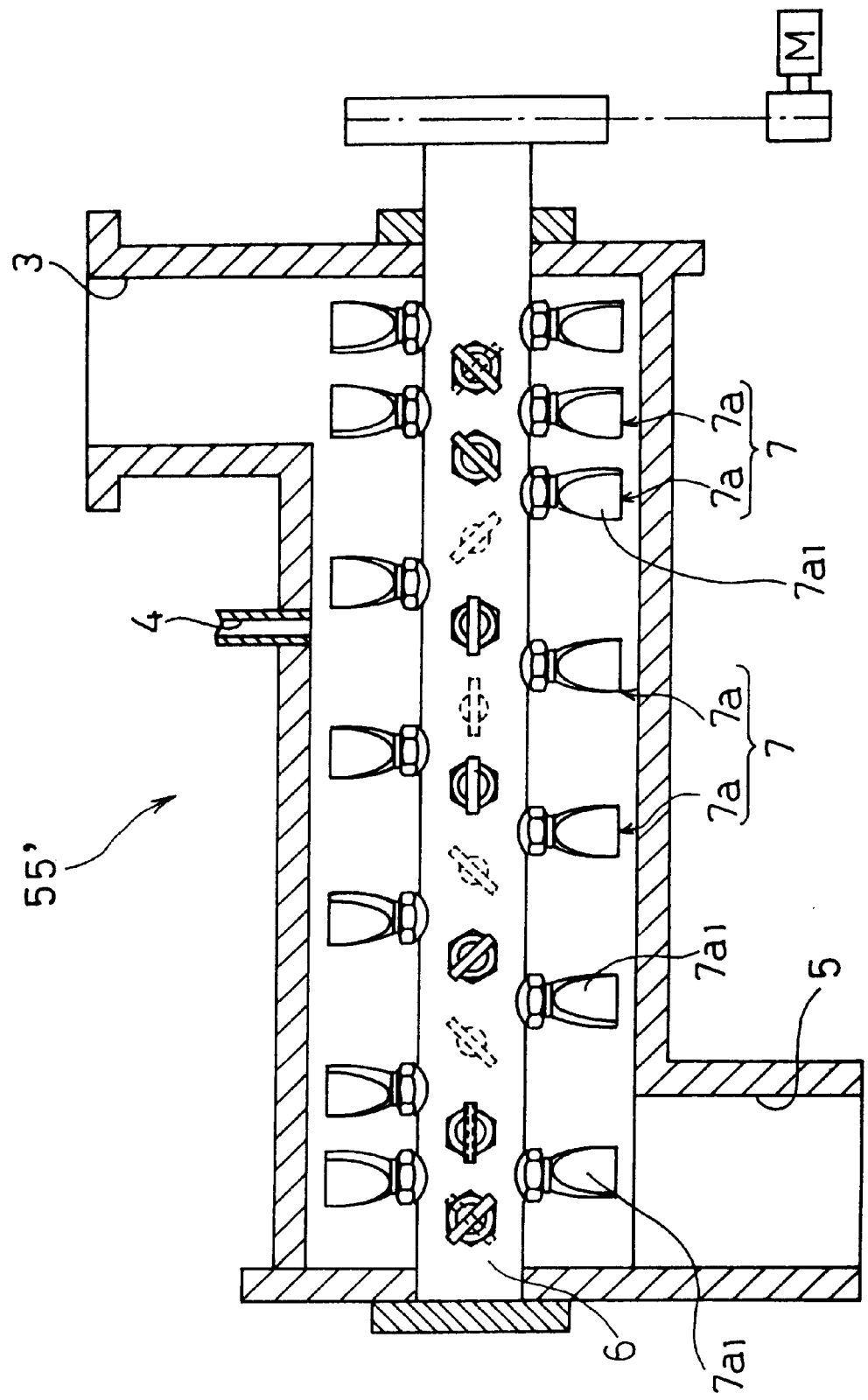
FIG. 8 is a schematic cross-sectional view showing a mixer of a continuous extruding method incorporated in a machine for manufacturing a water absorbing agent of still another embodiment in accordance with the present invention.

Referring to FIGS. 7 and 8, the following description will discuss an embodiment in accordance with the present invention, with an emphasis on differences from the first and second embodiments. For convenience, members of the present embodiment that have the same arrangement and function as members of the first embodiment, and that are mentioned in the first embodiment are indicated by the same reference numerals and description thereof is omitted.

As shown in FIG. 7, a high-speed agitation type mixer, 55, of a continuous extruding method composing a part of a machine for manufacturing a water absorbing agent of the present embodiment has a casing 2 as a fixed cylinder fixed, for example, horizontally.

As shown on the right side of FIG. 7, the casing 2 is provided with a material supply port 3 for supplying and introducing fine particles of a water absorbing resin, and with a liquid supply port 4 for introducing an aqueous liquid such as a crosslinking agent in the ejection side of the material supply port 3. As shown on the far left of FIG. 7, the casing 2 is provided with an ejection port 5.

In order to uniformly mix the water absorbing resin containing a carboxyl group with the aqueous liquid containing, for example, a crosslinking agent that can react with the carboxyl group, the mixer, 55, of a continuous extruding method of the present embodiment has such a structure that a plurality of agitating blades 7 are provided as agitating members around the rotational shaft 6 inside the casing 2, and the agitating blades 7 are of a single type of the same shape.

In the present embodiment, the mixer, 55, of a continuous extruding method is provided with first agitating blades, 7a, of a paddle-like shape around the rotational shaft 6 disposed inside the casing 2. The arrangement density of the first agitating blades 7a is varied partly.

To be more specific, in the mixer, 55, of a continuous extruding method, the first agitating blades 7a are provided around the rotational shaft 6, for example, in a relatively high arrangement density in a portion from the edge of the material supply port 3 up to about 25%, and also in a portion from the edge on the side where the ejection port 5 is disposed up to about 25%, with the length of the segment of the rotational shaft 6 inside the casing 2 designated as 100%, and in a relatively low arrangement density in the central portion sandwiched between those two portions.

As thus provided with the first agitating blades 7a spirally disposed around the rotational shaft in high, low, and high arrangement densities sequentially from the side where the material supply port 3 is disposed, the mixer, 55, of a continuous extruding method forms a first area, a second area, and a third area, that is a mixture ejection area, sequentially from the side where the material supply port 3 is disposed.

In the mixer, 55, of a continuous extruding method, the ejection port 5 is disposed on the bottom wall of the casing 2, opposite to the side where the material supply port 3 is disposed.

In the mixer, 55, of a continuous extruding method, the first agitating blades 7a have a mounting nut at lower parts thereof, and are fixed to the rotational shaft 6 by the mounting nuts.

The first agitating blades 7a disposed in the first and second areas are fixed around the rotational shaft 6 so that the first agitating blades 7a are perpendicular to the rotational shaft 6 and so that the water-absorbing-resin-extruding faces $7a_1$ slant with respect to the plane perpendicular to the rotational shaft 6, thereby applying a thrusting force to the water absorbing resin.

In the present embodiment, the mixer, 55, of a continuous extruding method is provided with the agitating blades 7 that have the same shape in the first and second areas, and that have blade faces (e.g., the water-absorbing-resin-extruding faces $7a_1$) facing the same direction. In the mixer, 55, of a continuous extruding method of the present embodiment, the angles formed by the water-absorbing-resin-extruding faces $7a_1$ of the first agitating blades 7a disposed in the first and second areas and the plane perpendicular to the rotational shaft 6 are all set to 45°.

However, in the mixer, 55, of a continuous extruding method, since the arrangement density of the first agitating blades 7a in the second area (the central portion) is lower than that in the first area (from the edge of the material supply port 3 up to about 25% of the length of the rotational shaft 6), the thrusting force in the second area is weaker than that in the first area.

Therefore, also in the present embodiment, the average speed of the water absorbing resin in the second area decreases, compared to that in the first area. As a result, the water absorbing resin is mixed with the aqueous liquid in the second area.

However, in the present embodiment, the mixer, 55, of a continuous extruding method adjusts the thrusting force in the first and second areas only with the arrangement densities of the first agitating blades 7a. Therefore, the change in the thrusting force when the water absorbing resin moves from the first area to the second area, and the difference between the thrusting forces in the first and second areas is smaller than those in the first and second embodiments.

In the present invention, in order to carry out more uniform mixing, when the water absorbing resin moves from the first area to the second area, the thrusting force preferably changes as greatly as possible, instead of gradually.

Therefore, in order to carry out more uniform mixing, for example, the difference between the thrusting forces in the first and second areas is preferably made even larger by changing in the first and second areas, for example, the angles formed by the water-absorbing-resin-extruding faces $7a_1$ of the first agitating blades 7a and the plane perpendicular to the rotational shaft 6.

In this case, the difference between the thrusting forces can be made even larger by, for example, disposing the agitating blades 7 in the second area so that the blade faces thereof are parallel to a direction of the rotational shaft 6 as shown in the mixer, 55', of a continuous extruding method of FIG. 8, or, for example, disposing the agitating blades 7 in the second area so that the water-absorbing-resin-extruding faces $7a_1$ face opposite to the first area.

That is, when the agitating blades 7 are disposed so that the blade faces thereof are parallel to a direction of the rotational shaft 6, no thrusting force is generated by the agitating blades 7 (first agitating blades 7a). Besides, when the agitating blades 7 are, for example, disposed so that the water-absorbing-resin-extruding faces $7a_1$ face opposite to the first area, a thrusting force in an opposite direction to that in the first area is generated by the agitating blades 7 (first agitating blades 7a).

The blade faces of the agitating blades 7 in the first and second areas, especially, those in the second area, do not necessarily face the same direction. For instance, the blade faces of the agitating blades 7 in the second area (angles formed by the water-absorbing-resin-extruding faces $7a_1$ and the plane perpendicular to the rotational shaft 6) can be individually set, as shown in the mixer, 55', of a continuous extruding method of FIG. 8, according to the strength of the thrusting force in the first area in such a range that the thrusting force in the second area is weaker than that in the first area, and that the water absorbing resin receives a thrusting force extruding the water absorbing resin towards the ejection port 5.

Also in the mixers, 55 and 55', of a continuous extruding method, as shown in FIGS. 7 and 8, the thrusting force near the ejection port 5 is strengthened and the mixture is suitably ejected, by forming a third area (a mixture ejection area), that is an area with a high arrangement density of the first agitating blades 7a, in the ejection side of the second area.

[FOURTH EMBODIMENT]

Figure 9:
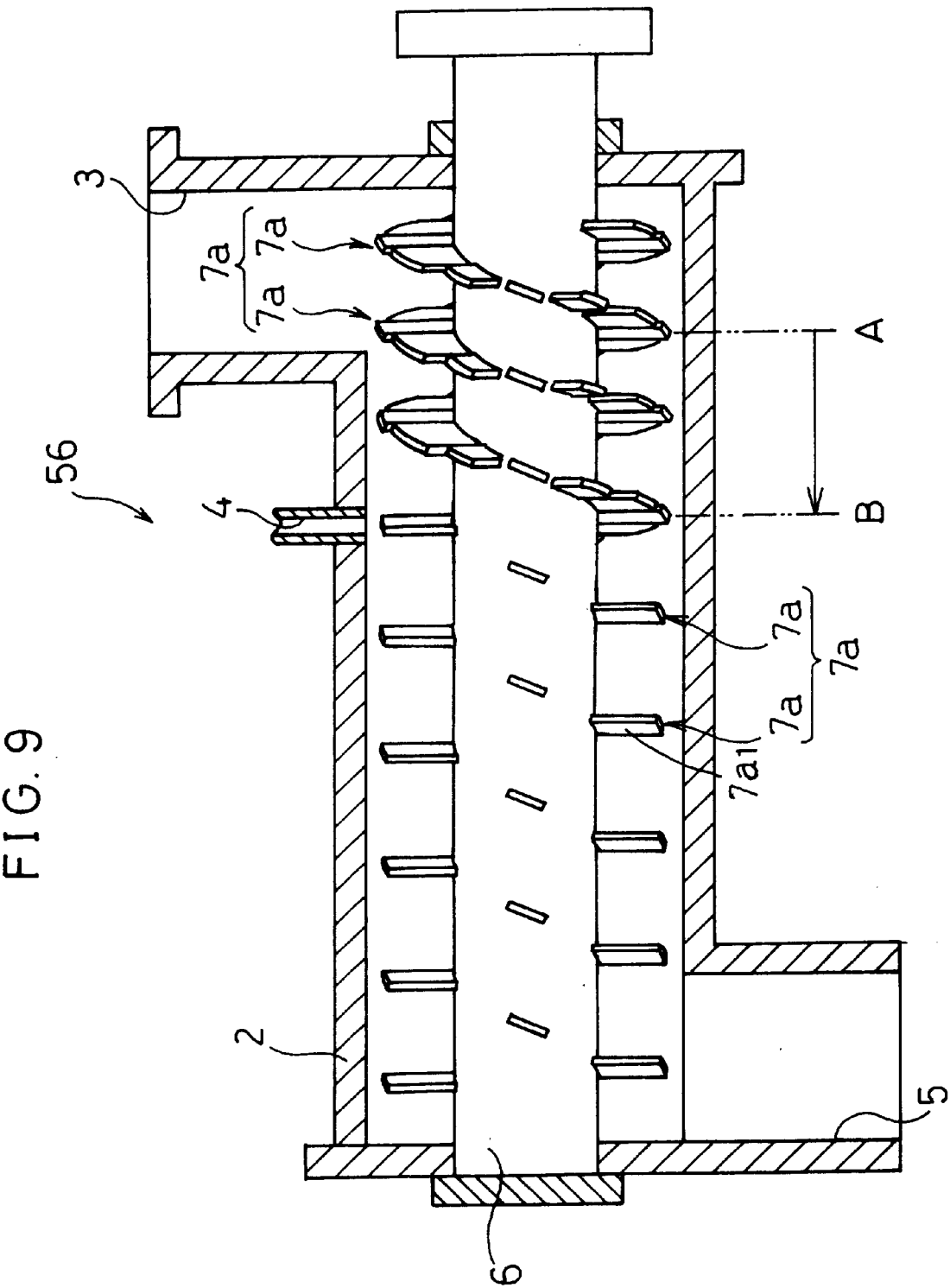
FIG. 9 is a schematic cross-sectional view showing a mixer of a continuous extruding method incorporated in a machine for manufacturing a water absorbing agent of still another embodiment in accordance with the present invention.

Referring to FIG. 9, the following description will discuss an embodiment in accordance with the present invention, with an emphasis on differences from the first embodiment. For convenience, members of the present embodiment that have the same arrangement and function as members of the first embodiment, and that are mentioned in the first embodiment are indicated by the same reference numerals and description thereof is omitted.

As shown in FIG. 9, a high-speed agitation type mixer, 56, of a continuous extruding method composing a part of a machine for manufacturing a water absorbing agent of the present embodiment has a casing 2 as a fixed cylinder fixed, for example, horizontally.

As shown on the right side of FIG. 9, the casing 2 is provided with a material supply port 3 for supplying and introducing fine particles of a water absorbing resin, and with a liquid supply port 4 for introducing an aqueous liquid such as a crosslinking agent in the ejection side of the material supply port 3. As shown on the far left of FIG. 9, the casing 2 is provided with an ejection port 5.

In order to uniformly mix the water absorbing resin containing a carboxyl group with the aqueous liquid containing, for example, a crosslinking agent that can react with the carboxyl group, the mixer, 56, of a continuous extruding method of the present embodiment has such a structure that a plurality of agitating blades 7 are provided as agitating members around the rotational shaft 6 inside the casing 2, and the agitating blades 7 are of a plurality of types of different shapes.

In the present embodiment, the mixer, 56, of a continuous extruding method is provided with first agitating blades, 7a, of a rectangular plate-like shape disposed double-spirally around the rotational shaft 6 inside the casing 2. The arrangement density and the shape (size) of the first agitating blades 7a are varied partly.

In the mixer, 56, of a continuous extruding method, for example, in a portion from the edge of the material supply port 3 up to about 35% of the length of the rotational shaft 6 (a first area), the first agitating blades 7a of the same kind as in the first embodiment are provided with a relatively high arrangement density so that the lead equals double the pitch like a double-threaded screw. In a portion from the edge on the side where the ejection port 5 is disposed up to about 65% of the length of the rotational shaft 6 (a second area), the first agitating blades 7a formed in a rectangular thin plate-like shape are provided with a lower arrangement density than that in the first area.

The average speed of the first agitating blades 7a in the first area of the mixer, 56, of a continuous extruding method is set to be faster than the average speed of the first agitating blades 7a in the first area of the mixer, 1, of a continuous extruding method. That is, in the mixer, 56, of a continuous extruding method, since the first agitating blades 7a are arranged so that the lead equals double the pitch, for example, in FIG. 9, the water absorbing resin at the point A moves to the point B as the rotational shaft 6 rotates a turn.

The first agitating blades 7a disposed in the first and second areas are fixed around the rotational shaft 6 so that the first agitating blades 7a are perpendicular to the rotational shaft 6 and so that the water-absorbing-resin-extruding faces $7a_1$ slant with respect to the plane perpendicular to the rotational shaft 6, thereby applying a thrusting force to the water absorbing resin. However, the angles formed by the water-absorbing-resin-extruding faces $7a_1$ of the first agitating blades 7a disposed in the first and second areas and the plane perpendicular to the rotational shaft are all equal.

In the present embodiment, as in the third embodiment, the thrusting force is generated in both the first and second areas. However, due to a difference in the arrangement density and the shape of the first agitating blades 7a in the first and second areas, the difference between the thrusting forces in the first and second areas in the mixer, 56, of a continuous extruding method is larger than that in the mixer, 55, of a continuous extruding method of the third embodiment.

Also in the present embodiment, in the second area, the thrusting force is weaker than that in the first area, and the average speed of the water absorbing resin decreases. As a result, the water absorbing resin stays and is uniformly mixed with the aqueous liquid in the second area by the first agitating blades 7a disposed in the second area.

[FIFTH EMBODIMENT]

Figure 10:
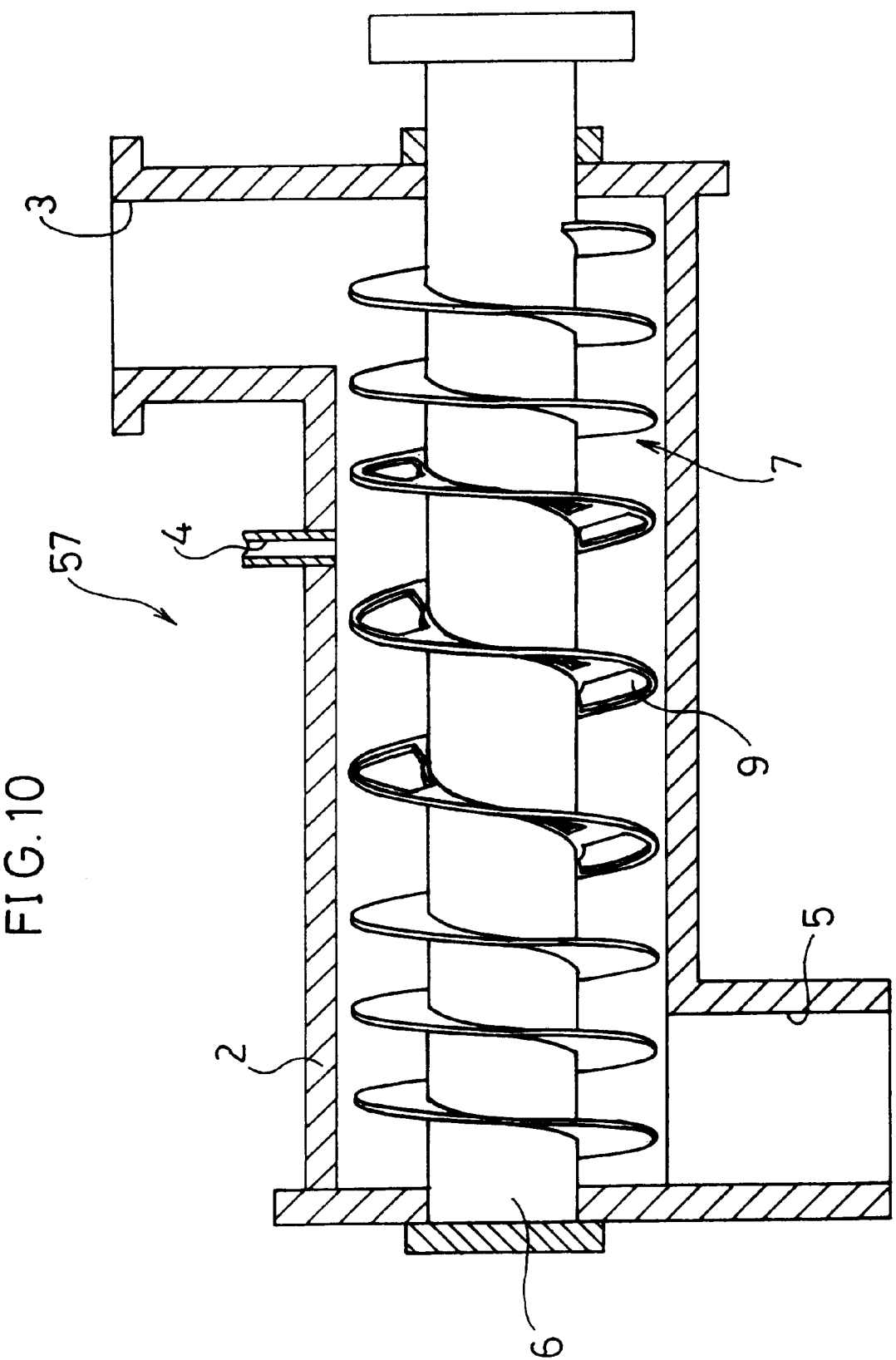
FIG. 10 is a schematic cross-sectional view showing a mixer of a continuous extruding method incorporated in a machine for manufacturing a water absorbing agent of still another embodiment in accordance with the present invention.
Figure 11:
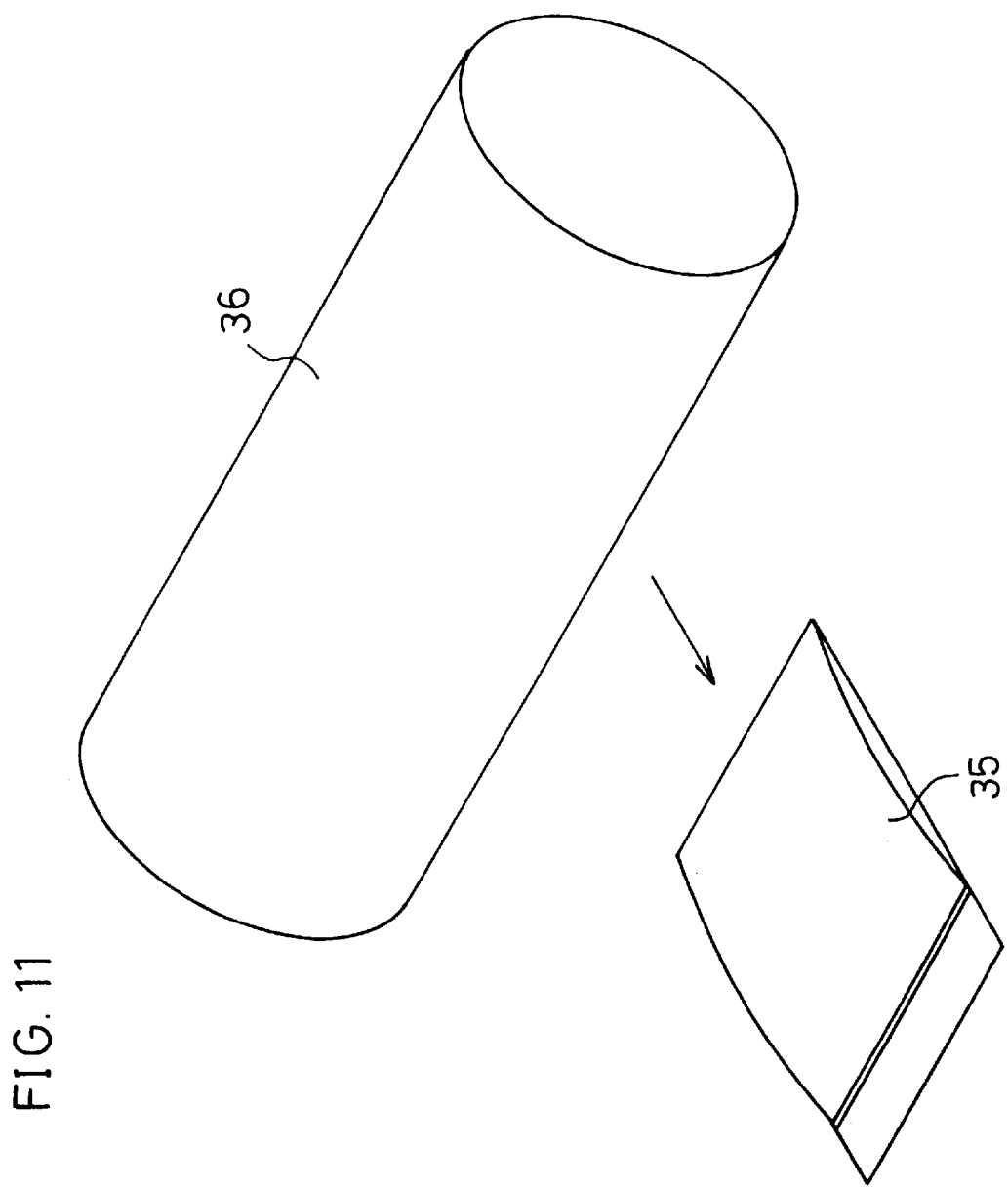
FIG. 11 is a perspective view showing a device for applying an impact force (A) to the water absorbing agent.
Figure 12:
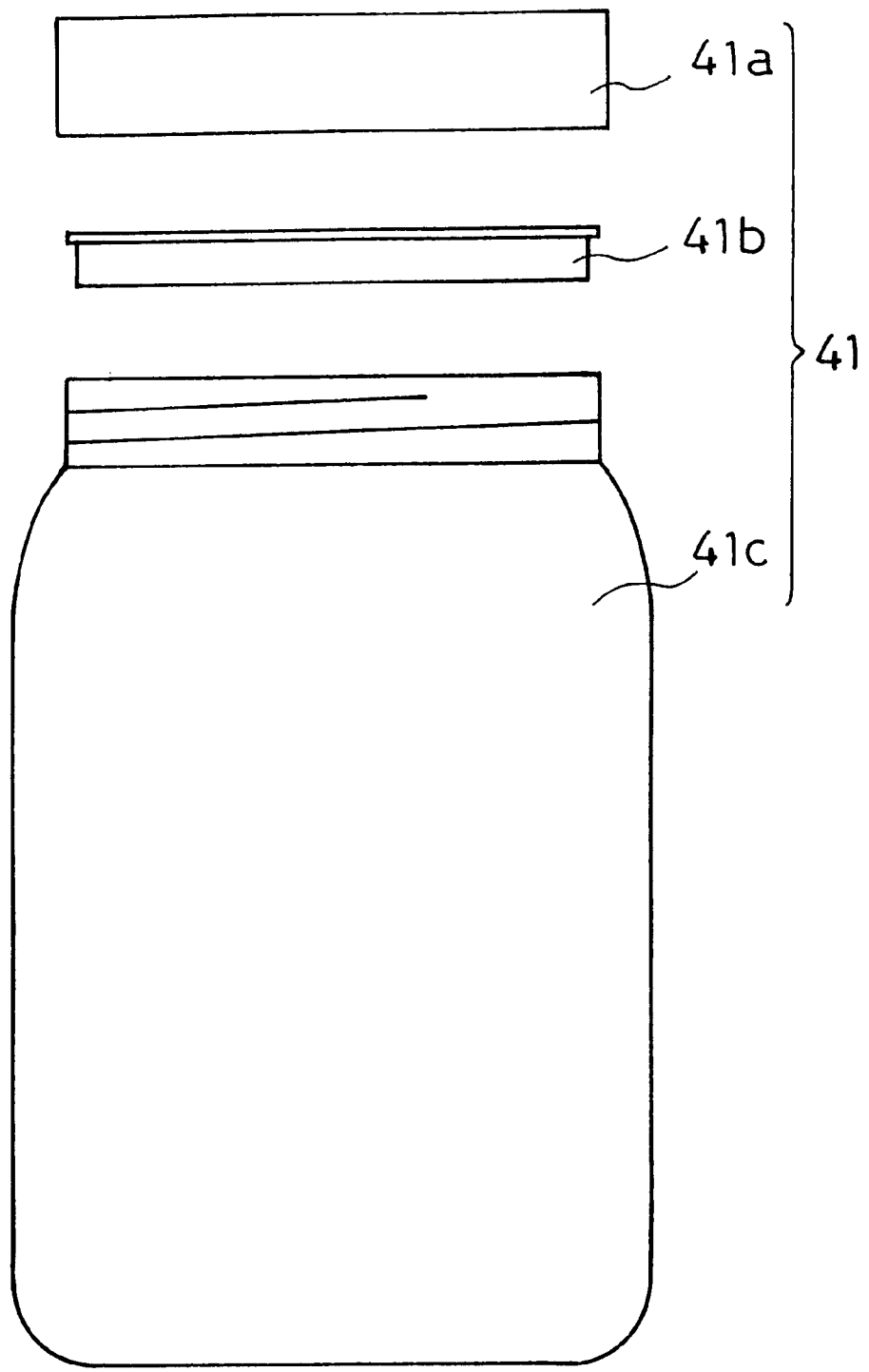
FIG. 12 is a perspective view showing a container for applying an impact force (B) to the water absorbing agent.
Figure 13A:
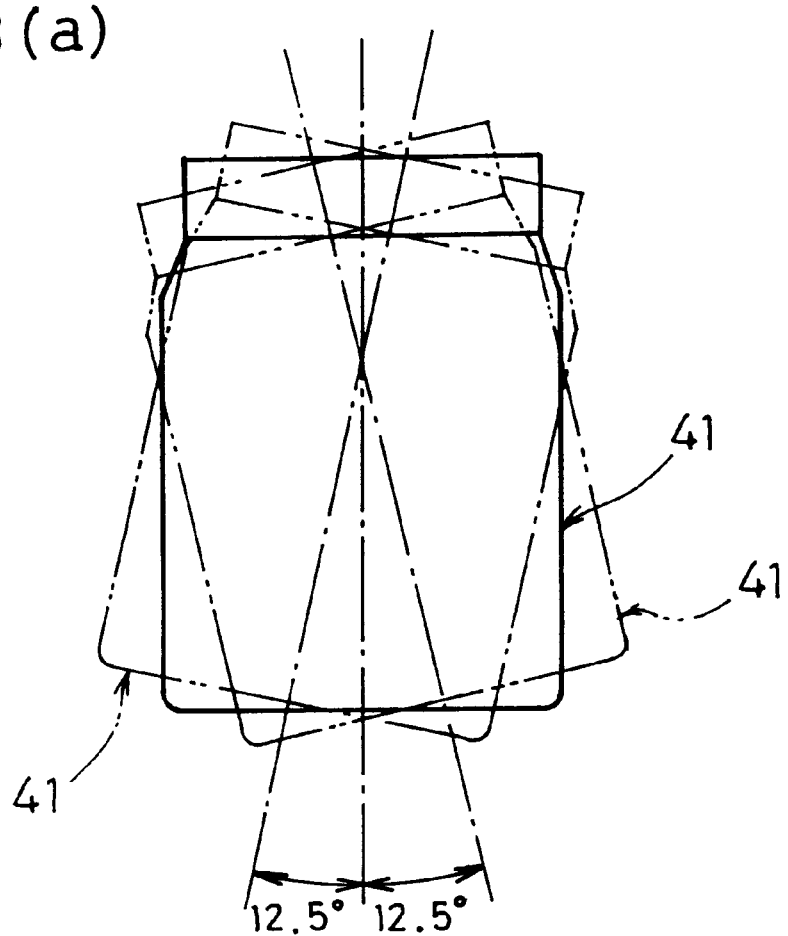
FIG. 13(a) is an explanatory view showing how to apply vibration to the container to apply the impact force (B) to the water absorbing agent.
Figure 13B:
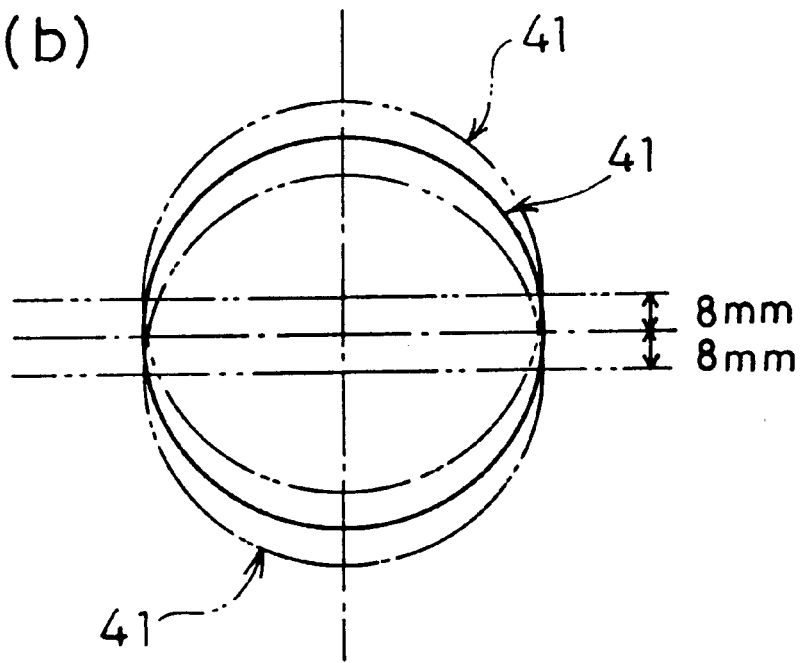
FIG. 13(b) is an explanatory view showing how to apply vibration to the container to apply the impact force (B) to the water absorbing agent, from a different viewpoint.
Figure 14:
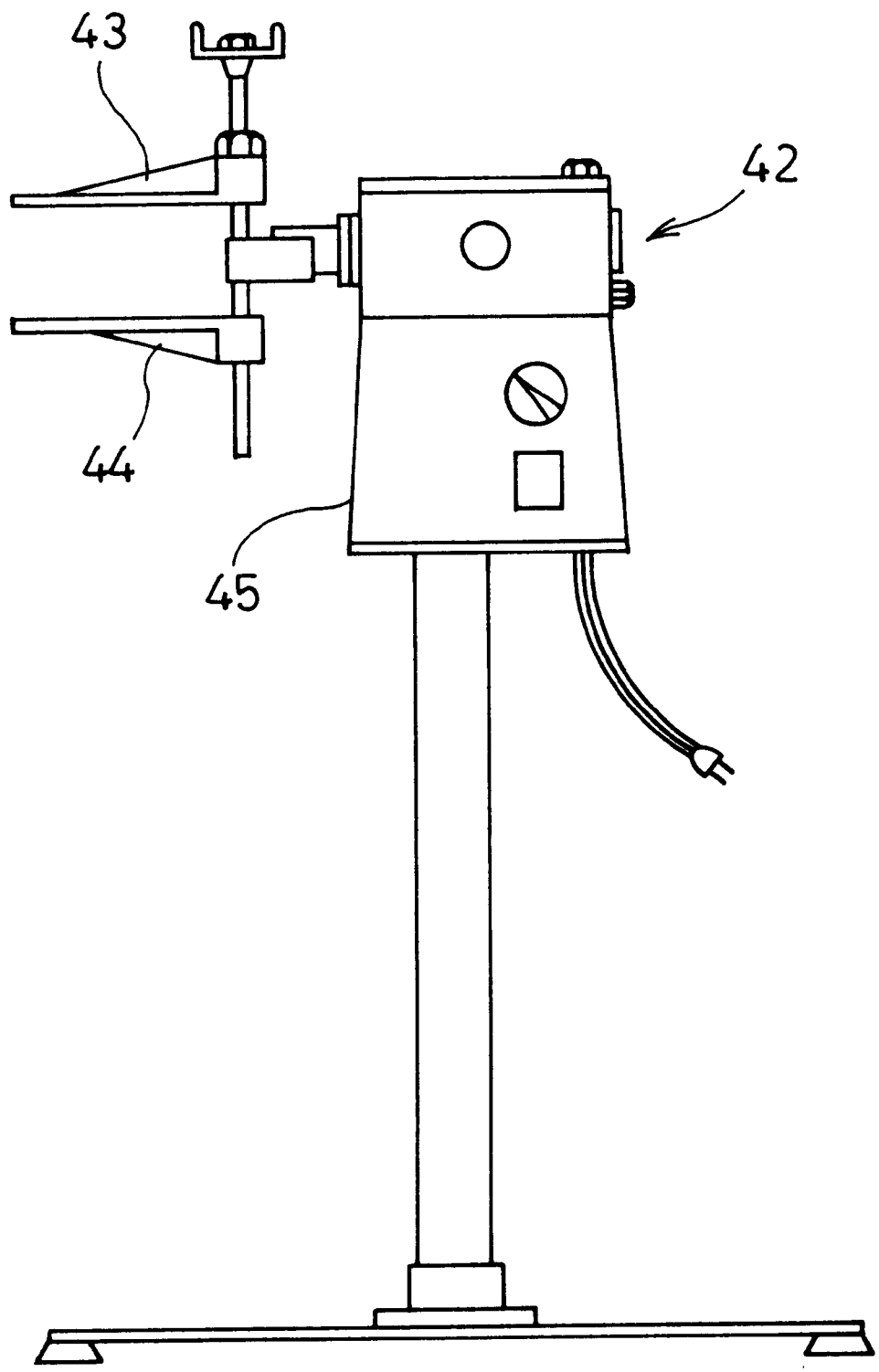
FIG. 14 is a schematic view showing a device for applying the impact force (B) to the water absorbing agent.
Figure 15:
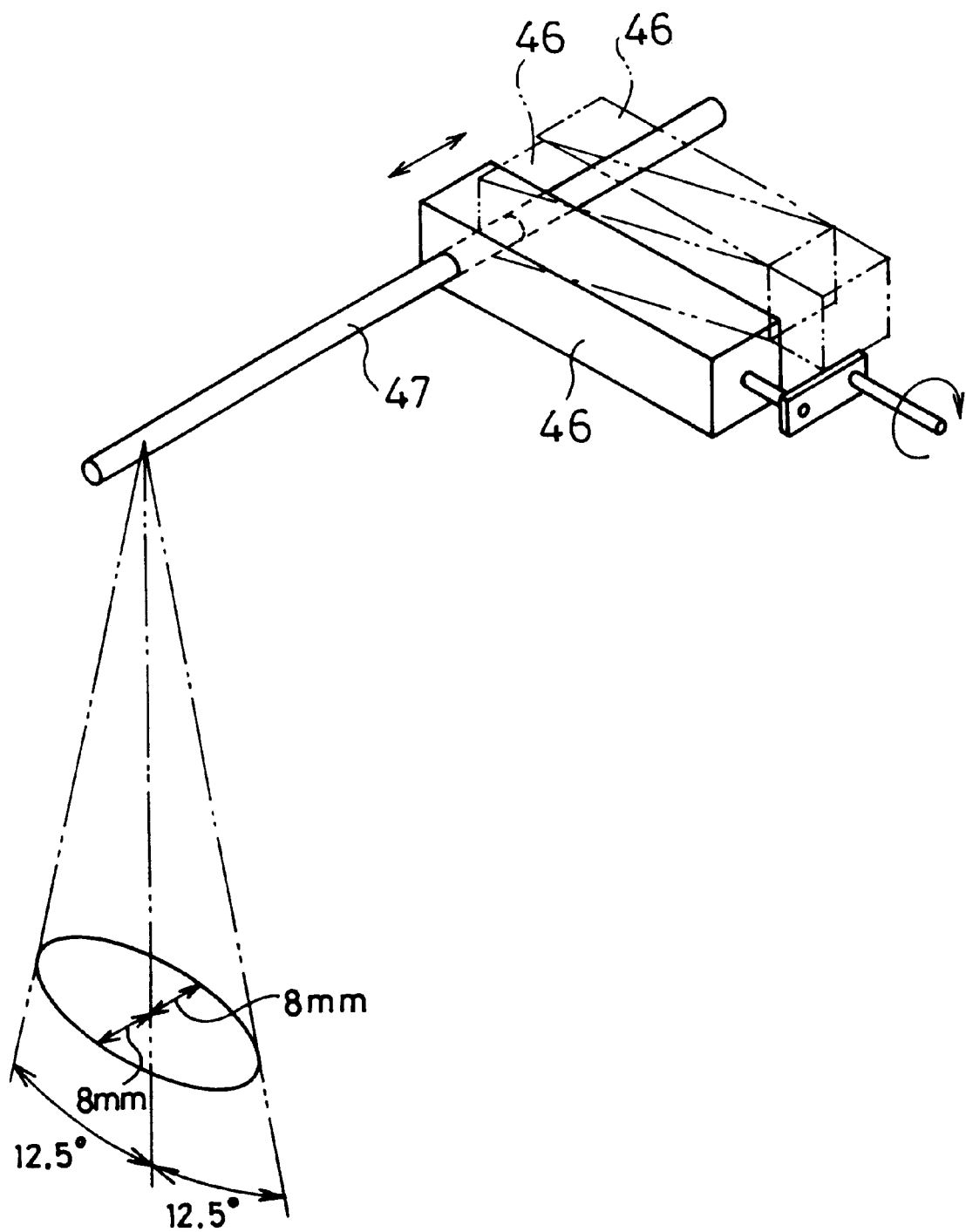
FIG. 15 is an explanatory view showing how the container is vibrated for applying the impact force (B) to the water absorbing agent.

Referring to FIG. 10, the following description will discuss an embodiment in accordance with the present invention, with an emphasis on differences from the first and second embodiments. For convenience, members of the present embodiment that have the same arrangement and function as members of the first embodiment, and that are mentioned in the first embodiment are indicated by the same reference numerals and description thereof is omitted.

As shown in FIG. 10, a high-speed agitation type mixer, 57, of a continuous extruding method composing a part of a machine for manufacturing a water absorbing agent of the present embodiment has a casing 2 as a fixed cylinder fixed, for example, horizontally.

As shown on the right side of FIG. 10, the casing 2 is provided with a material supply port 3 for supplying and introducing fine particles of a water absorbing resin, and with a liquid supply port 4 for introducing an aqueous liquid such as a crosslinking agent in the ejection side of the material supply port 3. As shown on the far left of FIG. 10, the casing 2 is provided with an ejection port 5.

In order to uniformly mix the water absorbing resin containing a carboxyl group with the aqueous liquid containing, for example, a crosslinking agent that can react with the carboxyl group, the mixer, 57, of a continuous extruding method of the present embodiment has such a structure that a single agitating blade 7 of a screw-blade-like shape is provided around the rotational shaft 6 inside the casing 2 as an agitating member.

In the present embodiment, a segment of the agitating blade 7 that is to become a second area has apertures 9 on the blade face thereof. In the present embodiment, the portion from the edge of the material supply port 3 up to about 25% is designated as a first area, the portion from the edge on the side where the ejection port 5 is disposed up to about 25% is designated as a third area, with the length of the segment of the rotational shaft 6 inside the casing 2 designated as 100%, and the central portion sandwiched between the first and second areas is designated as a second area.

The mixer, 57, of a continuous extruding method adjusts the thrusting force by, for example, the provision of the apertures 9 to the agitating blade 7, although other conditions should also be taken into consideration. That is, in the mixer, 57, of a continuous extruding method, the agitating blade 7 is formed in such a shape to generate a weaker thrusting force in the second area than in the first area.

Therefore, also in the mixer, 57, of a continuous extruding method, in the second area, the thrusting force is weaker than in the first area, and the average speed of the water absorbing resin decreases. As a result, the water absorbing resin stays and is uniformly mixed with the aqueous liquid in the second area by the agitating blade 7 disposed in the second area.

The agitating blade 7 has, as a mixture ejection area (third area), a portion with no aperture in the ejection side of the second area. The mixer, 57, of a continuous extruding method thereby strengthens the thrusting force near the ejection port 5 and suitably ejects the mixture.

The following description will discuss the present invention further in detail by way of examples and comparative examples, which by no means limit the scope of the present invention. The characteristics of the water absorbing resin were measured in the methods detailed below.

(a) Absorbency Without Pressure

A water absorbing agent of 0.2 g was uniformly put into a bag (60 mm×60 mm) of unwoven cloth, and then immersed in a 0.9 weight percent water solution of sodium chloride (saline solution). The bag was lifted 60 minutes later. Water was removed with a centrifugal separator operating for 3 minutes at 250 G; the bag then weighed $W_1$ (g). The same process was repeated, using no water absorbing agent; the bag then weighed $W_0$ (g). Absorbency without pressure (g/g) was then calculated according to the following equation:

Absorbency Without Pressure (g/g)=(Weight $W_1$ (g)−Weight $W_0$ (g))/Weight of Water Absorbing Agent (g)

The absorbency without pressure of a water absorbing resin, a water absorbing resin mixture, and a water absorbing resin granulation product were calculated with the same method as in the case that a water absorbing agent was used.

(b) Absorbency Under High Pressure

Figure 16:
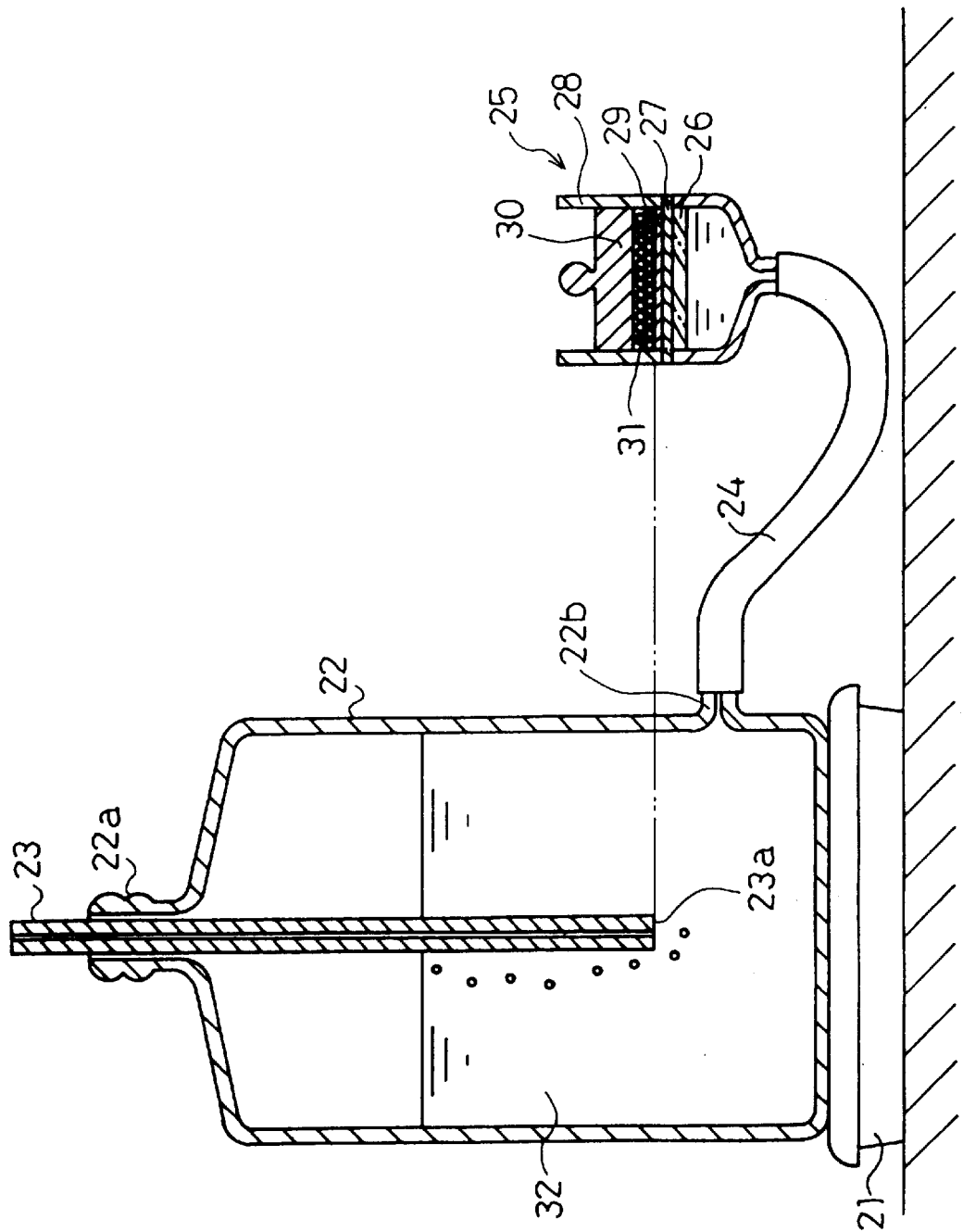
FIG. 16 is a cross-sectional view showing a device for measuring absorbency under pressure of the water absorbing agent.

Referring to FIG. 16, the measuring device used for measuring absorbency under pressure will be explained.

As shown in FIG. 16, the measuring device is composed of a balance 21, a container 22 of a predetermined capacity mounted on the balance 21, an external air sucking pipe sheet 23, a conduit 24, a glass filter 26, and a measuring section 25 mounted on the glass filter 26.

The container 22 has an aperture 22a on the top thereof, and an aperture 22b on the side wall thereof. The external air sucking pipe 23 is inserted through the aperture 22a of the container 22, and the conduit 24 is attached to the aperture 22b.

The container 22 contains therein a saline solution 32 of a predetermined amount. The lower outlet of the external air sucking pipe 23 is immersed in the saline solution 32. The external air sucking pipe 23 is provided in order to maintain pressure inside the container 22 equal to atmospheric pressure. The glass filter 26 is formed with a diameter of 55 mm. The container 22 and the glass filter 26 are interconnected by the conduit 24 made of a silicon resin. The glass filter 26 is fixed in terms of its relative position and height to the container 22.

The measuring section 25 includes filter paper 27, a support cylinder 28, a metal net 29 attached to the bottom of the support cylinder 28, and a weight 30. The measuring section 25 is formed by stacking mounting the filter paper 27 and the support cylinder 28 having the metal net 29 at the bottom thereof in this order on the glass filter 26, and by mounting the weight 30 inside the support cylinder 28, i.e. on the metal net 29. The metal net 29 is made of stainless steal and fabricated at 400 mesh (sieve opening of 38 $\mu$m). The upper side of the 29, i.e. the contact side of the metal net 29 with a water absorbing agent 31, is set as high as the lower outlet 23a of the external air sucking pipe 23. A water absorbing agent of a predetermined amount and particle diameter is uniformly dispersed on the metal net 29. The weight 30 is adjusted in weight so as to be capable of uniformly applying a load of 50 g/cm$^2$ to the water absorbing agent 31 on the metal net 29.

The absorbency under high pressure of the water absorbing agent 31 was measured with the measuring device configured as above. The measuring method will be explained in the following.

First, the saline solution 32 of a predetermined amount was put in the container 22, and necessary preparatory actions, e.g. insertion of the external air sucking pipe 23, were done. Next, the filter paper 27 was mounted on the glass filter 26, and meanwhile the water absorbing agent of 0.9 g was uniformly dispersed inside the support cylinder 28, i.e. on the metal net 29, and the weight 30 is mounted on the water absorbing resin 31 at the same time with the mounting action.

Next, the metal net 29, of the support cylinder 28, on which the water absorbing agent 31 and the weight 30 were mounted was mounted on the filter paper 27 so that the central part of the metal net 29 conformed with that of the glass filter 26.

Then, the weight of the saline solution 32 soaked up by the water absorbing agent 31 during 60 minutes since the time when the support cylinder 28 was mounted on the filter paper 27 was determined from a value measured with the balance 21.

The same process was repeated, using no water absorbing agent. Then, the blank weight, i.e. the weight of the saline solution 32 soaked up by members other than the water absorbing agent 31 such as the filter paper 27, was determined from a value measured with the balance 21, and designated as the blank value. Next, the absorbency under high pressure (g/g) was calculated by making a correction of extracting the blank value and dividing the weight of the saline solution 32 actually soaked up by the water absorbing agent 31 by the weight of the water absorbing agent 31 (0.9 g).

(c) Absorbing Rate

A water absorbing agent of 1.000 g was sprinkled onto a Petri dish of glass having an inner diameter of about 60 mm. Next, 20.00 g of 0.4 weight percent common salt water of which the temperature is set to 25° was gently poured without a break at the center of the Petri dish, and the time (seconds) for the water absorbing agent to soak up all the common salt water was measured visually. A shorter soak-up time represents a higher absorbing rate.

EXAMPLE 1

For manufacture of a water absorbing resin containing a carboxyl group, a reactive liquid was prepared by solving 2.9 parts of polyethylene glycol diacrylate (n=8) as an internal crosslinking agent in 5500 parts of a 33 weight percent water solution of sodium acrylate (neutralizing ratio of 75%) as a monomer component. Then, the reactive liquid was subjected to degassing for 30 minutes in an atmosphere of nitrogen gas.

Next, the reactive liquid was supplied to a reactor, that is a double-armed kneader of stainless steel with two sigma type vanes and a jacket, complete with a lid, and the air inside the reactor was replaced by nitrogen gas while keeping the reactive liquid at a temperature of 30° C. Subsequently, while stirring the reactive liquid, 2.4 parts of sodium persulfate as a polymerization initiator and 0.12 part of L-ascorbic acid as a reducer to accelerate decomposition of the polymerization initiator were added. Polymerization started in about one minute after the addition. Polymerization was carried out at temperatures of 30° C. to 80° C., and a water-containing gel-like polymer was taken out in 60 minutes since the time when polymerization started.

The resultant water-containing gel-like polymer was spread on a metal net of 50 mesh (sieve opening of 300 μm) and dried with hot air of 150° C. for 90 minutes. Next by grinding the dried product with a vibration mill and then classifying the ground product with a metal net of 20 mesh (sieve opening of 850 μm), a water absorbing resin of a ground irregular pulverized shape, having an average particle diameter of 400 μm and including 12 weight percent of particles having a particle diameter of less than 150 μm was obtained.

Next, a colored surface crosslinking agent composed of 0.1 part by weight of ethylene glycol diglycidylether, 4 parts by weight of water, and 1 part by weight of isopropyl alcohol was introduced into the mixer, 1, of a continuous extruding method shown in FIG. 1, i.e. a high-speed agitation type mixer having the first agitating blades, 7a, of a plate-like shape provided around the rotational shaft 6 in a portion from the edge of the material supply port 3 up to about 35%, and the second agitating blades, 7b, of a column-like shape provided in a portion from the edge on the side where the ejection port 5 was disposed up to about 65%, with the length of the segment of the rotational shaft 6 inside the casing 2 designated as 100%, and was continuously mixed and reacted with 100 parts by weight of the water absorbing resin.

The resultant mixture was colored uniformly. When the mixture was passed through a metal net of 20 mesh, the masses which could not be passed were 0.2%.

Thereafter, the mixture was treated with heat at a temperature of 195° C. for 40 minutes to obtain a water absorbing agent No. 1. The absorbency of the water absorbing agent No. 1 was measured without pressure and under high pressure. The results of the measurement are shown in Table 1.

EXAMPLE 2

A colored surface crosslinking agent composed of 0.5 part by weight of glycerol as a first surface crosslinking agent, 0.1 part by weight of ethylene glycol diglycidylether as a second surface crosslinking agent, 3 parts by weight of water, and 1 part by weight of ethyl alcohol was continuously mixed with 100 parts by weight of the same water absorbing resin as in the first example, using the same mixer, 1, of a continuous extruding method as in the first example.

The resultant mixture was colored uniformly. When the mixture was passed through a metal net of 20 mesh, the mass which could not be passed was 0%.

Thereafter, the mixture was treated with heat at a temperature of 195° C. for 40 minutes to obtain a water absorbing agent No. 2. The absorbency of the water absorbing agent No. 2 was measured without pressure and under high pressure. The results of the measurement are shown in Table 1.

EXAMPLE 3

A colored surface crosslinking agent composed of 0.5 part by weight of glycerol as a first surface crosslinking agent, 0.1 part by weight of ethylene glycol diglycidylether as a second surface crosslinking agent, 3 parts by weight of water, and 1 part by weight of ethyl alcohol was continuously mixed with 100 parts by weight of the same water absorbing resin as in the first and second examples, using the mixer, 54, of a continuous extruding method shown in FIG. 6, i.e. a high-speed agitation type mixer having the first agitating blades, 7a, of a paddle-like shape provided around the rotational shaft 6 in a portion from the edge of the material supply port 3 up to about 25%, and also in a portion from the edge on the side where the ejection port 5 was disposed up to about 25%, with the total length of the rotational shaft 6 designated as 100%, and has the second agitating blades, 7b, of a column-like shape with hemispherical top edges provided around the rotational shaft 6 in the central portion sandwiched between those two portions.

The resultant mixture was colored uniformly. When the mixture was passed through a metal net of 20 mesh, the masses which could not be passed were 0.5%.

Thereafter, the mixture was treated with heat at a temperature of 195° C. for 40 minutes to obtain a water absorbing agent No. 3. The absorbency of the water absorbing agent No. 3 was measured without pressure and under high pressure. The results of the measurement are shown in Table 1.

EXAMPLE 4

A colored surface crosslinking agent composed of 0.1 part by weight of ethylene glycol diglycidylether, 4 parts by weight of water, and 1 part by weight of isopropyl alcohol was continuously mixed with 100 parts by weight of the same water absorbing resin as in the first to third examples at high speed, using the mixer, 55, of a continuous extruding method shown in FIG. 7.

The resultant mixture was colored non-uniformly, and densely colored concretion was visually observed. When the mixture was passed through a metal net of 20 mesh, the masses which could not be passed were 7.3%.

Thereafter, the mixture was treated with heat at a temperature of 195° C. for 40 minutes in the same manner as in the first to third examples to obtain a water absorbing agent No. 4. The absorbency of the water absorbing agent No. 4 was measured without pressure and under high pressure. The results of the measurement are shown in Table 1.

EXAMPLE 5

A colored surface crosslinking agent composed of 0.5 part by weight of glycerol as a first surface crosslinking agent, 0.1 part by weight of ethylene glycol diglycidylether as a second surface crosslinking agent, 3 parts by weight of water, and 1 part by weight of ethyl alcohol was continuously mixed with 100 parts by weight of the same water absorbing resin as in the first to third examples, using the mixer, 55, of a continuous extruding method shown in FIG. 7.

The resultant mixture was colored non-uniformly, and densely colored concretion was visually observed. When the mixture was passed through a metal net of 20 mesh, the masses which could not be passed were 5.4%.

Thereafter, the mixture was treated with heat at a temperature of 195° C. for 40 minutes to obtain a water absorbing agent No. 5. The absorbency of the water absorbing agent No. 5 was measured without pressure and under high pressure. The results of the measurement are shown in Table 1.

TABLE 1

| Example | Absorbency Without Pressure (g/g) | Absorbency Under High Pressure (g/g) |
|---|---|---|
| 1 | 38 | 27 |
| 2 | 40 | 26 |
| 3 | 39 | 24 |
| 4 | 40 | 19 |
| 5 | 39 | 22 |

From the results shown in Table 1, it is understood taht it was possible to obtain a water absorbing agent taht further excelled in the absorbency under high pressure when the water absorbing resin was mixed and reacted with the crosslinking agent, using the mixer, 1 or 54 of a continuous extruding method that has the agitating blades 7 of a plurality of kinds of shapes as described in the first to third examples, compared to when the water absorbing resin was mixed and reacted with the crosslinking agent, using the mixer, 55, of a continuous extruding method that has a single kind (the same shape) of agitating blades 7 and that adjusts the thrusting force by changing the arrangement density of the agitating blades 7 as described in the fourth and fifth examples. Therefore, it has become clear that a water absorbing agent exhibiting even higher absorbency under high pressure can be obtained by mixing and agitating, using the mixer, 1 or 54, of a continuous extruding method.

EXAMPLE 6

The impact force (A) was applied to the water absorbing agent No. 1 obtained in the first example with the aforementioned method to obtain a water absorbing agent No. 6. The absorbency of the water absorbing agent No. 6 was measured under high pressure before and after the application of the impact force (A) with the aforementioned method. The results of the measurement are shown in Table 2.

EXAMPLE 7

The impact force (A) was applied to the water absorbing agent No. 2 obtained in the second example with the aforementioned method to obtain a water absorbing agent No. 7. The absorbency of the water absorbing agent No. 7 was measured under high pressure before and after the application of the impact force (A) with the aforementioned method. The results of the measurement are shown in Table 2.

EXAMPLE 8

The impact force (A) was applied to the water absorbing agent No. 3 obtained in the third example with the aforementioned method to obtain a water absorbing agent No. 8. The absorbency of the water absorbing agent No. 8 was measured under high pressure before and after the aplication of the impact force (A) with the aforementioned method. The results of the measurement are shown in Table 2.

TABLE 2

| Example | Absorbency Under High Pressure Before Application of Impact Force P (g/g) | Absorbency Under High Pressure After Application of Impact Force Q (g/g) | Q/P |
|---|---|---|---|
| 6 | 27 | 25 | 0.93 |
| 7 | 26 | 25 | 0.96 |
| 8 | 24 | 24 | 1.00 |

From the results shown in Table 2, it has become clear that when the impact force (A) was applied to the water absorbing agents of the first to third examples, the property values Q/P were in a range of 0.93 to 1.00 as shown in the sixth to eighth examples, with the impact force little changing the absorbency under high pressure, i.e., with the absorbency under high pressure able to be retained.

EXAMPLE 9

The impact force (B) was applied to the water absorbing agent No. 1 obtained in the first example with the aforementioned method to obtain a water absorbing agent No. 9. The absorbency of the water absorbing agent No. 9 was measured under high pressure before and after the application of the impact force (B) with the aforementioned method. The results of the measurement are shown in Table 3.

EXAMPLE 10

The impact force (B) was applied to the water absorbing agent No. 2 obtained in the second example with the aforementioned method to obtain a water absorbing agent No. 10. The absorbency of the water absorbing agent No. 10 was measured under high pressure before and after the application of the impact force (B) with the aforementioned method. The results of the measurement are shown in Table 3.

EXAMPLE 11

The impact force (B) was applied to the water absorbing agent No. 3 obtained in the third example with the aforementioned method to obtain a water absorbing agent No. 11. The absorbency of the water absorbing agent No. 11 was measured under high pressure before and after the application of the impact force (B) with the aforementioned method. The results of the measurement are shown in Table 3.

EXAMPLE 12

The impact force (B) was applied to the water absorbing agent No. 5 obtained in the fifth example with the aforementioned method to obtain a water absorbing agent No. 12. The absorbency of the water absorbing agent No. 12 was measured under high pressure before and after the application of the impact force (B) with the aforementioned method. The results of the measurement are shown in Table 3.

TABLE 3

| Example | Absorbency Under High Pressure Before Application of Impact Force X (g/g) | Absorbency Under High Pressure After Application of Impact Force Y (g/g) | Y/X |
|---|---|---|---|
| 9 | 27 | 26 | 0.96 |
| 10 | 26 | 26 | 1.00 |
| 11 | 24 | 23 | 0.96 |
| 12 | 22 | 19 | 0.86 |

From the results shown in Table 3, it has become clear that when the impact force (B) was applied to the water absorbing agents of the first to third and fifth examoles, the property values Y/X were in a range of 0.86 to 1.00 as shown in the ninth to twelfth examples, with the impact force little changing the absorbency under high pressure, i.e., with the absorbency under high presurable to be retained.

EXAMPLE 13

For manufacture of a water absorbing resin containing a carboxyl group, a reactive liquid was prepared by solving 2.7 parts of trimethylol propane triacrylate as an internal crosslinking agent in 5500 parts of a 38 weight percent water solution of sodium acrylate (neutralizing ratio of 75%) as a monomer component. Trimethylol propane triacrylate was used in a ratio of 0.04 mol percent to the monomer component. Then, the reactive liquid was subjected to degassing for 30 minutes in an atmosphere of nitrogen gas.

Next, the reactive liquid was supplied to a reactor, that is a double-armed kneader of stainless steel with two sigma type vanes and a jacket, complete with a lid, and the air inside the reactor was replaced by nitrogen gas while keeping the reactive liquid at a temperature of 30° C. Subsequently, while stirring the reactive liquid, 2.8 parts of sodium persulfate as a polymerization initiator and 0.02 part of L-ascorbic acid as a reducer were added, and the same polymerization operations as in the first example was carried out. As a result, a water-containing gel-like polymer which had disintegrated to about 0.1 mm to 3 mm was obtained.

The resultant water-containing gel-like polymer was dried in the same manner as in the first example, then grounded with a roll granulator type grinding device having three stages so that the rolls used for grinding have predetermined gaps (roll gap of about 1.63 mm, about 0.43 mm and about 0.15 mm), and then classified with a JIS standard sieve having a sieve opening of 850 µm. Consequently, a water absorbing resin (A) of a ground irregular pulverized shape, having an average particle diameter of 300 µm was obtained. The water absorbing resin (A) was further classified with a JIS standard sieve having a sieve opening of 150 µm to obtain 86.3 weight percent of a water absorbing resin ($A_1$) having particle diameters of 850 µm to 150 µm and 13.7 weight percent of water absorbing resin fine particles ($A_2$) having particle diameters of less than 150 µm.

Next, the water absorbing resin fine particles ($A_2$) were continuously mixed with deionized water by introducing the water absorbing resin fine particles ($A_2$) into the mixer, 1, of a continuous extruding method shown in FIG. 1 at a rate of 2 kg/minute, and introducing the ion exchange water through the liquid supply port 4, of a bore diameter of 5 mm, provided to the mixer, 1, of a continuous extruding method at a rate of 130 parts by weight of the ion exchange water per 100 parts by weight of the water absorbing resin fine particles ($A_2$). As a result, a particle-like uniform water-containing gel-like granulation product was continuously ejected out of the ejection port 5. The obtained particle-like water-containing gel-like granulation product was an aggregation product of particles, and was mostly composed of a uniform water-containing gel-like granulation product having particle diameters of 1 mm to 5 mm. The water-containing gel-like granulation product had a solid component of 43.6 weight percent. The solid component of the water-containing gel-like granulation product refers to the amount (content) of the water absorbing resin in the water-containing gel-like granulation product.

The resultant water-containing gel-like granulation product was spread with a thickness of 5 cm on a JIS standard metal net having a sieve opening of 300 µm and then dried with a hot air circulation type drying device of 160° C. As a result, The water-containing gel-like granulation product was so uniformly and enough dried as to contain more than 90 weight percent solid component, and a powder-like dried granulation product which could be easily disintegrated into individual particles even by hand was obtained. The dried granulation product contained as little as 5% masses larger than 10 mm.

Next, the dried granulation product was ground, using the roll granulator type grinding device with wider roll gaps (last roll gap of about 0.27 mm) and classified with a JIS standard sieve having a sieve opening of 850 µm to obtain a water absorbing resin granulation product (1).

Figure 18:
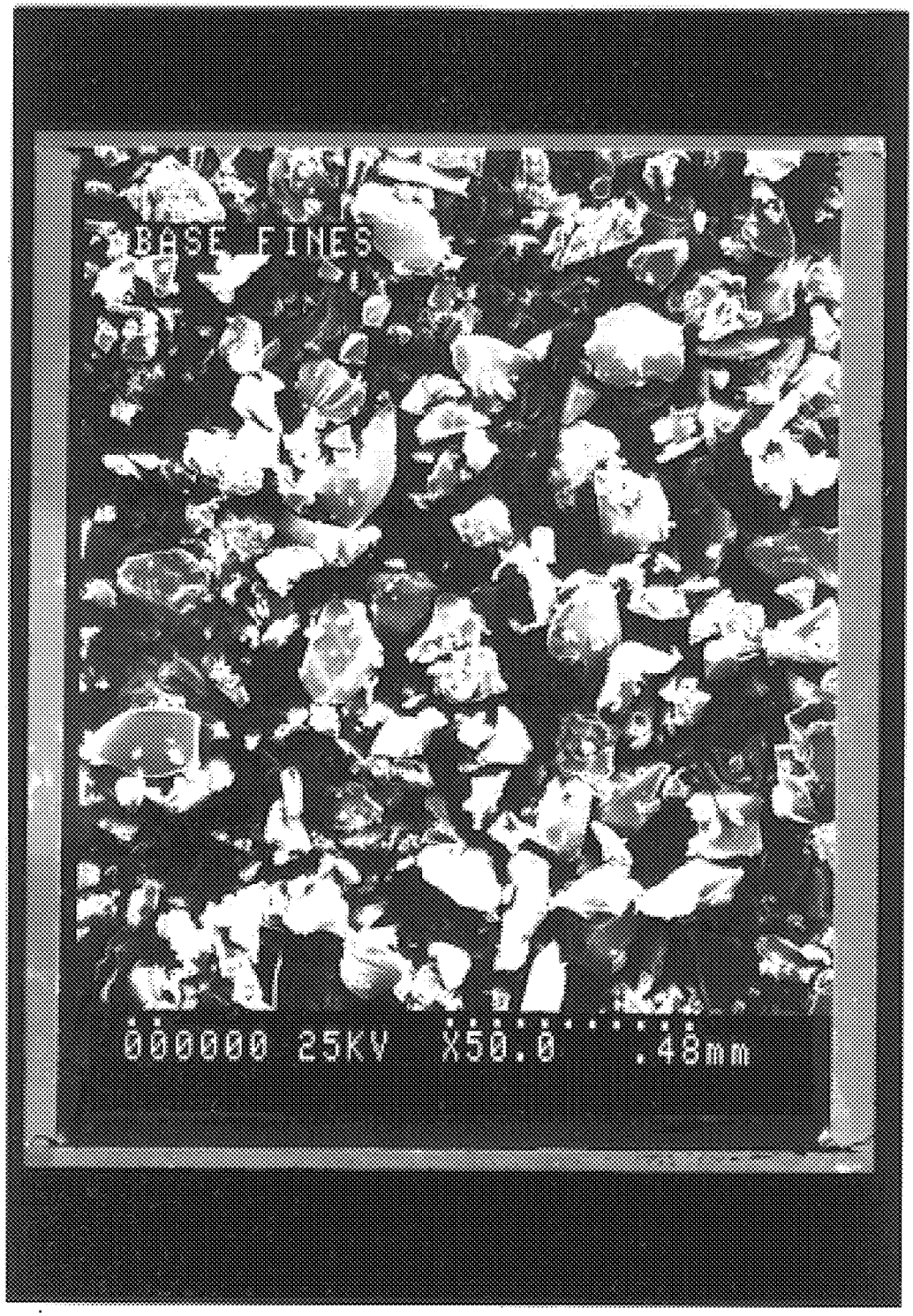
FIG. 18 is an electronic microphotograph (×50), in place of a drawing, showing structure of fine particles ($A_2$) of a water absorbing resin having a particle diameter of not more than 150 μm obtained in the thirteenth embodiment.

The particle size distribution, absorbency without pressure, and granulation destruction ratios of the water absorbing resin granulation product (1), the water absorbing resin (A), the water absorbing resin ($A_1$), and the water absorbing resin fine particles ($A_2$) obtained as above were measured. The particle size distribution is shown in Table 4, and the results of the measurement of the absorbency without pressure and granulation destruction ratios are shown in Table 5. An electronic microphotograph (×50) of the water absorbing resin fine particles ($A_2$) is shown in FIG. 18.

Next, a surface crosslinking agent composed of 0.05 part by weight of ethylene glycol diglycidylether, 0.75 part by weight of glycerol, 3 parts by weight of water, 0.75 part by weight of isopropyl alcohol, and 0.5 part by weight of lactic acid was mixed with 100 parts by weight of the water absorbing resin, and treated with heat at a temperature of 200° C. for 40 minutes to obtain a water absorbing agent No. 13. The absorbency under high pressure and the absorbency without pressure, absorbing rate, and granulation destruction ratio of the water absorbing agent No. 13 were measured. The results of the measurement are shown in Table 6.

Figure 19:
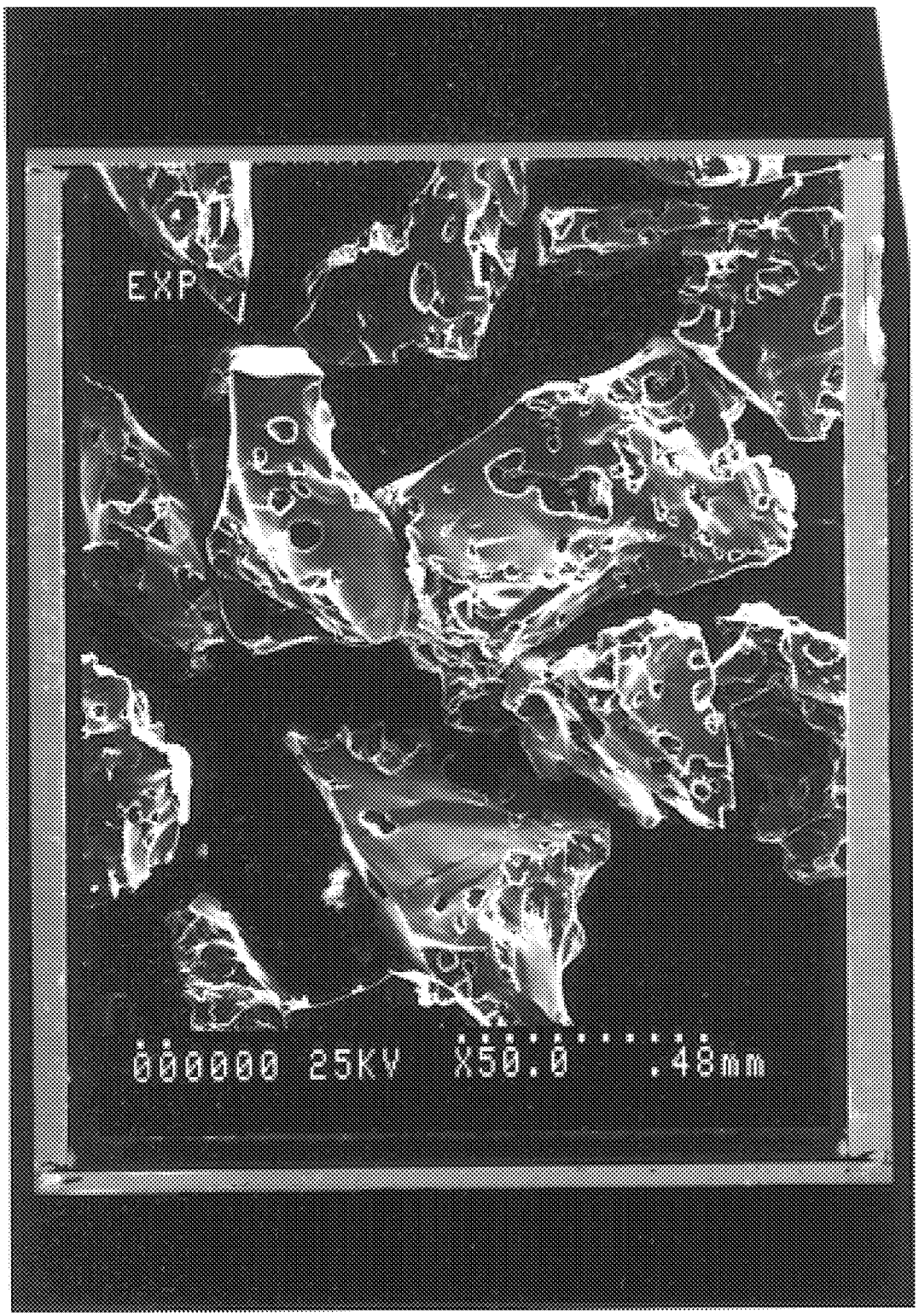
FIG. 19 is an electronic microphotograph (×50), in place of a drawing, showing a structure of a water absorbing resin granulation product (1) obtained in the thirteenth embodiment.

FIG. 19 is an electronic microphotograph (×50) showing the water absorbing resin granulation product (1). The water absorbing resin granulation product (1), although being obtained from the water absorbing resin fine particles ($A_2$) having particle diameters of less than 150 μm shown in FIG. 18 as the raw material, became a granulation product (aggregation product) of simulant primary particles containing about 80 percent of particles having particle diameters of 300 μm to 850 μm, and consequently became a granulation product (aggregation product) having a high granulation strength with a granulation destruction ratio specified by the impact force (B) of 2.4 weight percent.

Although not shown here, it has been confirmed, with an optical microphotograph of the water-containing gel-like granulation product before drying obtained in the present embodiment, that the water-containing gel-like granulation product is an aggregation product of water-containing gel of each particle, and that if water containing no crosslinking agent is used for granulation, the water-containing gel-like granulation product, after absorbing water and having swollen, swell while splitting into a plurality of particles as those before the granulation.

EXAMPLE 14

A water-containing gel-like granulation product containing 38.0 weight percent solid component was obtained using the mixer, 1, of a continuous extruding method with the same reaction and operations as in the thirteenth example, except that the ion exchange water was added in an amount of 163 parts by weight, instead of 130 parts by weight, to 100 parts by weight of the water absorbing resin fine particles ($A_2$)

Thereafter, the water-containing gel-like granulation product was dried in the same manner as in the thirteenth embodiment. As a result, the water-containing gel-like granulation product was uniformly and enough dried, and a powder-like dried granulation product which could be easily disintegrated into individual particles even by hand was obtained. The dried granulation product contained as little as 5% masses larger than 10 mm.

Next, the dried granulation product was ground and classified in the same manner as in the thirteenth embodiment to obtain a water absorbing resin granulation product (2). The particle size distribution, absorbency without pressure, and granulation destruction ratio of the water absorbing resin granulation product (2) were measured. The particle size distribution is shown in Table 4, and the results of the measurement of the absorbency and granulation destruction ratio are shown together in Table 5.

The same mixing and heat treatments as in the thirteenth embodiment were carried out, using the water absorbing resin granulation product (2) to obtain a water absorbing agent No. 14. The absorbency under high pressure and the absorbency without pressure, absorbing rate, and granulation destruction ratio of the water absorbing agent No. 14 were measured. The results of the measurement are shown in Table 6.

EXAMPLE 15

A water-containing gel-like granulation product containing 57.6 weight percent solid component was obtained using the mixer, 1, of a continuous extruding method with the same reaction and operations as in the thirteenth example, except that the ion exchange water was added in an amount of 74 parts by weight, instead of 230 parts by weight, to 100 parts by weight of the water absorbing resin fine particles ($A_2$). The mixing, although performed uniformly, was a little less uniform, than the thirteenth and fourteenth embodiments.

Thereafter, the water-containing gel-like granulation product was dried in the same manner as in the thirteenth embodiment. As a result, the water-containing gel-like granulation product was uniformly and enough dried, and a powder-like dried granulation product which could be easily disintegrated into individual particles even by hand was obtained. The dried granulation product contained as little as 5% masses larger than 10 mm.

Next, the dried granulation product was ground and classified in the same manner as in the thirteenth embodiment to obtain a water absorbing resin granulation product (3). The particle size distribution, absorbency without pressure, and granulation destruction ratio of the water absorbing resin granulation product (3) were measured. The particle size distribution is shown in Table 4, and the results of the measurement of the absorbency and granulation destruction ratio are shown together in Table 5.

The same mixing and heat treatments as in the thirteenth embodiment were carried out, using the water absorbing resin granulation product (3) to obtain a water absorbing agent No. 15. The absorbency under high pressure and the absorbency without pressure, absorbing rate, and granulation destruction ratio of the water absorbing agent No. 15 were measured. The results of the measurement are shown in Table 6.

EXAMPLE 16

A water-containing gel-like granulation product containing 70.9 weight percent solid component was obtained using the mixer, 1, of a continuous extruding method with the same reaction and operations as in the thirteenth example, except that the ion exchange water was added in an amount of 41 parts by weight, instead of 130 parts by weight, to 100 parts by weight of the water absorbing resin fine particles ($A_2$). The mixing, although performed uniformly, was a little less uniform, than the fifteenth embodiment. The resultant water-containing gel-like granulation product easily adhered to the inner surface of the casing 2 of the mixer, 1, of a continuous extruding method and aggregated.

Thereafter, the water-containing gel-like granulation product was dried in the same manner as in the thirteenth embodiment. As a result, the water-containing gel-like granulation product was uniformly and enough dried, and a powder-like dried granulation product which could be easily disintegrated into individual particles even by hand was obtained. The dried granulation product contained as little as 5% masses larger than 10 mm.

Next, the dried granulation product was ground and classified in the same manner as in the thirteenth embodiment to obtain a water absorbing resin granulation product (4). The particle size distribution, absorbency without pressure, and granulation destruction ratio of the water absorbing resin granulation product (4) were measured. The particle size distribution is shown in Table 4, and the results of the measurement of the absorbency and granulation destruction ratio are shown together in Table 5.

The same mixing and heat treatments as in the thirteenth embodiment were carried out, using the water absorbing resin granulation product (4) to obtain a water absorbing agent No. 16. The absorbency under high pressure and the absorbency without pressure, absorbing rate, and granulation destruction ratio of the water absorbing agent No. 16 were measured. The results of the measurement are shown in Table 6.

COMPARATIVE EXAMPLE 1

Figure 21:
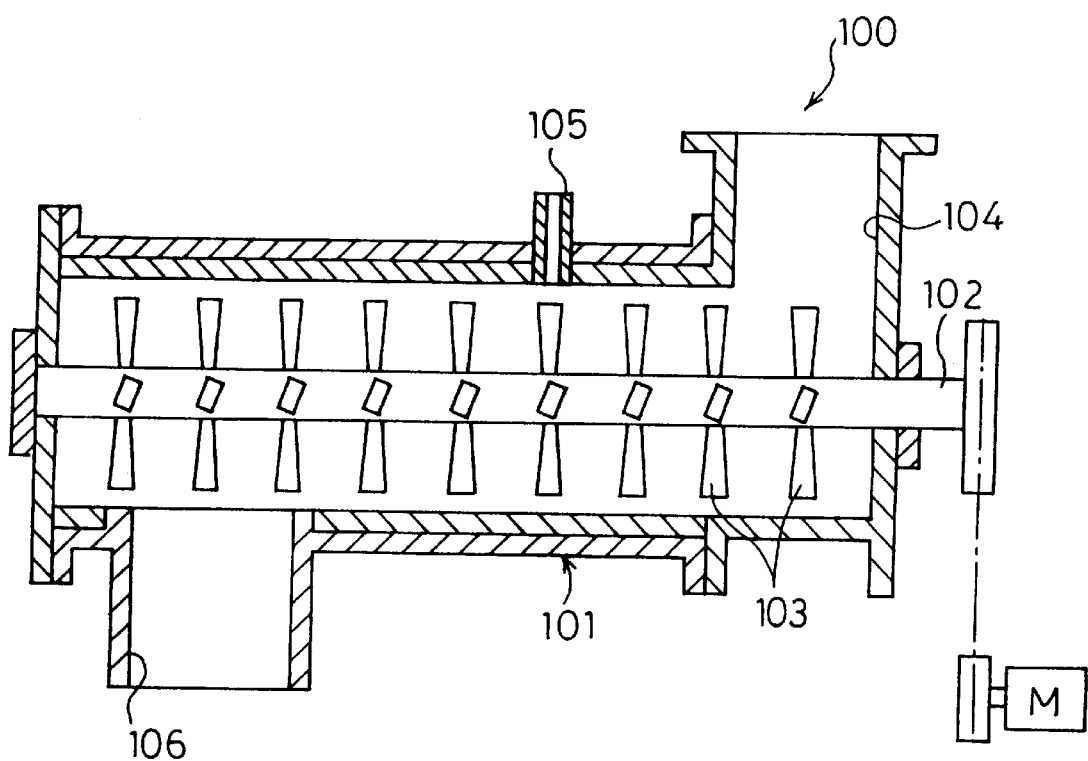
FIG. 21 is a cross-sectional view showing a mixer of a continuous extruding method incorporated in a conventional machine for manufacturing a water absorbing agent.

The same reaction and operations as in the thirteenth example were performed to mix the water absorbing resin fine particles ($A_2$) with ion exchange water, except that the conventional mixer, 100, of a continuous extruding method shown in FIG. 21 was used instead of the mixer, 1, of a continuous extruding method. However, the mixture obtained with the conventional mixer, 100, of a continuous extruding method was not a granulation product, but gel-like masses having sizes of 1 cm to 5 cm, which as a result could not continuously ejected out of the ejection port 106 of the mixer, 100, of a continuous extruding method. Next, the same manner as in the first example was used to dry the gel-like masses, but the gel-like masses were not dried. Besides, a decline in properties was observed, such as an increase in the water soluble component.

COMPARATIVE EXAMPLE 2

The same reaction and operations as in the first comparative example were performed to mix the water absorbing resin fine particles ($A_2$) with ion exchange water, using the conventional mixer, 100, of a continuous extruding method shown in FIG. 21, except that the ion exchange water was added in an amount of 10 parts by weight, instead of 130 parts by weight, to 100 parts by weight of the water absorbing resin fine particles ($A_2$). However, the water absorbing resin fine particles ($A_2$) had a high absorbing rate. The mixture obtained with the conventional mixer, 100, of a continuous extruding method was not a water-containing gel-like granulation product, included a large amount of concretion-like particle-like granulation product, and included more than 50% ungranulated water absorbing resin fine particles ($A_2$) because of being unable to be mixed with the aqueous liquid at all.

Next, the concretion-like particle-like granulation product was dried, ground and classified in the same manner as in the thirteenth embodiment to obtain a comparative water absorbing resin granulation product (1). The particle size distribution, absorbency without pressure, and granulation destruction ratio of the comparative water absorbing resin granulation product (1) were measured. The particle size distribution is shown in Table 4, and the results of the measurement of the absorbency and granulation destruction ratio are shown together in Table 5.

Figure 20:
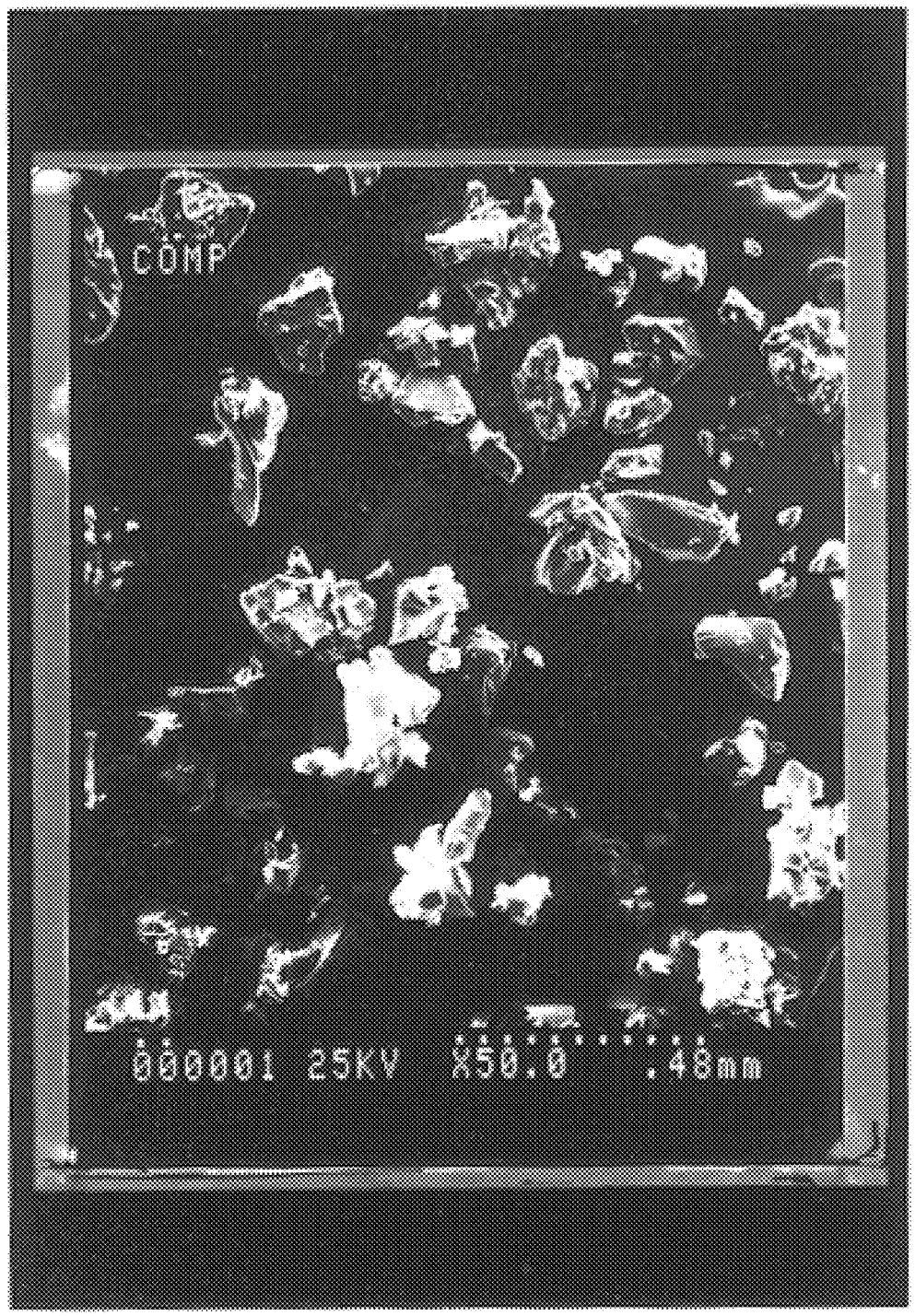
FIG. 20 is an electronic microphotograph (×50), in place of a drawing, showing a structure of a comparative water absorbing resin granulation product (1) obtained in the second comparative example.

FIG. 20 is an electronic microphotograph (×50) showing the comparative water absorbing resin granulation product (1). The comparative water absorbing resin granulation product (1), although being obtained from the water absorbing resin fine particles ($A_2$) having particle diameters of less than 150 μm shown in FIG. 18 as the raw material, includes only about 24 weight percent of a granulation product having particle diameters of more than 150 μm. In addition, the particles are granulated at points to other particles. As a consequence, the comparative water absorbing resin granulation product (1) is a weak granulation product (aggregation product) having a granulation destruction ratio specified by the impact force (B) of 100 weight percent.

COMPARATIVE EXAMPLE 3

A comparative water absorbing agent No. 2 was obtained with the same reaction and operations as in the thirteenth example, except that the water absorbing resin (A) composed of the water absorbing resin ($A_1$) (86.3 weight percent) and the water absorbing resin fine particles ($A_2$) (13.7 weight percent) used instead of the water absorbing resin granulation product (1). The absorbency under high pressure and the absorbency without pressure, absorbing rate, and granulation destruction ratio of the comparative water absorbing agent No. 2 were measured. The results of the measurement are shown in Table 6.

EXAMPLE 17

A water-containing gel-like polymer was obtained with the same reaction and operations as in the first example, except that the polyethylene glycol diacrylate (n=8) was used in an amount of 3.9 parts instead of 2.9 parts.

Next, the water-containing gel-like polymer was dried in the same manner as in the first example, then ground with the roll granulator type grinding device specified to have narrower roll gaps (last roll gap of about 0.15 mm) than in the thirteenth embodiment, and classified with a JIS standard sieve having a sieve opening of 850 μm to obtain a water absorbing resin (B) of an irregular pulverized shape, having an average particle diameter of 260 μm. The water absorbing resin (B) was further classified with a JIS standard sieve having a sieve opening of 150 μm to obtain 82.0 weight percent of a water absorbing resin ($B_1$) having particle diameters of 850 μm to 150 μm, and 18.0 weight percent of water absorbing resin fine particles ($B_2$) having particle diameters of less than 150 μm.

Next, the water absorbing resin fine particles ($B_2$) were continuously mixed with ion exchange water containing glycerol by introducing the water absorbing resin fine particles ($B_2$) into the mixer, 1, of a continuous extruding method shown in FIG. 1 at a rate of 2 kg/minute, and introducing the ion exchange water in which 0.1 part by weight glycerol is dissolved through the liquid supply port 4, of a bore diameter of 5 mm, provided to the mixer, 1, of a continuous extruding method in an amount 163 parts by weight of the ion exchange water per 100 parts by weight of the water absorbing resin fine particles ($B_2$). As a result, a particle-like uniform water-containing gel-like granulation product was continuously ejected out of the ejection port 5. The obtained particle-like water-containing gel-like granulation product was an aggregation product of particles, and was mostly composed of a uniform water-containing gel-like granulation product having particle diameters of 1 mm to 5 mm. The water-containing gel-like granulation product included 38.0 weight percent solid component.

The resultant water-containing gel-like granulation product was spread with a thickness of 5 cm on a JIS standard metal net having a sieve opening of 300 μm and dried with a hot air circulation type drying device of 160° C. As a result, The water-containing gel-like granulation product was uniformly and enough dried, and a powder-like dried granulation product which could be easily disintegrated into individual particles even by hand was obtained. The dried granulation product contained as little as 5% masses larger than 10 mm.

Next, the dried granulation product was ground, using the roll granulator type grinding device specified to have the same roll gaps (last roll gap of about 0.27 mm) as when the dried granulation product was ground in the thirteenth example and classified with a JIS standard sieve having a sieve opening of 850 μm to obtain a water absorbing resin granulation product (5).

The particle size distribution, absorbency without pressure, and granulation destruction ratios of the water absorbing resin granulation product (5), the water absorbing resin (B), the water absorbing resin ($B_1$), and the water absorbing resin fine particles ($B_2$) obtained as above were measured. The particle size distribution is shown in Table 4, and the results of the measurement of the absorbency without pressure and granulation destruction ratios are shown in Table 5.

The same mixing and heat treatments as in the thirteenth embodiment were carried out, using the water absorbing resin granulation product (5) to obtain a water absorbing agent No. 17. The absorbency under high pressure and the absorbency without pressure, absorbing rate, and granulation destruction ratio of the water absorbing agent No. 17 were measured. The results of the measurement are shown in Table 6.

TABLE 4

Distribution of Particle Size (weight percent)

| | Particle Size ($\mu$m) | | | | |
|---|---|---|---|---|---|
| | 500 to less than 850 | 300 to less than 500 | 150 to less than 300 | 75 to less than 150 | less than 75 |
| Water Absorbing Resin (A) | 7.0 | 42.3 | 37.0 | 9.8 | 3.9 |
| Water Absorbing Resin ($A_1$) | 8.1 | 49.1 | 42.9 | 0 | 0 |
| Water Absorbing Resin Fine Particles ($A_2$) | 0 | 0 | 0 | 71.5 | 28.5 |
| Water Absorbing Resin Granulation Product (1) | 19.7 | 58.0 | 15.6 | 5.2 | 2.4 |
| Water Absorbing Resin Granulation Product (2) | 18.0 | 57.8 | 16.8 | 5.3 | 2.2 |
| Water Absorbing Resin Granulation Product (3) | 16.6 | 55.9 | 17.7 | 6.6 | 3.2 |
| Water Absorbing Resin Granulation Product (4) | 14.6 | 50.4 | 19.1 | 10.0 | 5.9 |
| Comparative Water Absorbing Resin Granulation Product (5) | 6.3 | 12.3 | 4.9 | 60.3 | 16.2 |
| Water Absorbing Resin (B) | 4.9 | 35.8 | 41.3 | 12.5 | 5.5 |
| Water Absorbing Resin ($B_1$) | 6.0 | 43.7 | 50.4 | 0 | 0 |
| Water Absorbing Resin Fine Particles ($B_2$) | 0 | 0 | 0 | 69.4 | 30.6 |
| Water Absorbing Resin Granulation Product (5) | 14.1 | 55.8 | 20.3 | 7.3 | 2.5 |

TABLE 5

| | Absorbency (g/g) | Granulation Destruction Ratio (Weight Percent) |
|---|---|---|
| Water Absorbing Resin (A) | 33 | Not exceeding 0.1 (Ungranulated) |
| Water Absorbing Resin ($A_1$) | 33 | Not exceeding 0.1 (Ungranulated) |
| Water Absorbing Resin Fine Particles ($A_2$) | 33 | Not exceeding 0.1 (Ungranulated) |
| Water Absorbing Resin Granulation Product (1) | 33 | 2.4 |
| Water Absorbing Resin Granulation Product (2) | 33 | 2.5 |
| Water Absorbing Resin Granulation Product (3) | 32 | 2.9 |
| Water Absorbing Resin Granulation Product (4) | 32 | 4.5 |
| Comparative Water Absorbing Resin Granulation Product (5) | 32 | 100 |
| Water Absorbing Resin (B) | 42 | Not exceeding 0.1 (Ungranulated) |
| Water Absorbing Resin ($B_1$) | 42 | Not exceeding 0.1 (Ungranulated) |
| Water Absorbing Resin Fine Particles ($B_2$) | 42 | Not exceeding 0.1 (Ungranulated) |
| Water Absorbing Resin Granulation Product (5) | 42 | 2.5 |

TABLE 6

| | | Absorbency | | | |
|---|---|---|---|---|---|
| Example | Comparative Example | Without Pressure (g/g) | Under High Pressure (g/g) | Absorbing Rate (g/g/sec) | Granulation Destruction Ratio (Weight Percent) |
| 13 | | 28 | 23 | 25 | 0.9 |
| 14 | | 28 | 23 | 25 | 1.1 |
| 15 | | 28 | 23 | 24 | 1.2 |
| 16 | | 28 | 22.5 | 20 | 1.9 |
| | 2 | 29 | 14 | Not less than 60 | 74.0 |
| | 3 | 28 | 22 | 51 | Ungranulated |
| 17 | | 31 | 27 | 25 | 0.7 |

From the results of the thirteenth to seventeenth examples and first to third comparative examples, it is understood that water absorbing resin granulation products exhibiting an excellent granulation strength were obtained by using a mixer, 1, of a continuous extruding method in accordance with the present invention, that had a plurality of kinds of agitating blades 7 and thereby had areas of different thrusting forces. It is also understood that by using the water absorbing resin granulation products exhibiting an excellent granulation strength as a raw material for water absorbing agents, water absorbing agents that were resistant to mechanical stress and quick in absorbing water could be obtained. It is also understood that on the other hand, when the conventional mixer, 100, of a continuous extruding method of a constant thrusting force was used, if too much water was added to water absorbing resin fine particles, the water absorbing resin fine particles were not granulated: if, by contrast, too little water was added, it was not possible to obtain water absorbing resin fine particles exhibiting an excellent granulation strength.

EXAMPLE 18

A water absorbing resin was mixed with a crosslinking agent under different mixing conditions from the fifth embodiment, by varying the angles formed by the water-absorbing-resin-extruding faces $7a_1$ of the agitating blades 7 (first agitating blades 7a) provided to the mixer, 55, of a continuous extruding method shown in FIG. 7 and the plane perpendicular to the rotational shaft 6 (hereinafter, will be simply referred to as the angles of the water-absorbing-resin-extruding faces) in the fifth embodiment according to the area in which the agitating blades 7 are provided with the total length of the rotational shift designated as 100%. The ratios of concretion in the obtained mixtures were measured.

Next, water absorbing agents were obtained by passing the mixtures through a metal net of 20 mesh and then treating with heat at a temperature of 195° C. for 40 minutes. The absorbency without pressure and the absorbency under high pressure of the water absorbing agents were measured. The results of the measurement are shown in FIG. 7 together with the conditions of mixing with the mixer, 55, of a continuous extruding method.

aqueous liquid containing, for example, a surface crosslinking agent, by varying the angles of the water-absorbing-resin-extruding faces of the agitating blades 7 (directions of the blade faces of the agitating blades 7) and thereby providing on the ejections side an area in which the thrusting force is smaller.

POSSIBLE INDUSTRIAL APPLICATIONS

Water absorbing agents in accordance with the present invention show excellent absorbing performance and are resistant to mechanical stress. It is therefore possible to offer water absorbing agents that little deteriorate in terms of water absorbing characteristics and that maintain their excellent absorbing performance with end products, even if having received mechanical stress during, for example, transport in a manufacturing plant and processing into end products by a user. For these reasons, the water absorbing agents in accordance with the present invention can be

TABLE 7

| | | Angle of Water-Absorbing-Resin-Extruding Faces | | | | | |
|---|---|---|---|---|---|---|---|
| Area in which Agitation Blades are Provided | Portion From Material Supply Port To 25% | Portion From 25% To 50% | Portion From 50% to 75% | Portion From 75% To Ejection Port | Absorbency Without Pressure (g/g) | Absorbency under High Pressure (g/g) | Concretion (%) |
| ① | Forward 45° | Forward 45° | Forward 45° | Reverse 45° | 39 | 22 | 5.4 |
| ② | Forward 45° | Horizontal | Horizontal | Reverse 45° | 39 | 22 | 2.0 |
| ③ | Forward 45° | Horizontal | Reverse 45° | Reverse 45° | 40 | 23 | 0.9 |
| ④ | Forward 45° | Reverse 45° | Reverse 45° | Reverse 45° | 40 | 23 | 0.4 |

Figure 17:
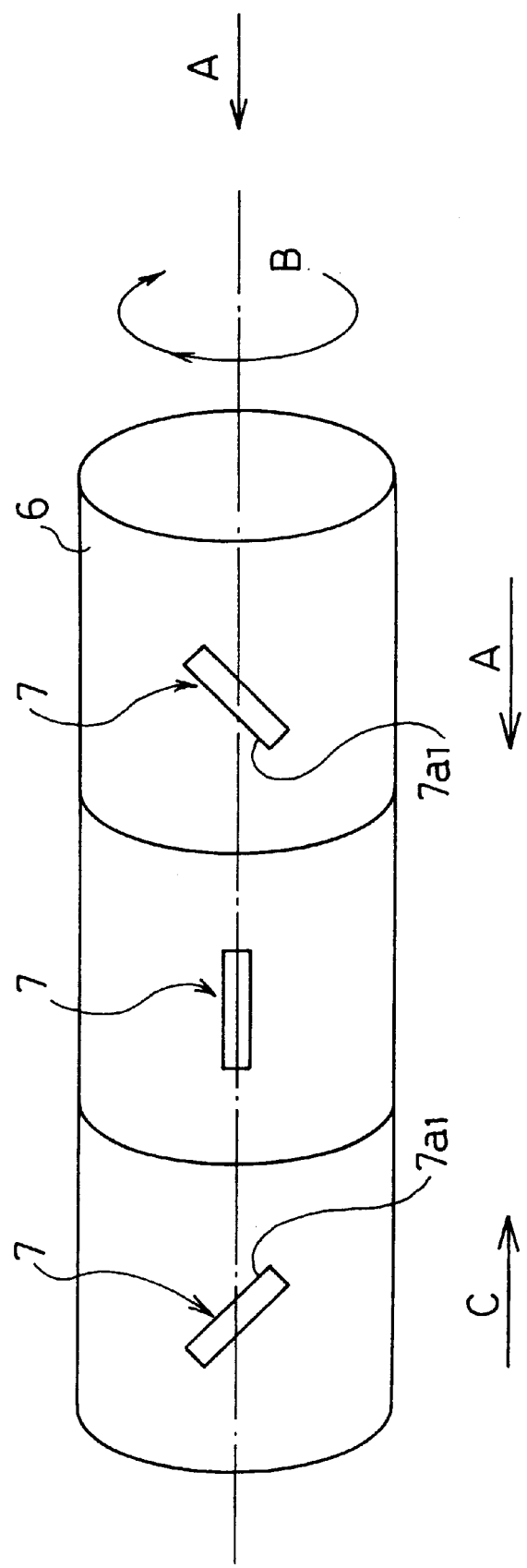
FIG. 17 is an explanatory view showing the relation between the angle of a water-absorbing-resin-extruding face of an agitating member of the mixer of a continuous extruding method and a direction in which a thrusting force is generated.

In Table 7, "Forward" and "Reverse" indicate the directions of the thrusting force with respect to the direction of thrusting the water absorbing resin. For example, as shown in FIG. 17, when the rotational shaft 6 rotates in the direction indicated by the arrow B with respect to the direction indicated by the arrow A that is the water-absorbing-resin-ejecting direction (i.e. the moving direction of the water absorbing resin passing through the mixer, 55, of a continuous extruding method from the material supply port 3 to the ejection port 5), if a thrusting force is generated in the same direction as the direction A that is the moving direction of the water absorbing resin, "Forward" is written in Table 7: if a thrusting force is generated in the direction C that is the opposite direction to the direction A, "Reverse" is written in Table 7.

Therefore, "Forward 45°" indicates that the angles formed by the water-absorbing-resin-extruding faces $7a_1$ of the agitating blades 7 and the plane perpendicular to the rotational shaft 6 equal 45', and that a thrusting force is generated in the moving direction of the water absorbing resin. "Reverse 45°" indicates that the angles formed by the water-absorbing-resin-extruding faces $7a_1$ of the agitating blades 7 and the plane perpendicular to the rotational shaft 6 equal 45°, and that a thrusting force is generated in the opposite direction to the moving direction of the water absorbing resin.

The angles of the water-absorbing-resin-extruding faces described as "Horizontal" indicate that the blade faces of the agitating blades 7 are parallel to the shaft direction of the rotational shaft 6. If the angles of the water-absorbing-resin-extruding faces are set to horizontal, the agitating blades 7 do not newly generate a thrusting force.

From the results shown in Table 7, it is understood that a water absorbing resin could more uniformly mixed with an suitably used for sanitary goods such as, paper diapers (disposable diapers), sanitary napkins, and so-called incontinence pads.

What is claimed is:

1. A water absorbing agent obtained by mixing and reacting a water absorbing resin containing a carboxyl group with a crosslinking agent that reacts with said carboxyl group, being characterized in that $P \geqq 20$ (g/g), and $Q/P \geqq 0.85$ where P and Q respectively represent absorbency of said water absorbing agent under pressure of 50 g/cm² before and after applying an impact force (A) to said water absorbing agent by putting a predetermined load on said water absorbing agent.

2. A water absorbing agent obtained by mixing and reacting a water absorbing resin containing a carboxyl group with a crosslinking agent that reacts with said carboxyl group, being characterized in that $X \geqq 20$ (g/g), and $Y/X \geqq 0.90$ where X and Y respectively represent absorbency of said water absorbing agent under pressure of 50 g/cm² before and after applying an impact force (B) to said water absorbing agent by letting said water absorbing agent collide with said water absorbing agent with a predetermined strength.

3. A method of manufacturing a water absorbing agent, being characterized in that it comprises the sequential steps of:

(1) supplying a water absorbing resin containing a carboxyl group to a first area of an agitation type mixer of a continuous extruding method including at least one kind of agitating member, disposed around a rotational shaft inside a fixed cylinder, for applying a thrusting force to said water absorbing resin;

(2) dispersing said water absorbing resin in said first area;

(3) extruding said water absorbing resin to a second area in which said thrusting force is weaker than in said first area; and (4) mixing said water absorbing resin and an aqueous liquid in said second area.

4. The method of manufacturing a water absorbing agent as defined in claim 3,
being characterized in that
said aqueous liquid is supplied to said second area.

5. The method of manufacturing a water absorbing agent as defined in claim 3,
being characterized in that
said aqueous liquid is supplied to a boundary area between said first and second areas.

6. The method of manufacturing a water absorbing agent as defined in claim 3,
being characterized in that
said aqueous liquid contains a crosslinking agent that can react with said carboxyl group.

7. The method of manufacturing a water absorbing agent as defined in claim 3,
being characterized in that
said water absorbing resin has an average particle diameter of 200 μm to 800 μm.

8. The method of manufacturing a water absorbing agent as defined in claim 3,
being characterized in that
said water absorbing resin has an average particle diameter of 10 μm to 150 μm.

9. The method of manufacturing a water absorbing agent as defined in claim 8,
being characterized in that
said aqueous liquid is mixed with said water absorbing resin in an amount ranging from 70 parts by weight to 400 parts by weight per 100 parts by weight of said water absorbing resin.

10. The method of manufacturing a water absorbing agent as defined in claim 8,
being characterized in that
a water-containing gel-like granulation product obtained, on a condition that said water-containing gel-like granulation product is not ground, by mixing said aqueous liquid with said water absorbing resin is dried at a temperature ranging from 110° C. to 300° C.

11. The method of manufacturing a water absorbing agent as defined in claim 8,
being characterized in that
a water-containing gel-like granulation product obtained by mixing said aqueous liquid with said water absorbing resin has a particle diameter in a range of 0.3 mm to 10 mm.

12. A method of manufacturing a water absorbing agent, comprising the steps of:
obtaining a water-containing gel-like granulation product having an average particle diameter in a range of 0.3 mm to 10 mm by mixing an aqueous liquid of 70 parts by weight to 400 parts by weight with 100 parts by weight of water absorbing resin having an average particle diameter in a range of 10 μm to 150 μm;
drying and shrinking the obtained water-containing gel-like granulation product at a temperature ranging from 110° C. to 300° C. without grinding; and
crosslinking a surface of a water absorbing resin granulation product having an average particle diameter in a range of 200 μm to 800 μm as obtained by drying and shrinking the water-containing gel-like granulation product.

13. The method as set forth in claim 12, further comprising the step of:
grinding the water-containing gel-like granulation product after drying and shrinking so as to adjust the average particle diameter of the water-containing resin granulation product in a range of 200 μm to 800 μm.

14. The method as set forth in claim 12, wherein the aqueous liquid contains 99 percent by weight to 100 percent by weight of water.

15. The method as set forth in claim 12, wherein absorbency under high pressure of a product water absorbing agent is not less than 20 g/g.

16. The method as set forth in claim 12, wherein a granulation destruction ratio of a product water absorbing agent is not more than 10 percent by weight.

17. The method as set forth in claim 12, wherein an absorbing rate of a product water absorbing agent is not longer than 25 seconds.

18. A water absorbing agent obtained by crosslinking a surface of a water absorbing granulation product having an average particle diameter of 200 μm to 800 μm, wherein:
absorbency under high pressure is not less than 20 g/g, an absorbing rate is not longer than 25 seconds, and a granulation destruction ratio is not more than 10 percent by weight.

19. The water absorbing agent set forth in claim 1, wherein P is not less than 25 g/g.

20. The water absorbing agent set forth in claim 1, wherein $Q/P \geq 0.9$.

21. The water absorbing agent set forth in claim 1, wherein $Q/P \geq 0.95$.

22. The water absorbing agent set forth in claim 2, wherein X is not less than 25 g/g.

23. The water absorbing agent set forth in claim 2 wherein $Y/X \geq 0.92$.

24. The water absorbing agent set forth in claim 2, wherein $Y/X \geq 0.95$.

25. The water absorbing agent set forth in claim 1, wherein said cross-linking agent is at least one compound selected from the group consisting of a polyhydric alcohol compound, an epoxy compound, a polyfunctional amine compound, a salt of a polyfunctional amine compound, and an alkylene carbonate compound.

26. The water absorbing agent set forth in claim 2, wherein said cross-linking agent is at least one compound selected from the group consisting of a polyhydric alcohol compound, an epoxy compound, a polyfunctional amine compound, a salt of a polyfunctional amine compound, and an alkylene carbonate compound.

27. The water absorbing agent of claim 1, wherein said water absorbing resin is a hydrogel-forming water absorbing resin obtained by polymerizing and crosslinking a hydrophilic monomer composed mainly of acrylic acid and/or a salt of acrylic acid.

28. The water absorbing agent of claim 27, wherein said hydrophilic monomer consists of 10 to 40 mol percent of acrylic acid and 90 to 60 mol percent of a salt of acrylic acid.

29. The water absorbing agent of claim 27, wherein said hydrophilic monomer further comprises a monomer other than acrylic acid and/or a salt of acrylic acid in a ratio of not more than 30 mol percent to the total amount of acrylic acid and/or a salt of acrylic acid.

30. The water absorbing agent of claim 27, wherein said water absorbing resin is internally crosslinked with an internal crosslinking agent containing a plurality of polymerizable unsaturated groups or a plurality of reactive groups.

31. The water absorbing agent of claim 2, wherein said water absorbing resin is a hydrogel-forming water absorbing resin obtained by polymerizing and crosslinking a hydrophilic monomer composed mainly of acrylic acid and/or a salt of acrylic acid.

32. The water absorbing agent of claim 31, wherein said hydrophilic monomer consists of 10 to 40 mol percent of acrylic acid and 90 to 60 mol percent of a salt of acrylic acid.

33. The water absorbing agent of claim 31, wherein said hydrophilic monomer further comprises a monomer other than acrylic acid and/or a salt of acrylic acid in a ratio of not more than 30 mol percent to the total amount of acrylic acid and/or a salt of acrylic acid.

34. The water absorbing agent of claim 31, wherein said water absorbing resin is internally crosslinked with an internal crosslinking agent containing a plurality of polymerizable unsaturated groups or a plurality of reactive groups.

35. The method of manufacturing a water absorbing agent of claim 3, wherein said water absorbing resin is a hydrogel-forming water absorbing resin obtained by polymerizing and crosslinking a hydrophilic monomer composed mainly of acrylic acid and/or a salt of acrylic acid.

36. The method of manufacturing a water absorbing agent of claim 35, wherein said hydrophilic monomer consists of 10 to 40 mol percent of acrylic acid and 90 to 60 mol percent of a salt of acrylic acid.

37. The method of manufacturing a water absorbing agent of claim 35, wherein said hydrophilic monomer further comprises a monomer other than acrylic acid and/or a salt of acrylic acid in a ratio of not more than 30 mol percent to the total amount of acrylic acid and/or a salt of acrylic acid.

38. The method of manufacturing a water absorbing agent of claim 35, wherein said water absorbing resin is internally crosslinked with an internal crosslinking agent containing a plurality of polymerizable unsaturated groups or a plurality of reactive groups.

39. The method of manufacturing a water absorbing agent of claim 12, wherein said water absorbing resin is a hydrogel-forming water absorbing resin obtained by polymerizing and crosslinking a hydrophilic monomer composed mainly of acrylic acid and/or a salt of acrylic acid.

40. The method of manufacturing a water absorbing agent of claim 39, wherein said hydrophilic monomer consists of 10 to 40 mol percent of acrylic acid and 90 to 60 mol percent of a salt of acrylic acid.

41. The method of manufacturing a water absorbing agent of claim 39, wherein said hydrophilic monomer further comprises a monomer other than acrylic acid and/or a salt of acrylic acid in a ratio of not more than 30 mol percent to the total amount of acrylic acid and/or a salt of acrylic acid.

42. The method of manufacturing a water absorbing agent of claim 39, wherein said water absorbing resin is internally crosslinked with an internal crosslinking agent containing a plurality of polymerizable unsaturated groups or a plurality of reactive groups.

43. The method of manufacturing a water absorbing agent of claim 18, wherein said water absorbing resin is a hydrogel-forming water absorbing resin obtained by polymerizing and crosslinking a hydrophilic monomer composed mainly of acrylic acid and/or a salt of acrylic acid.

44. The method of manufacturing a water absorbing agent of claim 43, wherein said hydrophilic monomer consists of 10 to 40 mol percent of acrylic acid and 90 to 60 mol percent of a salt of acrylic acid.

45. The method of manufacturing a water absorbing agent of claim 43, wherein said hydrophilic monomer further comprises a monomer other than acrylic acid and/or a salt of acrylic acid in a ratio of not more than 30 mol percent to the total amount of acrylic acid and/or a salt of acrylic acid.

46. The method of manufacturing a water absorbing agent of claim 43, wherein said water absorbing resin is internally crosslinked with an internal crosslinking agent containing a plurality of polymerizable unsaturated groups or a plurality of reactive groups.

47. The water absorbing agent of claim 1, which is produced by a method comprising the sequential steps of:

(1) supplying a water absorbing resin containing a carboxyl group to a first area of an agitation type mixer of a continuous extruding method including at least one kind of agitating member, disposed around a rotational shaft inside a fixed cylinder, for applying a thrusting force to said water absorbing resin;

(2) dispersing said water absorbing resin in said first area;

(3) extruding said water absorbing resin to a second area in which said thrusting force is weaker than in said first area; and (4) mixing said water absorbing resin and an aqueous liquid in said second area.

48. The water absorbing agent of claim 2, which is produced by a method comprising the sequential steps of:

(1) supplying a water absorbing resin containing a carboxyl group to a first area of an agitation type mixer of a continuous extruding method including at least one kind of agitating member, disposed around a rotational shaft inside a fixed cylinder, for applying a thrusting force to said water absorbing resin;

(2) dispersing said water absorbing resin in said first area;

(3) extruding said water absorbing resin to a second area in which said thrusting force is weaker than in said first area; and (4) mixing said water absorbing resin and an aqueous liquid in said second area.

49. The method as set forth in claim 12, wherein said step of obtaining a water-containing gel-like granulation product comprises the steps of:

(1) supplying a water absorbing resin containing a carboxyl group to a first area of an agitation type mixer of a continuous extruding method including at least one kind of agitating member, disposed around a rotational shaft inside a fixed cylinder, for applying a thrusting force to said water absorbing resin;

(2) dispersing said water absorbing resin in said first area;

(3) extruding said water absorbing resin to a second area in which said thrusting force is weaker than in said first area; and (4) mixing said water absorbing resin and an aqueous liquid in said second area.

50. The water absorbing agent of claim 18, wherein said water absorbing granulation product is obtained from a water-containing gel-like granulation product obtained by a method comprising the steps of:

(1) supplying a water absorbing resin containing a carboxyl group to a first area of an agitation type mixer of a continuous extruding method including at least one kind of agitating member, disposed around a rotational shaft inside a fixed cylinder, for applying a thrusting force to said water absorbing resin;

(2) dispersing said water absorbing resin in said first area;

(3) extruding said water absorbing resin to a second area in which said thrusting force is weaker than in said first area; and (4) mixing said water absorbing resin and an aqueous liquid in said second area.

* * * * *